Dec. 22, 1964  R. J. CYPSER ETAL  3,162,839
CONTROL EQUIPMENT
Filed Sept. 26, 1956  36 Sheets-Sheet 1

INVENTORS
RUDOLPH J. CYPSER
ROBERT C. HOPKINS
BENNETT HOUSMAN
RICHARD C. JEFFREY
DAN C. ROSS

BY Theodore C. Wood
AGENT

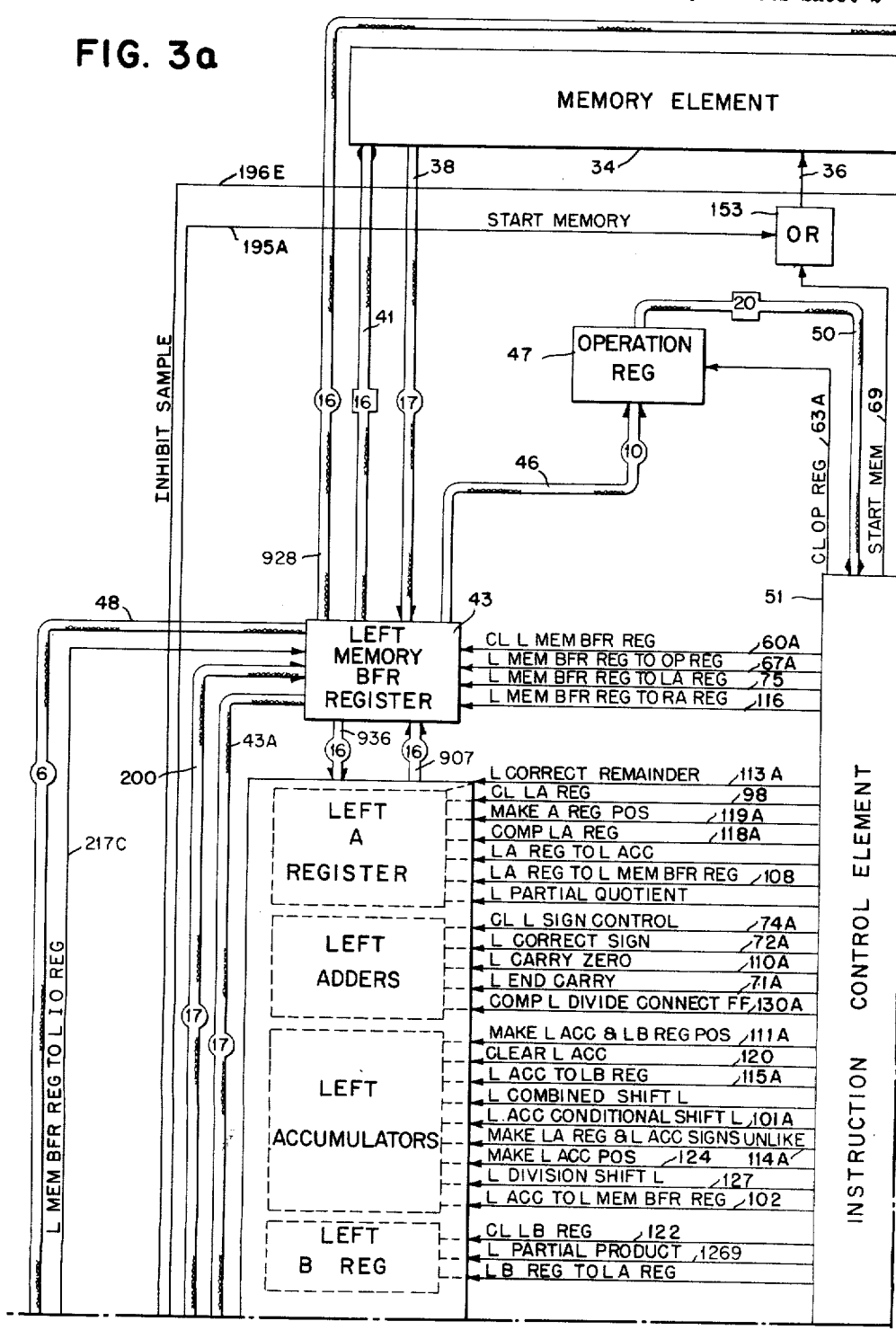

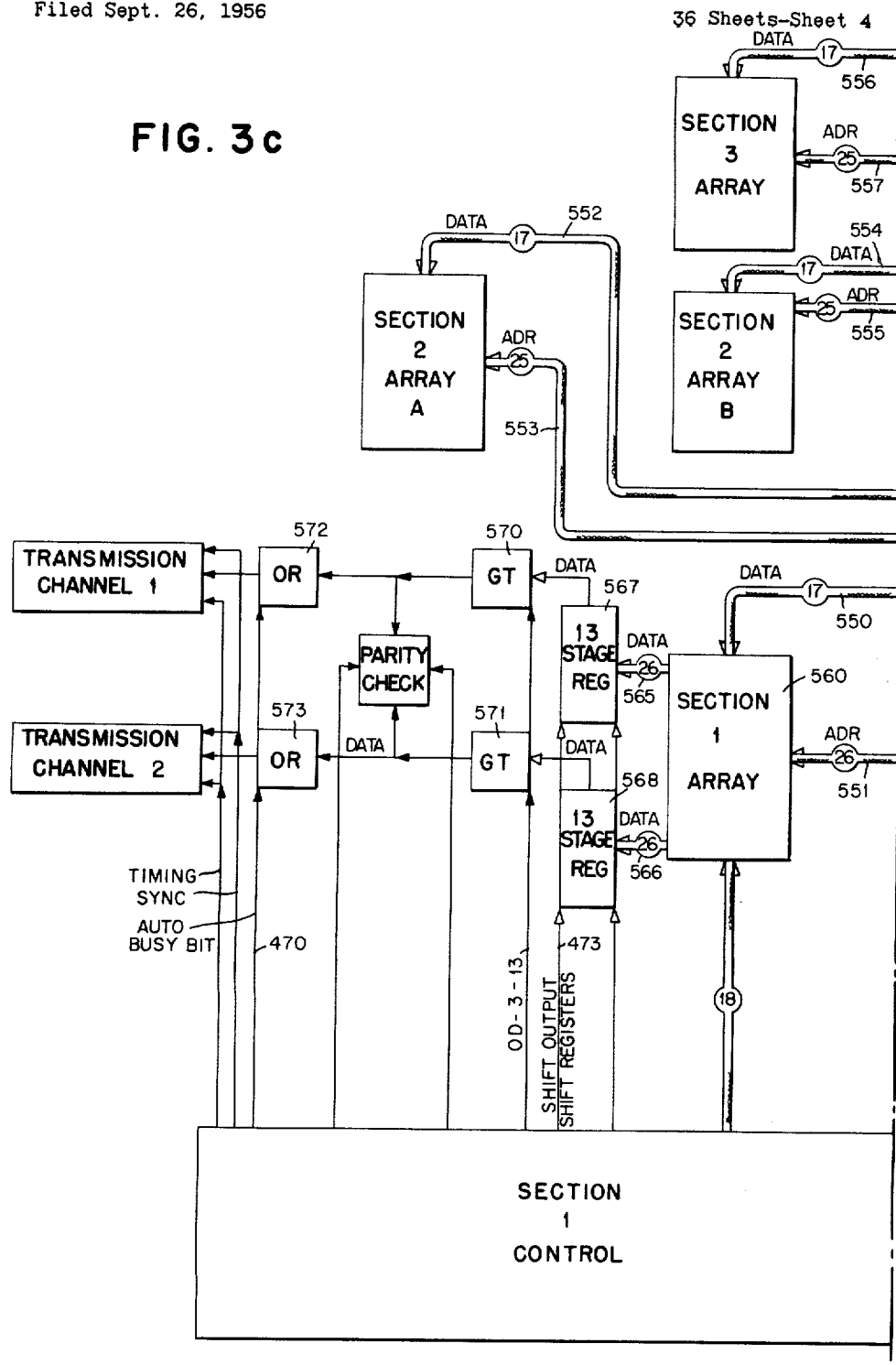

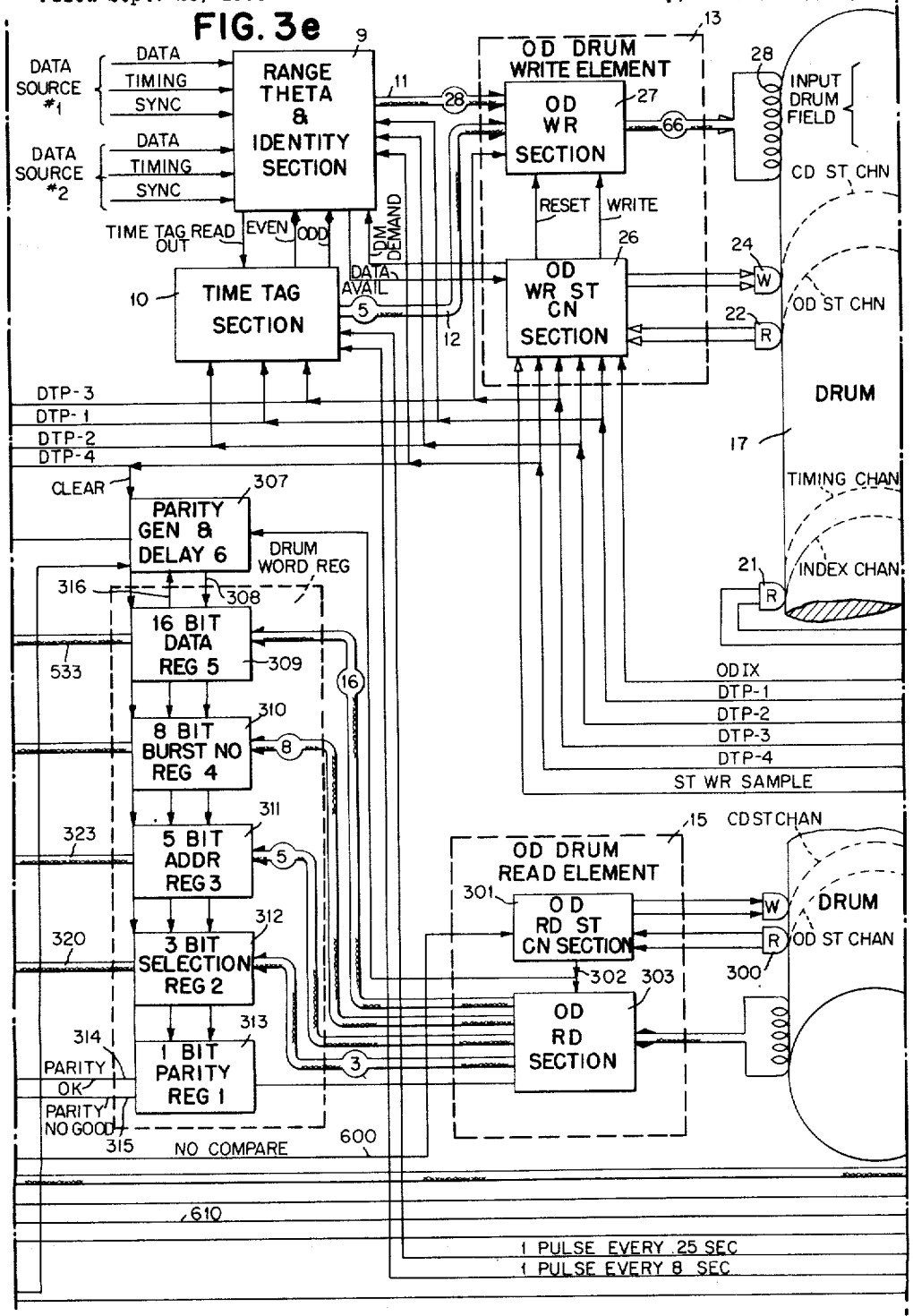

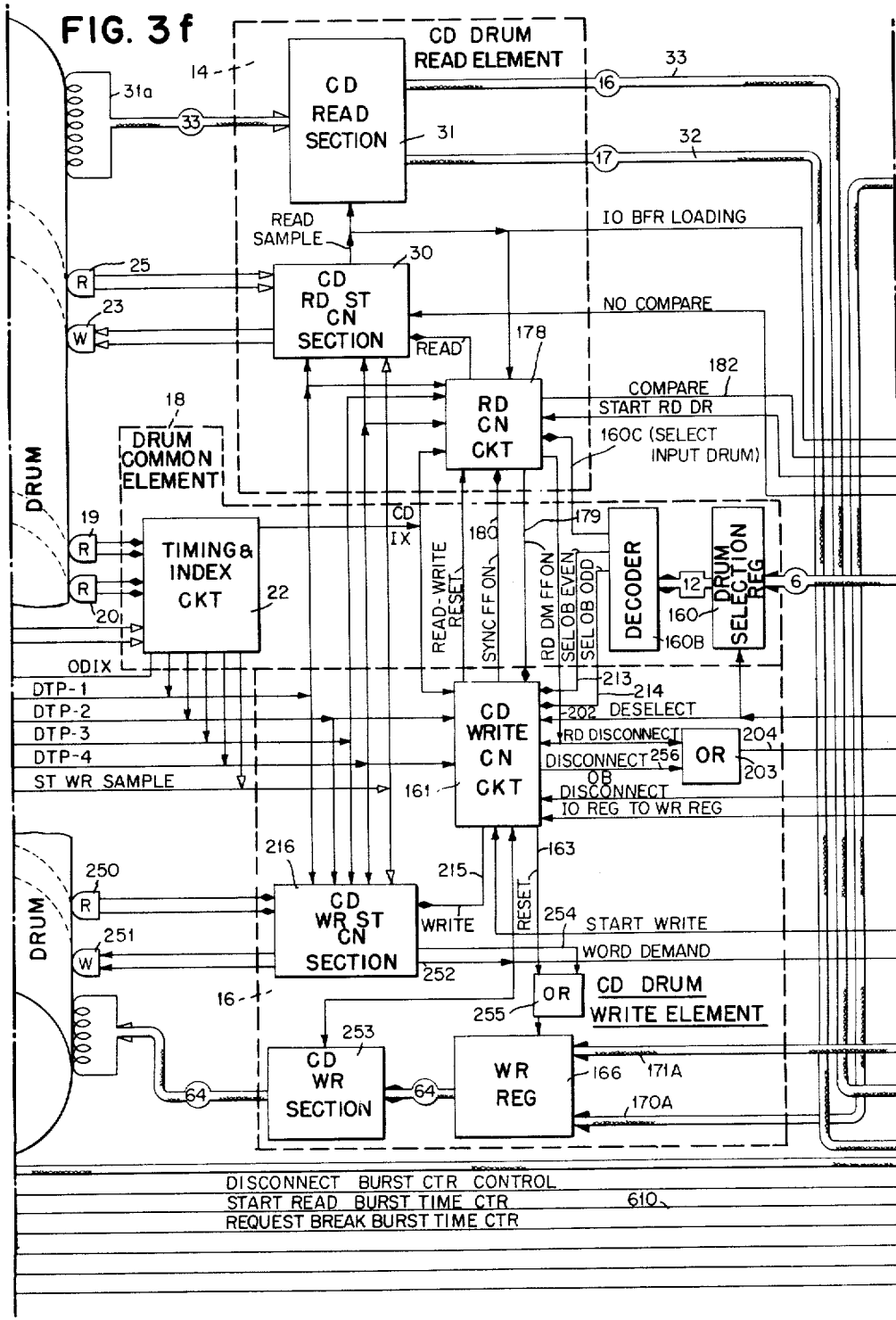

Dec. 22, 1964   R. J. CYPSER ETAL   3,162,839
CONTROL EQUIPMENT
Filed Sept. 26, 1956   36 Sheets-Sheet 10

FIG. 6
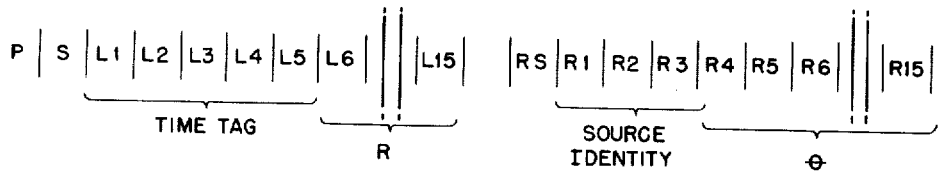
FIG. 7
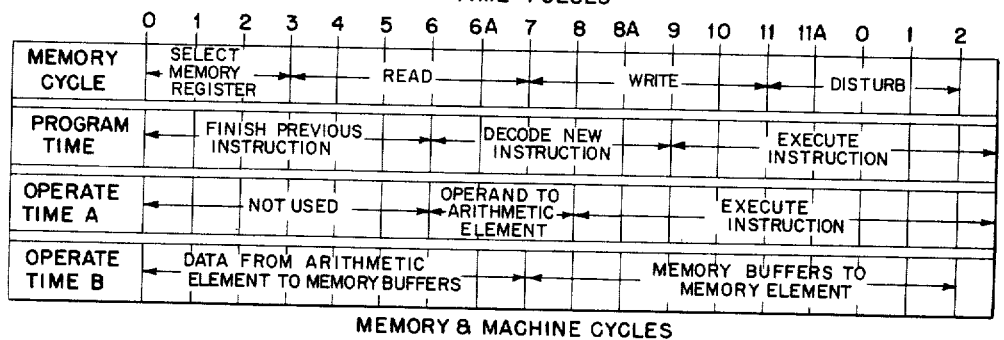
FIG. 8
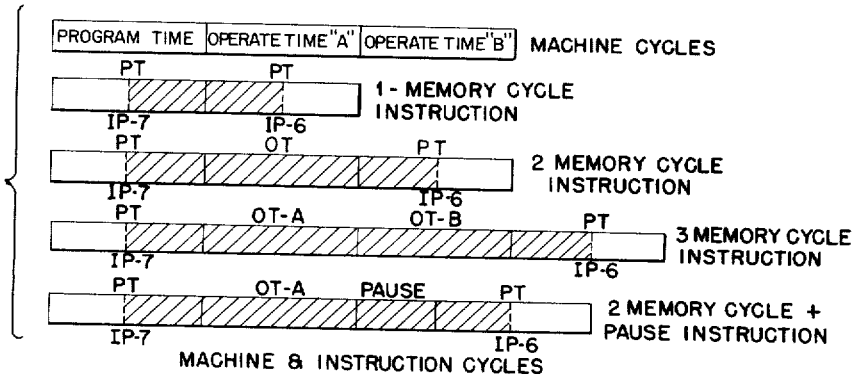
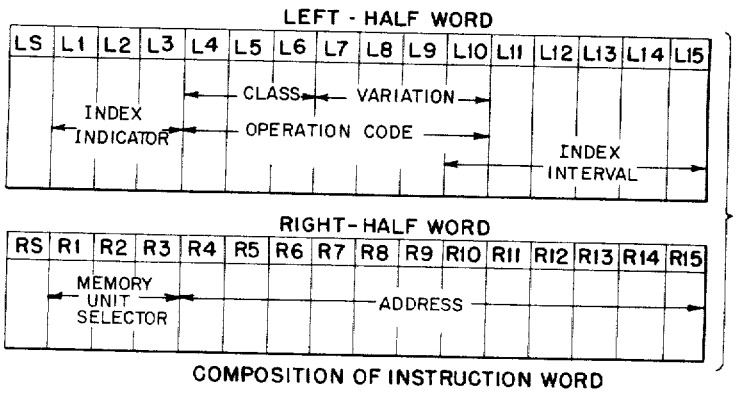
FIG. 9

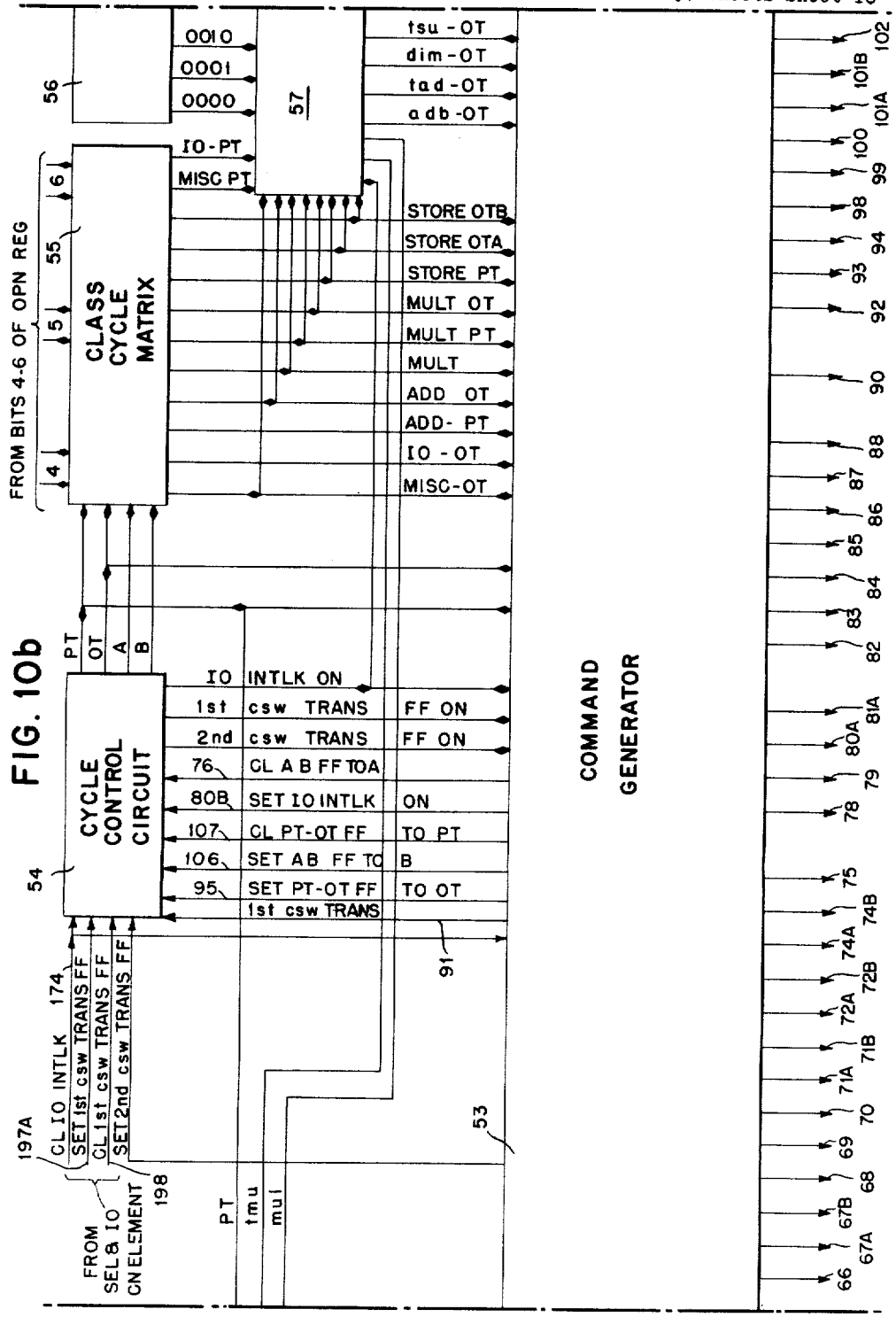

FIG. 11a — PROGRAM STOP (hlt)

FIG. 11b — CLEAR SUBTRACT WORD COUNTER (csw)

FIG. 11c — CLEAR & ADD (cad)

FIG. 11d — ADD (add)

FIG. 11e — TWIN & ADD (tad)

FIG. 11f — CLEAR & SUBTRACT (csw)

Dec. 22, 1964  R. J. CYPSER ETAL  3,162,839
CONTROL EQUIPMENT
Filed Sept. 26, 1956  36 Sheets-Sheet 17

FIG. 11g — SUBTRACT (sub)

| | 7 | 8 | 9 | 10 | 11 | 0 | 1 | 2 | 3 | 4 | 5 | 6 | 7 | 8 | 9 | 10 | 11 | 0 | 1 | 2 | 3 | 4 | 5 | 6 |
|---|---|---|---|---|---|---|---|---|---|---|---|---|---|---|---|---|---|---|---|---|---|---|---|---|
| | 66 | | | | 70 | 59 | 60A | 69 | | | | | 75 | 118A | 110A | 70 | | 59 | 60A | 69 | | | 101A | 62 |
| | 67A | | | | 95 | 60B | 60B | | | | | | 105 | 118B | 110B | 107 | | 60B | 71A | | | 101B | 63A |
| | 67B | | | | | 68 | | | | | | | 129 | | | | | 61 | 71B | | | | 63B |
| | 129 | | | | | 98 | | | | | | | | | | | | 98 | | | | | 64 |
| | | | | | | 99 | | | | | | | | | | | | 99 | | | | | 65A |
| | | | | | | | | | | | | | | | | | | 127 | | | | | 65B |
| | | | | | | | | | | | | | | | | | | 128 | | | | | |

PT1 — OT — PT2

FIG. 11h — TWIN & SUBTRACT (tsu)

| | 7 | 8 | 9 | 10 | 11 | 0 | 1 | 2 | 3 | 4 | 5 | 6 | 7 | 8 | 9 | 10 | 11 | 0 | 1 | 2 | 3 | 4 | 5 | 6 |
|---|---|---|---|---|---|---|---|---|---|---|---|---|---|---|---|---|---|---|---|---|---|---|---|---|
| | 66 | | | | 70 | 59 | 60A | 69 | | | | | 75 | 118A | 110A | 70 | | 59 | 60A | 69 | | | 101A | 62 |
| | 67A | | | | 95 | 60B | | | | | | | 116 | 118B | 110B | 107 | | 60B | 71A | | | 101B | 63A |
| | 67B | | | | | 68 | | | | | | | 129 | | | | | 61 | 71B | | | | 63B |
| | 129 | | | | | 98 | | | | | | | | | | | | 98 | | | | | 64 |
| | | | | | | 99 | | | | | | | | | | | | 99 | | | | | 65A |
| | | | | | | | | | | | | | | | | | | 127 | | | | | 65B |
| | | | | | | | | | | | | | | | | | | 128 | | | | | |

FIG. 11i — CLEAR & ADD MAGNITUDE (cam)

| | 7 | 8 | 9 | 10 | 11 | 0 | 1 | 2 | 3 | 4 | 5 | 6 | 7 | 8 | 9 | 10 | 11 | 0 | 1 | 2 | 3 | 4 | 5 | 6 |
|---|---|---|---|---|---|---|---|---|---|---|---|---|---|---|---|---|---|---|---|---|---|---|---|---|
| | 66 | | | | 70 | 59 | 60A | 69 | | | 120 | | 75 | 119A | 110A | 70 | | 59 | 60A | 69 | | | 101A | 62 |
| | 67A | | | | 95 | 60B | | | | | 121 | | 105 | 119B | 110B | 107 | | 60B | 71A | | | 101B | 63A |
| | 67B | | | | | 68 | | | | | | | 129 | | | | | 61 | 71B | | | | 63B |
| | 129 | | | | | 98 | | | | | | | | | | | | 98 | | | | | 64 |
| | | | | | | 99 | | | | | | | | | | | | 99 | | | | | 65A |
| | | | | | | | | | | | | | | | | | | 127 | | | | | 65B |
| | | | | | | | | | | | | | | | | | | 128 | | | | | |

Dec. 22, 1964  R. J. CYPSER ETAL  3,162,839
CONTROL EQUIPMENT
Filed Sept. 26, 1956  36 Sheets-Sheet 18

FIG. 11j  DIFFERENCE MAGNITUDES (dim)

FIG. 11k  MULTIPLY (mul)

FIG. 11l  TWIN & MULTIPLY

FIG.11m — DIVIDE (dvd)

FIG.11n — TWIN & DIVIDE (tdv)

Dec. 22, 1964   R. J. CYPSER ETAL   3,162,839
CONTROL EQUIPMENT
Filed Sept. 26, 1956
36 Sheets-Sheet 20

| | | PT₁ | | | | | | OTA | | | | | | | | | |
|---|---|---|---|---|---|---|---|---|---|---|---|---|---|---|---|---|---|
| | | 7 | 8 | 9 | 10 | 11 | 0 | 1 | 2 | 3 | 4 | 5 | 6 | 7 | 8 | 9 | 10 | 11 |

FIG.11o STORE (fst) — 66 67A 67B 129 | | | | 70 95 106 | | | | NO OTA | | | | | | |

FIG.11p LEFT STORE (lst) — 66 67A 67B 129 | | | 70 95 | 59 60A 60B 68 | 69 | | | 98 99 | 75 105 129 | | 70 106

FIG.11q RIGHT STORE (rst) — 66 67A 67B 129 | | | 70 95 | 59 60A 60B 68 | 69 | | | 98 99 | 75 | | 70 106

FIG.11r STORE ADDRESS (sta) — 66 67A 67B 129 | | | 70 95 | 59 60A 60B 68 | 69 | | | 98 | 75 129 | | 70 106

FIG.11s ADD ONE (aor) — 66 67A 67B 129 | | | 70 95 | 59 60A 60B 68 | 69 | | | 98 99 121 | 75 105 129 | 100 | 70 106 128

FIG.11t EXCHANGE (ech) — 66 67A 67B 129 | | | 70 95 | 59 60A 60B 68 | 69 | | | 98 99 | 75 129 | | 70 106

Dec. 22, 1964    R. J. CYPSER ETAL    3,162,839
CONTROL EQUIPMENT
Filed Sept. 26, 1956    36 Sheets-Sheet 21

| OTB | | | | | | | | | | | | PT$_2$ | | | | | | |
|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 0 | 1 | 2 | 3 | 4 | 5 | 6 |
| 59 | 60A 60B 68 | 69 102 103 | 129 | | | | 129 | | | | 70 76 107 | 59 | 60A 60B 61 | 69 | | | | 62 63A 63B 64 65A 65B |

FIG. 11 oo

| 0 | 1 | 2 | 3 | 4 | 5 | 6 | 7 | 8 | 9 | 10 | 11 | 0 | 1 | 2 | 3 | 4 | 5 | 6 |
|---|---|---|---|---|---|---|---|---|---|---|---|---|---|---|---|---|---|---|
| 59 | 60A 60B 68 | 69 102 109 | 129 | | | | 129 | | | | 70 76 107 | 59 | 60A 60B 61 | 69 | | | | 62 63A 63B 64 65A 65B |

FIG. 11 pp

| 0 | 1 | 2 | 3 | 4 | 5 | 6 | 7 | 8 | 9 | 10 | 11 | 0 | 1 | 2 | 3 | 4 | 5 | 6 |
|---|---|---|---|---|---|---|---|---|---|---|---|---|---|---|---|---|---|---|
| 59 | 60A 60B 68 | 69 103 108 | 129 | | | | 129 | | | | 70 | 59 | 60A 60B 61 | 69 | | | | 62 63A 63B 64 65A 65B |

FIG. 11 qq

| 0 | 1 | 2 | 3 | 4 | 5 | 6 | 7 | 8 | 9 | 10 | 11 | 0 | 1 | 2 | 3 | 4 | 5 | 6 |
|---|---|---|---|---|---|---|---|---|---|---|---|---|---|---|---|---|---|---|
| 59 | 60A 60B 68 | 69 108 109 | 129 | | | | 129 | | | | 70 76 107 | 59 | 60A 60B 61 | 69 | | | | 62 63A 63B 64 65A 65B |

FIG. 11 rr

| 0 | 1 | 2 | 3 | 4 | 5 | 6 | 7 | 8 | 9 | 10 | 11 | 0 | 1 | 2 | 3 | 4 | 5 | 6 |
|---|---|---|---|---|---|---|---|---|---|---|---|---|---|---|---|---|---|---|
| 59 | 60A 60B 68 104 | 69 103 108 | 129 | | | | 129 | | | | 70 76 107 | 59 | 60A 60B 61 | 69 | | | | 62 63A 63B 64 65A 65B |

FIG. 11 ss

| 0 | 1 | 2 | 3 | 4 | 5 | 6 | 7 | 8 | 9 | 10 | 11 | 0 | 1 | 2 | 3 | 4 | 5 | 6 |
|---|---|---|---|---|---|---|---|---|---|---|---|---|---|---|---|---|---|---|
| 59 | 60A 60B 68 | 69 102 103 | 129 | | | | 120 121 | 129 | | | 110A 110B | 70 76 107 | 59 | 60A 60B 61 127 128 | 69 | | | | 62 63A 63B 64 65A 65B |

FIG. 11 tt

READ (rds)

WRITE (wrt)

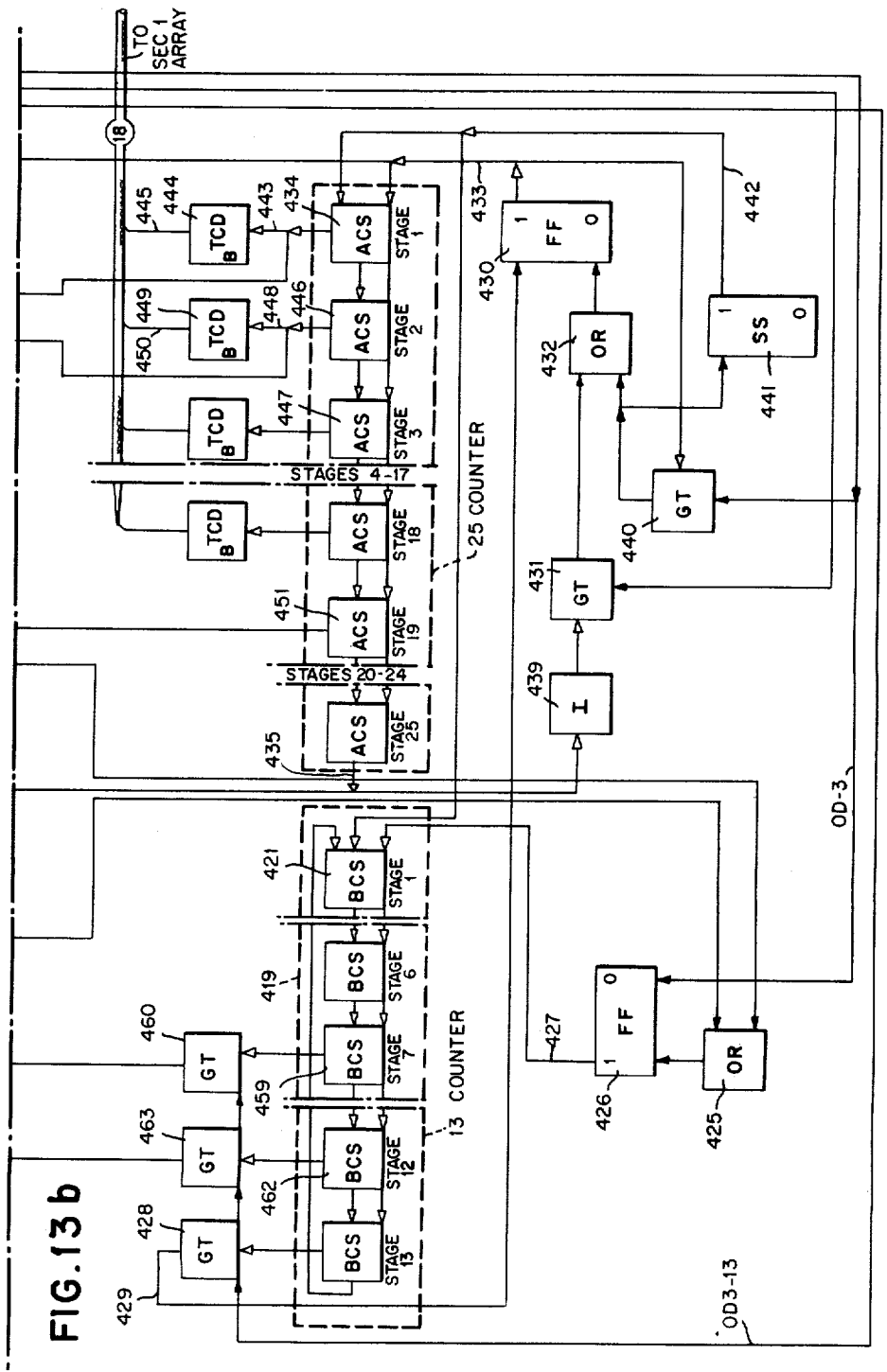

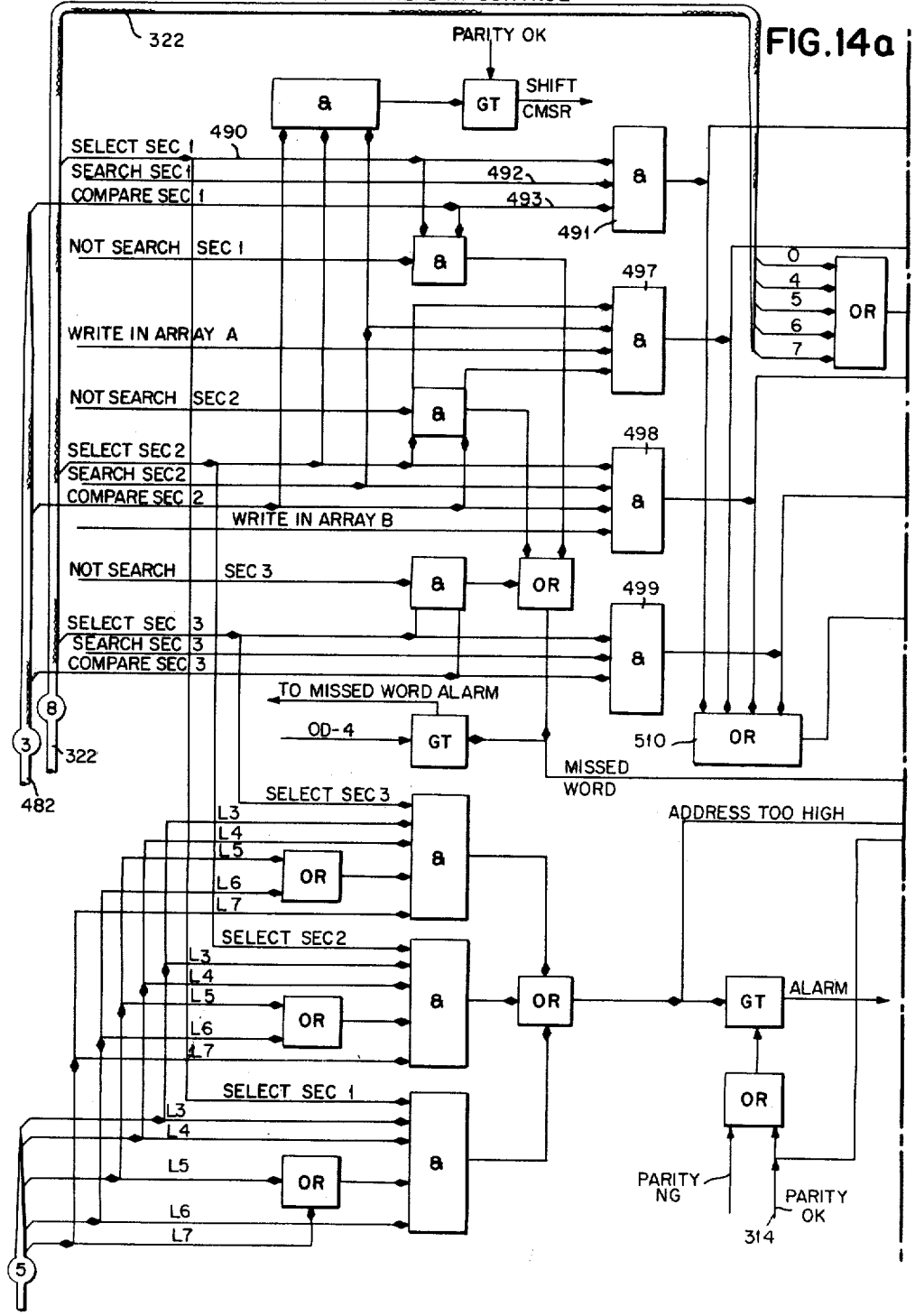

Dec. 22, 1964  R. J. CYPSER ETAL  3,162,839
CONTROL EQUIPMENT
Filed Sept. 26, 1956  36 Sheets-Sheet 27
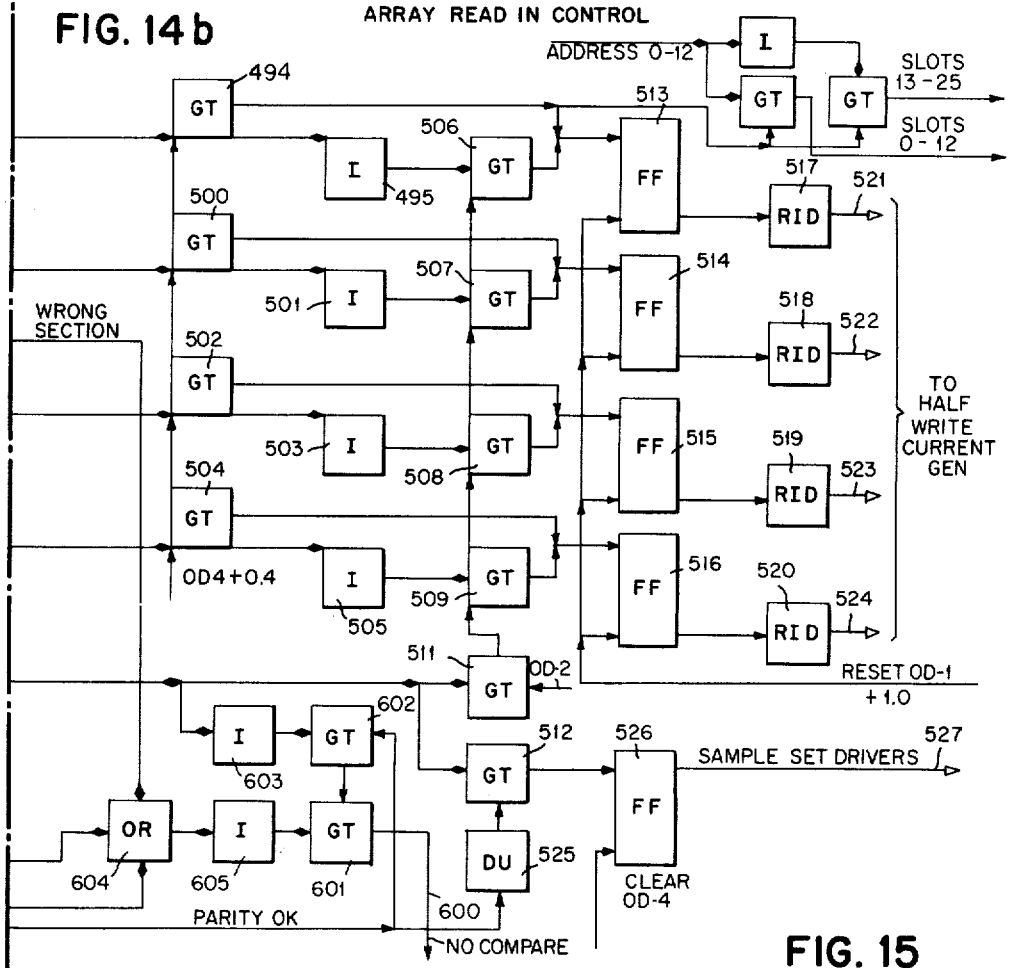
FIG. 14b  ARRAY READ IN CONTROL
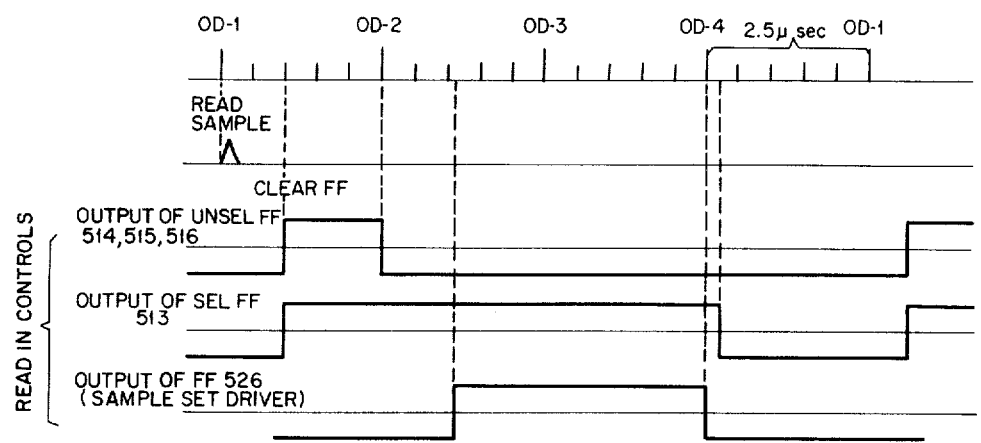
FIG. 15

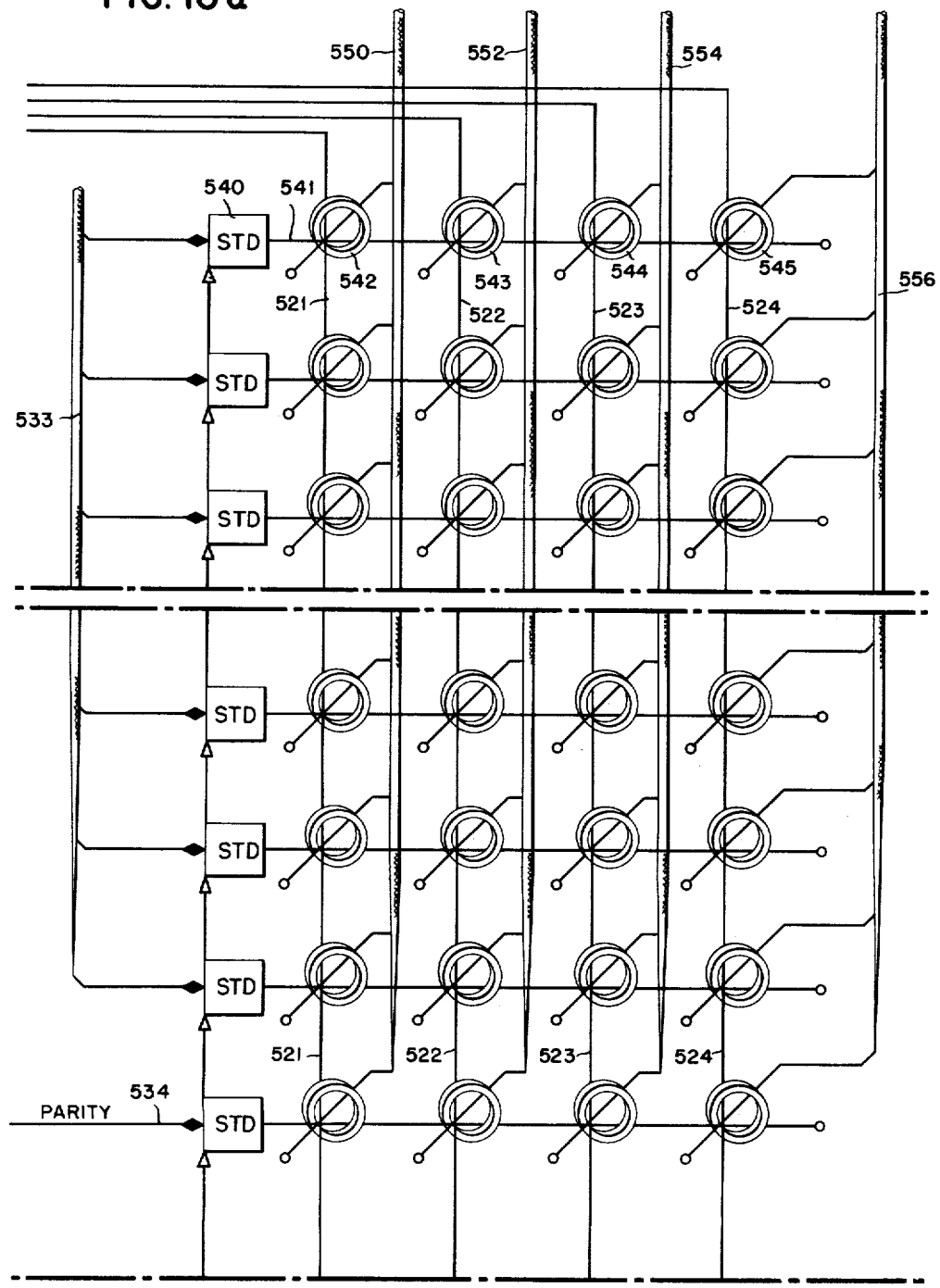
FIG. 16a  HALF WRITE CURRENT GEN

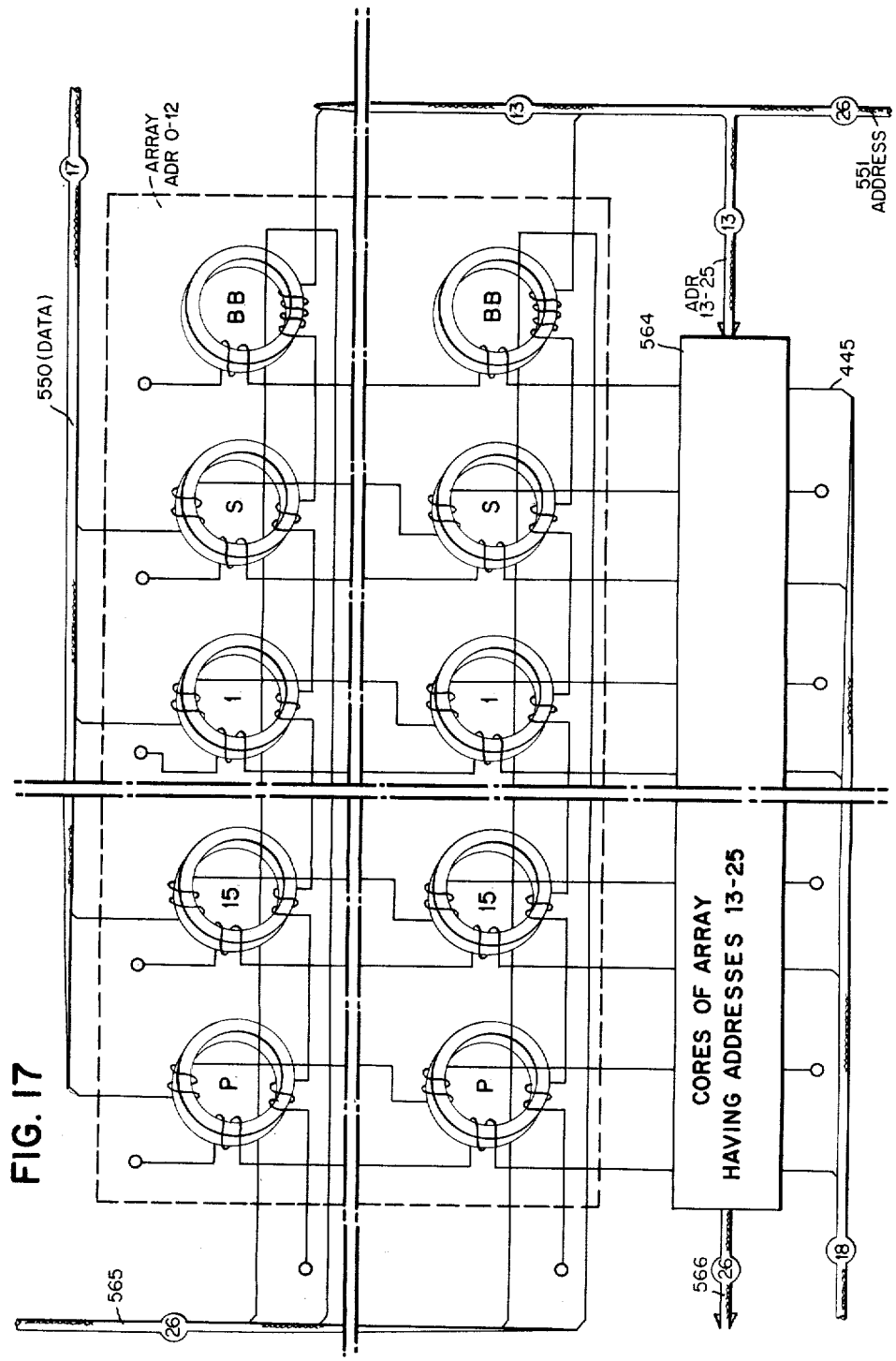

Dec. 22, 1964   R. J. CYPSER ET AL   3,162,839
CONTROL EQUIPMENT
Filed Sept. 26, 1956   36 Sheets-Sheet 31

Dec. 22, 1964  R. J. CYPSER ETAL  3,162,839
CONTROL EQUIPMENT
Filed Sept. 26, 1956  36 Sheets-Sheet 33

Dec. 22, 1964   R. J. CYPSER ETAL   3,162,839
CONTROL EQUIPMENT
Filed Sept. 26, 1956   36 Sheets-Sheet 34

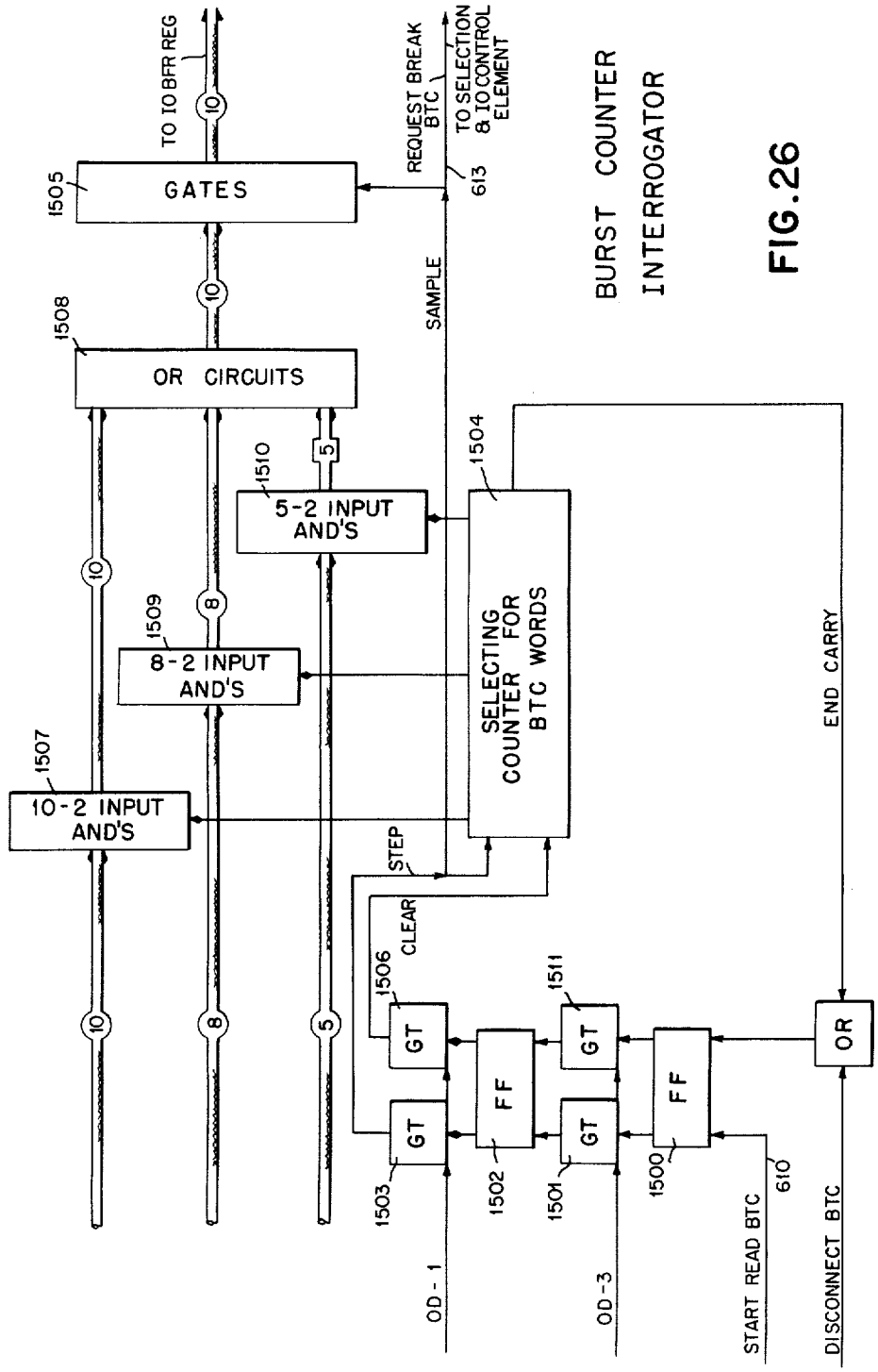

United States Patent Office 3,162,839
Patented Dec. 22, 1964

3,162,839
CONTROL EQUIPMENT
Rudolph J. Cypser, Poughkeepsie, N.Y., Robert C. Hopkins, Los Angeles, Calif., Bennett Housman, Poughkeepsie, N.Y., Richard C. Jeffrey, Princeton, N.J., and Dan C. Ross, Wappingers Falls, N.Y., assignors, by mesne assignments, to Massachusetts Institute of Technology, a corporation of Massachusetts
Filed Sept. 26, 1956, Ser. No. 612,266
16 Claims. (Cl. 340—172.5)

This invention relates to control equipment and more particularly to control equipment which includes a digital data processing machine.

Various co-pending patent applications will be referred to in the following specification. Those applications are incorporated herein by reference and will be referred to as co-pending application "A," "B", etc. as follows:

| Reference | Co-Pending Application | | | | |
|---|---|---|---|---|---|
| | Application Serial No. | Now Pat. No. | Title | Inventor/s | Filing Date |
| A | 494,982 | 2,988,735, issued June 12, 1961 | Magnetic Data Storage | R. Everett et al | 3/17/55 |
| B | 582,578 | 3,040,299, issued June 19, 1962 | Data Storage System | J. Crosby et al | 5/3/56 |
| C | 597,612 | 3,056,110, issued Sept. 25, 1962 | Digital Data Transmission System. | R. Cypser et al | 7/13/56 |
| D | 570,199 | 2,914,248, issued Nov. 24, 1959 | Electronic Data Processing Machine. | H. Ross et al | 3/7/56 |
| E | 576,976 | 2,887,394, issued May 19, 1959 | Magnetic Memory | R. Counihan et al | 4/9/56 |
| F | 586,247 | 2,968,791, issued Jan. 17, 1961 | Buffer Storage System | E. Johnson et al | 5/21/56 |
| G | 582,576 | 2,932,010, issued Apr. 5, 1960 | Data Storage System | R. Mayer et al | 5/3/56 |
| H | 414,459 | 2,994,478, issued Aug. 1, 1961 | Electronic Digital Computer. | B. Sarahan et al | 3/5/54 |
| I | 4,909 | 3,018,959, issued Jan. 20, 1962 | Computing Device | Walker Thomas | Filed Concurrently |
| J | 484,677 | 2,846,669, issued July 5, 1958 | Magnetic Core Circuit | W. McMillan et al | 1/28/55 |

In certain control equipment it is desirable to employ a digital data processing machine and when the information signals are asynchronous with or occur at a low rate as compared to the operation rate of the data processing machine, it is desirable to employ a time-buffer storage arrangement between the source of information signals and the data processing machine. It is also desirable to employ a time-buffer storage arrangement between the data processing machine and the controlled device if the data processing machine operation rate is high as compared to the rate at which signals may be received by the controlled device.

A magnetic drum buffer storage arrangement such as that shown and described in the above referred to co-pending application "A" may be employed as an input buffer or an output buffer for a data processing machine. In such an arrangement, the length of time that signals are delayed in the buffer storage system is not constant but varies primarily as a function of the rate at which drum reading operations take place.

When the computer generates signals for controlling the operation of the controlled device, it is important that those control signals have such magnitude that when they arrive at the controlled device they will effect the correct control operation. When there is a variable length of time in the transmission of signals through the input time-buffer storage, it is important that the computer be able to determine how old those signals are. Since there is an inherent variable delay in the buffer the signals delivered through the buffer to the controlled device must contain the desired information extrapolated to the actual time of utilization by the controlled device.

Briefly stated, in accordance with this invention, signals representing time of receipt accompany the input information signals so that the age of the information signals can be determined when those signals are processed and signals resulting from computations have burst number signals accompany them so that they will be delivered from the output system at a known time.

It is therefore an object of this invention to provide an improved control equipment including a high speed digital computer and a time-buffer storage system for receiving input information signals and delivering output signals from the computer to a load device.

Another object of this invention is to provide an improved control equipment including a computer and a time-buffer storage system wherein means are provided to produce burst signals which accompany the control signals produced by the computer, means are also provided for delivering the control signals from the time-buffer storage system in a time arrangement according to the burst signals and further means are provided to deliver signals to the computer that indicate which of the control signals stored in the time-buffer storage system have been delivered therefrom.

In control equipment as above described, it is sometimes desirable that the computer and time-buffer storage system be adapted for parallel data handling operation and signals from the output of the time-buffer storage system be transformed into some other form, for example to serial form or to a different code form. In the case of transforming from parallel to serial form, this can be accomplished by including means for successively scanning the time-buffer storage system for given lengths of time, storing signals read during a given scan in parallel form in an output system and converting the parallel signals into signals in serial form between successive scans. In such an arrangement it is necessary that the computer know not only what signals have been delivered from the time-buffer storage system but also how much time is required, if any, to complete the operation of conversion of the stored signals in parallel form to signals in serial form in order that this time may also be taken into consideration in the computations made by the computer.

It is therefore a further object of this invention to provide an improved control equipment including an electronic computer, a time-buffer storage system and a signal transforming equipment wherein means are provided to deliver signals to the computer which indicate what output signals from the computer have been delivered from the time-buffer storage system and also deliver signals to the computer which indicate how much time is required to complete the transformation now taking place.

It is therefore a further object of this invention to provide an improved control equipment including an electronic computer, a time-buffer storage system and parallel to serial conversion equipment wherein means are provided to deliver signals to the computer which indicate what output signals from the computer have been delivered from the time-buffer storage system and also deliver signals to the computer which indicate how much time is required to complete the parallel to serial conversion operation now taking place.

Other objects of the invention will be pointed out in the following description and claims and illustrated in the accompanying drawings, which disclose, by way of example, the principle of the invention and the best mode, which has been contemplated, of applying that principle.

Figure 1:
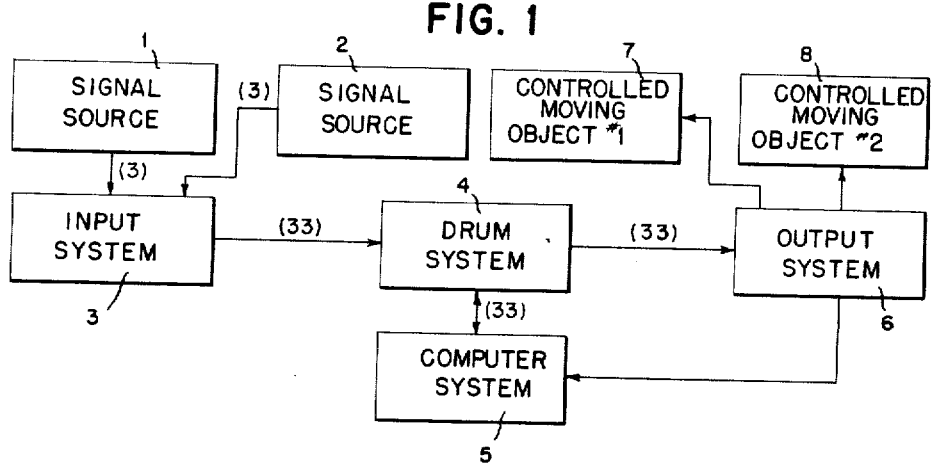
FIG. 1 is a simplified block diagram of a control equipment constructed in accordance with the principles of this invention.
Figure 3:
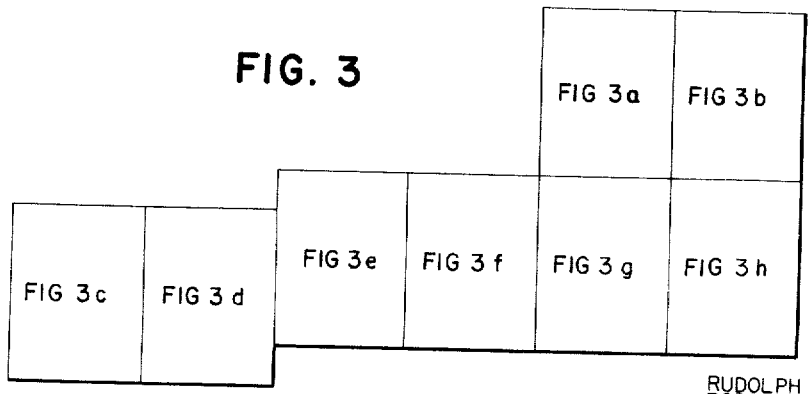
FIG. 3 is a diagram which illustrates the manner in which FIGS. 3a through 3h should be arranged to effect interconnection of the circuits in those figures.
Figure 3B:
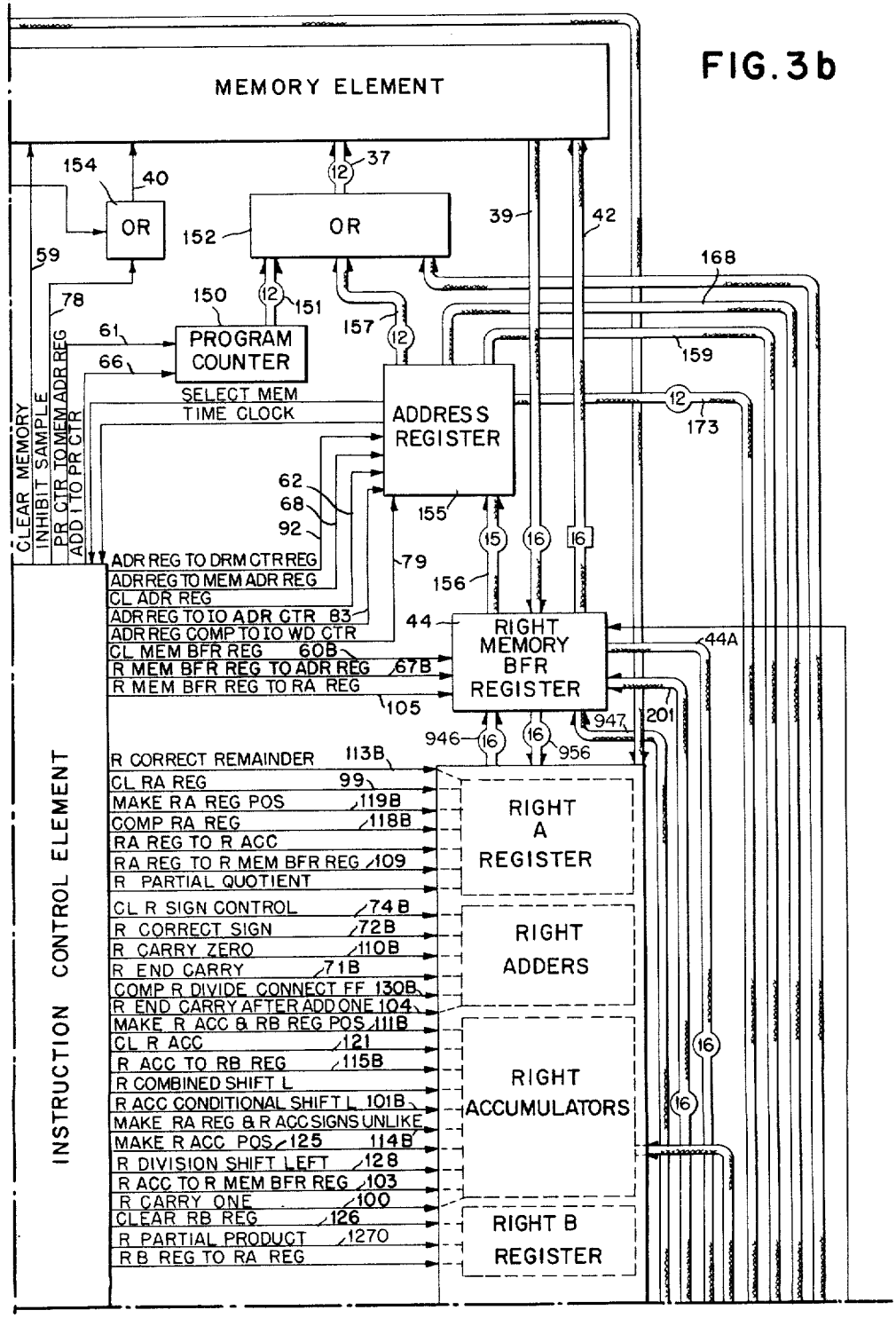

FIGS. 3a through 3h, when arranged according to FIG. 3, are a simplified block diagram of parts of FIG. 1 identified as the input system, output system, drum system and computer system.

Figure 4:
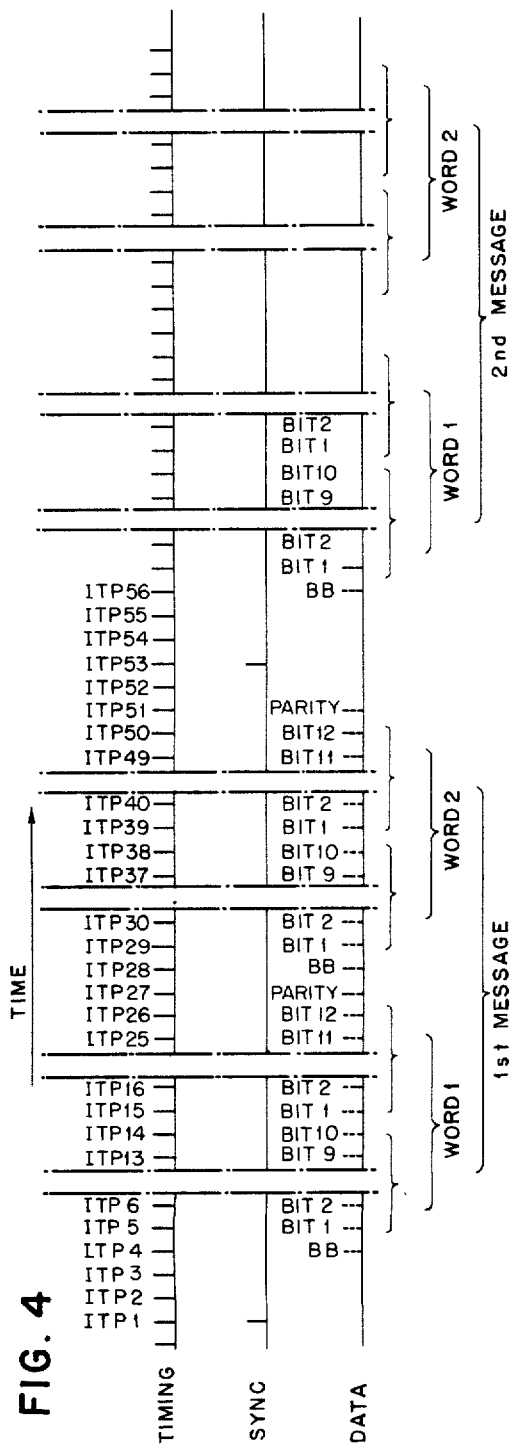

FIG. 4 is a timing diagram illustrating the timing relationship between timing, sync. and data signals received by the input system.

Figure 5:
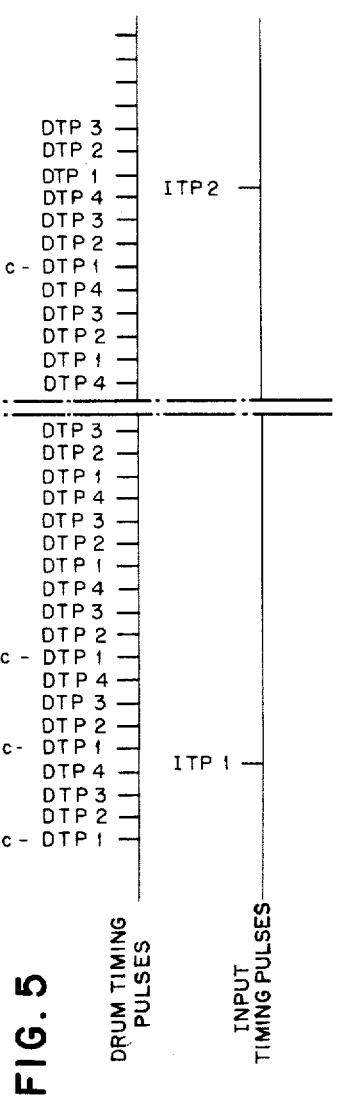

FIG. 5 is a timing diagram illustrating the timing relationship between the input timing signals and the drum timing signals.

FIG. 6 is a diagram illustrating the drum word layout of signals delivered by the input system to the drum system.

FIG. 7 is a timing chart which illustrates timing relationship between various cycles of operation in the computer system.

FIG. 8 is a timing chart which illustrates the timing relationship between computer system machine cycles and the different length instruction cycles.

FIG. 9 is a diagram which illustrates word lay-out and bit assignments of computer system instruction words.

Figure 10A:
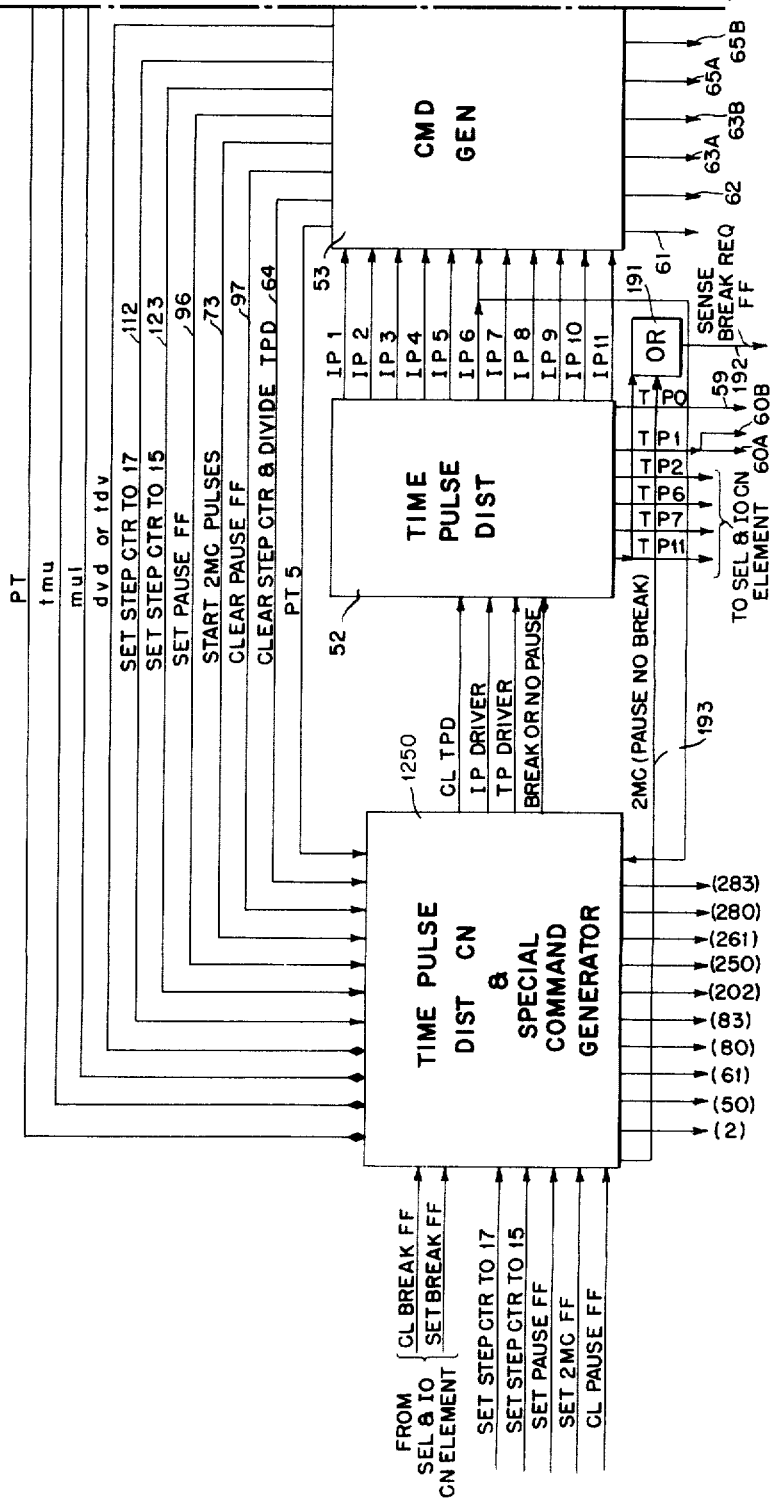
Figure 10C:
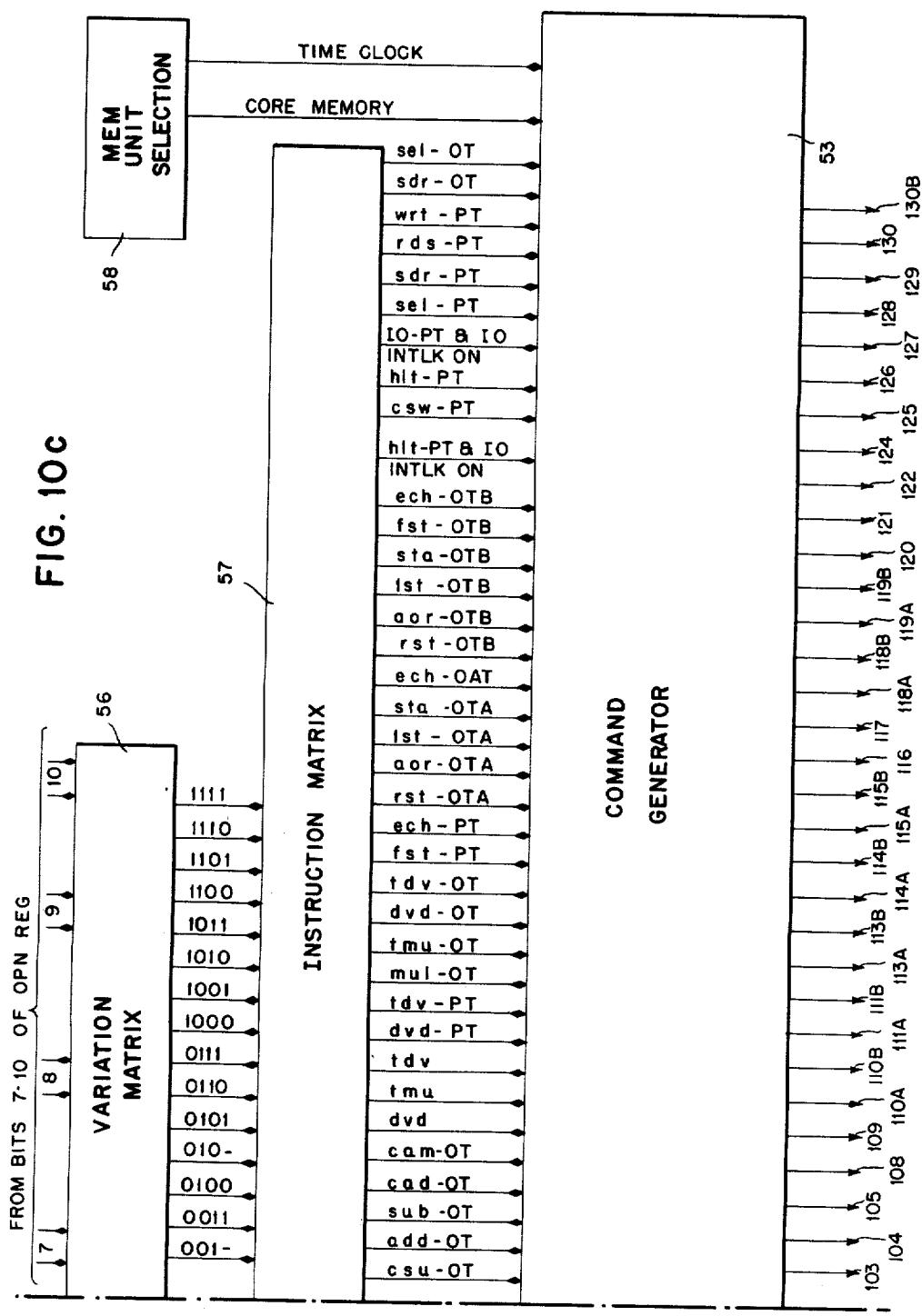

FIGS. 10a, 10b and 10c, when arranged end to end in that order from left to right, is an interconnected block diagram of the Instruction Control Element shown as block 51 in FIGS. 3a, 3b, 3g and 3h.

Figures 11M, 11N:
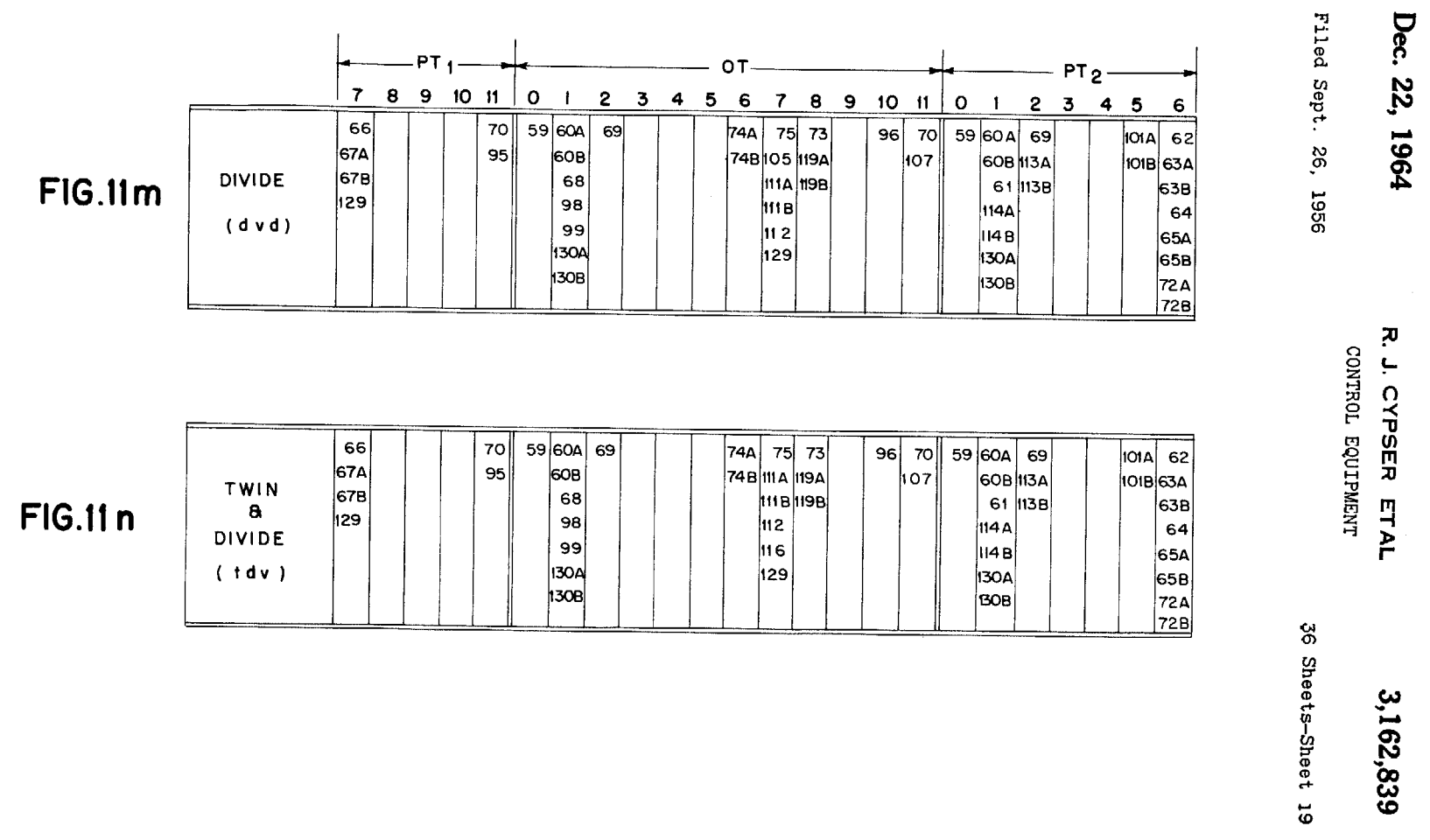
Figure 11U:
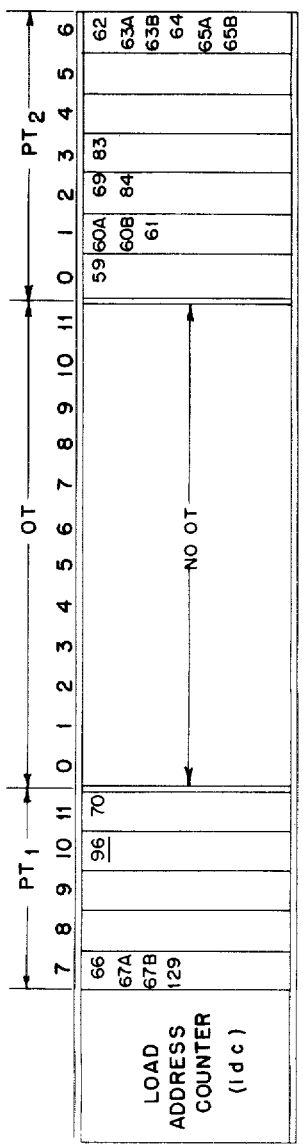
Figure 11V:
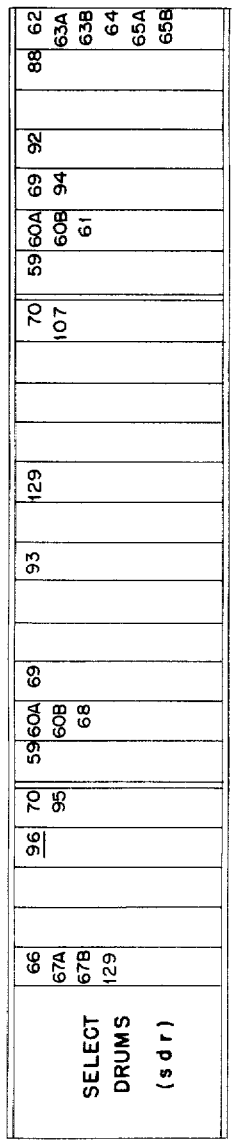
Figure 11W:
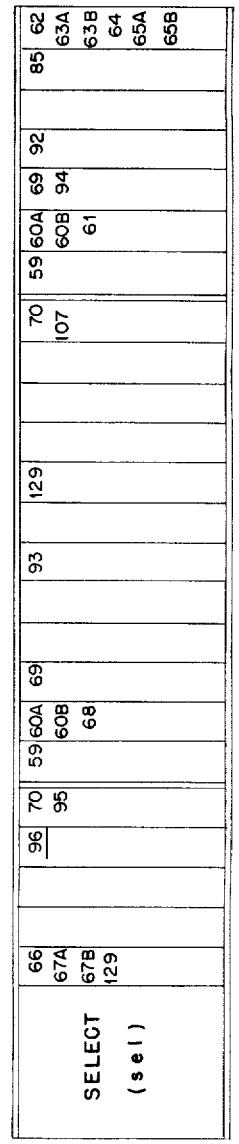
Figure 11X:
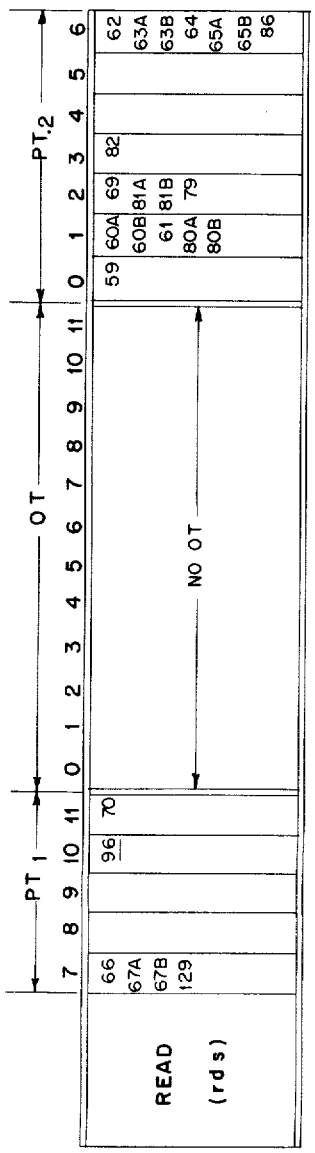
Figure 11Y:
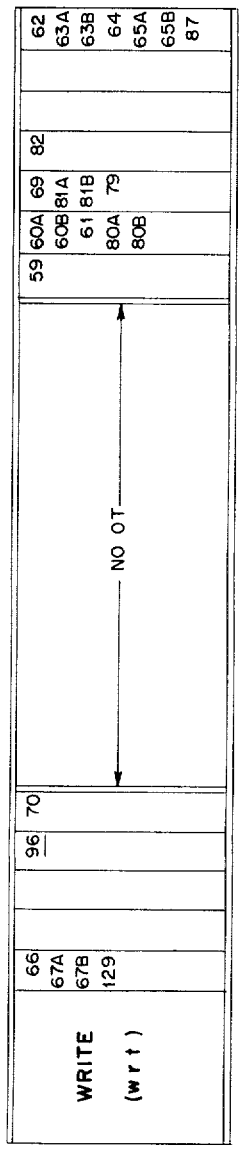

FIGS. 11a through 11y are timing charts which illustrate the commands which are generated and the time of those commands for each of several instructions that the computer system may perform.

Figure 12:
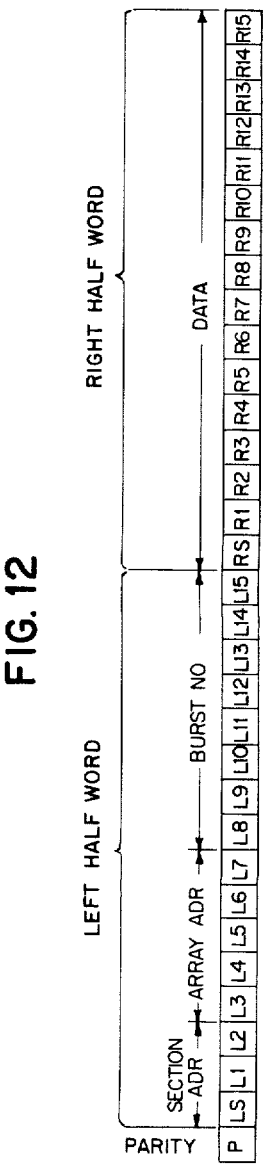

FIG. 12 is a chart which illustrates the functions of the various bits of the words read from the drum and delivered to the output system.

Figure 3D:
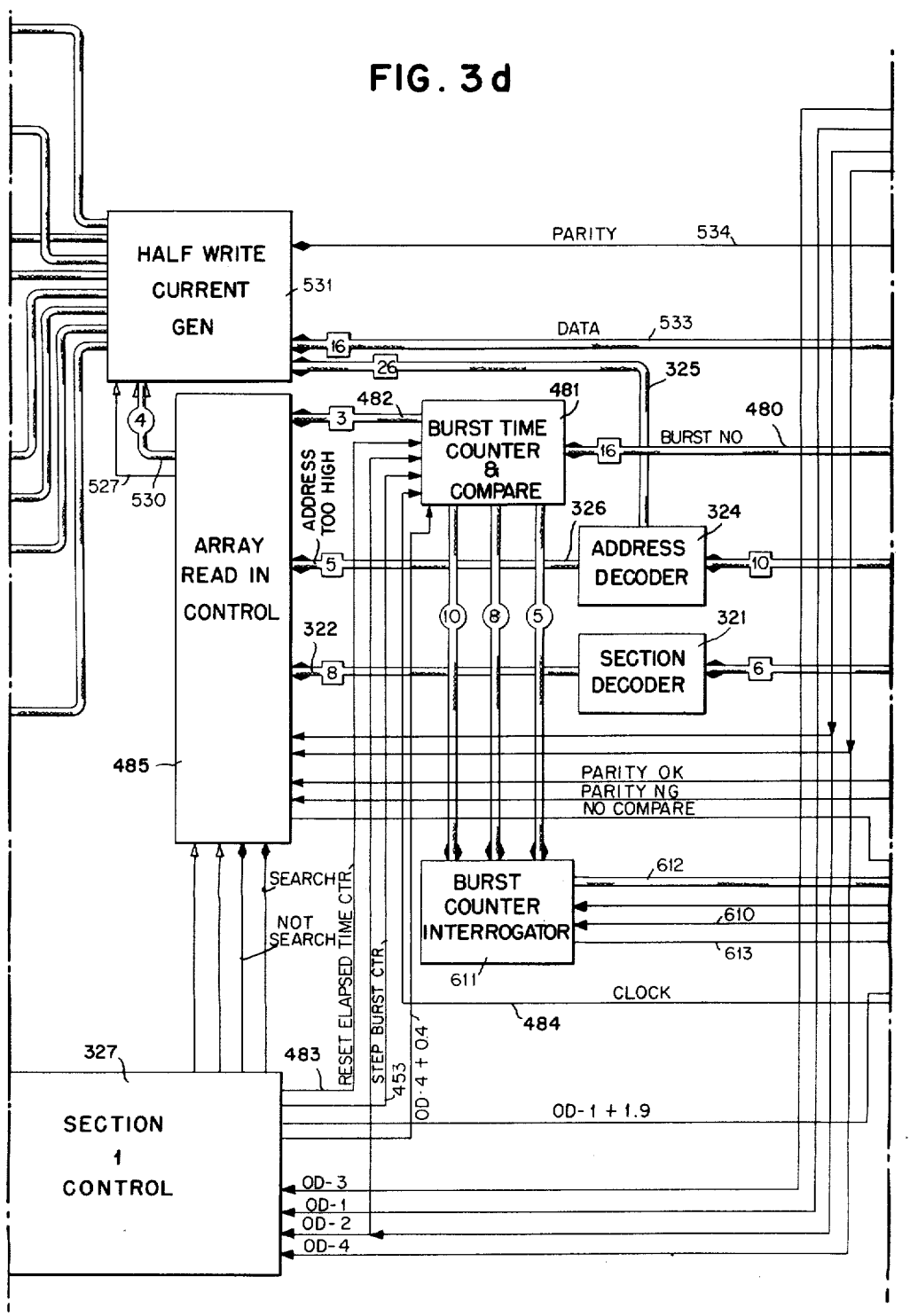
Figure 13A:
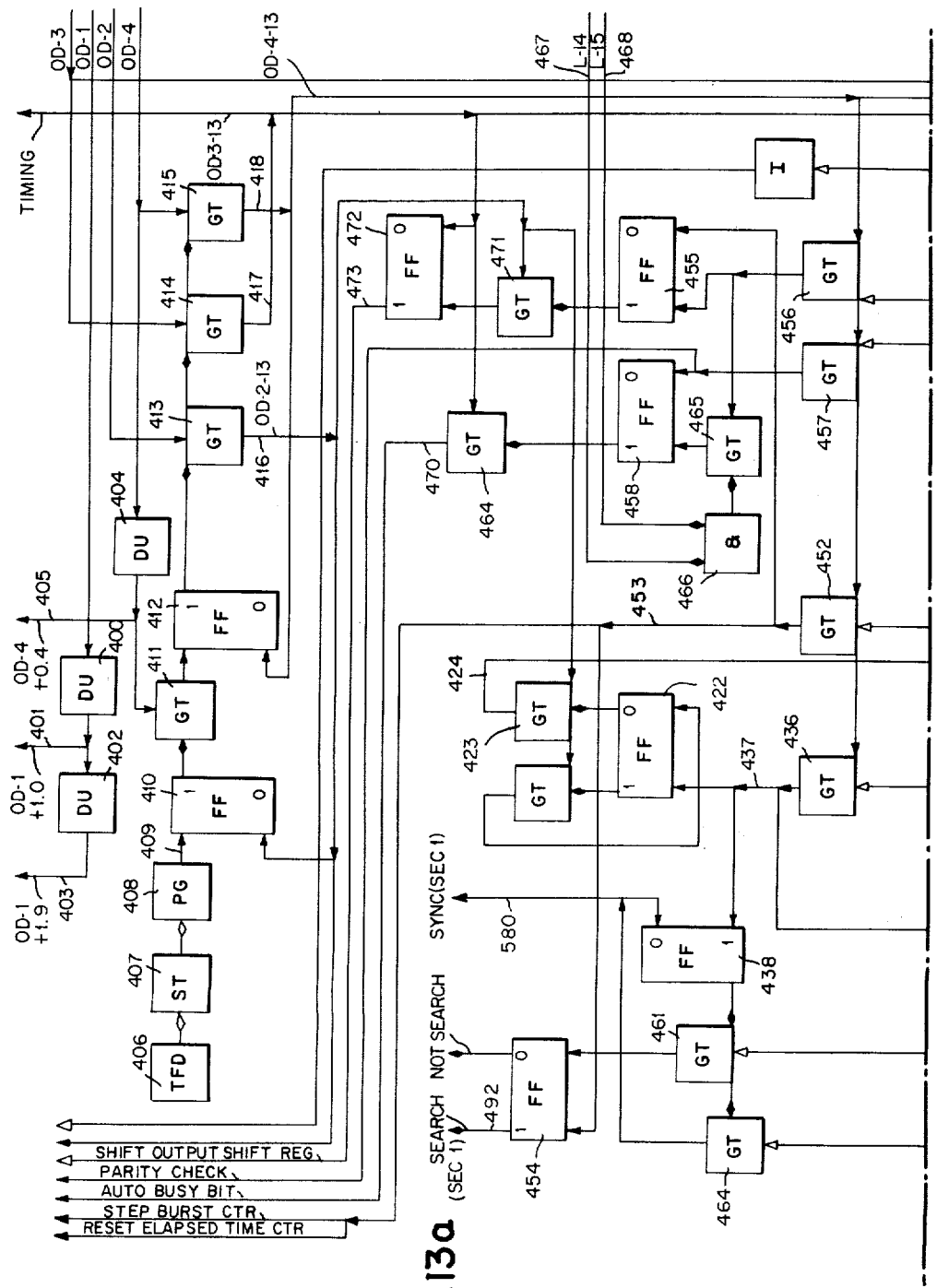

FIGS. 13a and 13b, when arranged one above the other, form a logical block diagram which illustrates in detail the Section 1 Control shown as block 327 in FIG. 3d.

FIGS. 14a and 14b, when arranged side by side in that order, form a logical block diagram of the Array Read In Control which is shown as block 485 in FIG. 3d.

FIG. 15 is a family of curves illustrating in idealized form the potentials at various points in the circuit of FIGS. 14a and 14b.

Figure 16B:
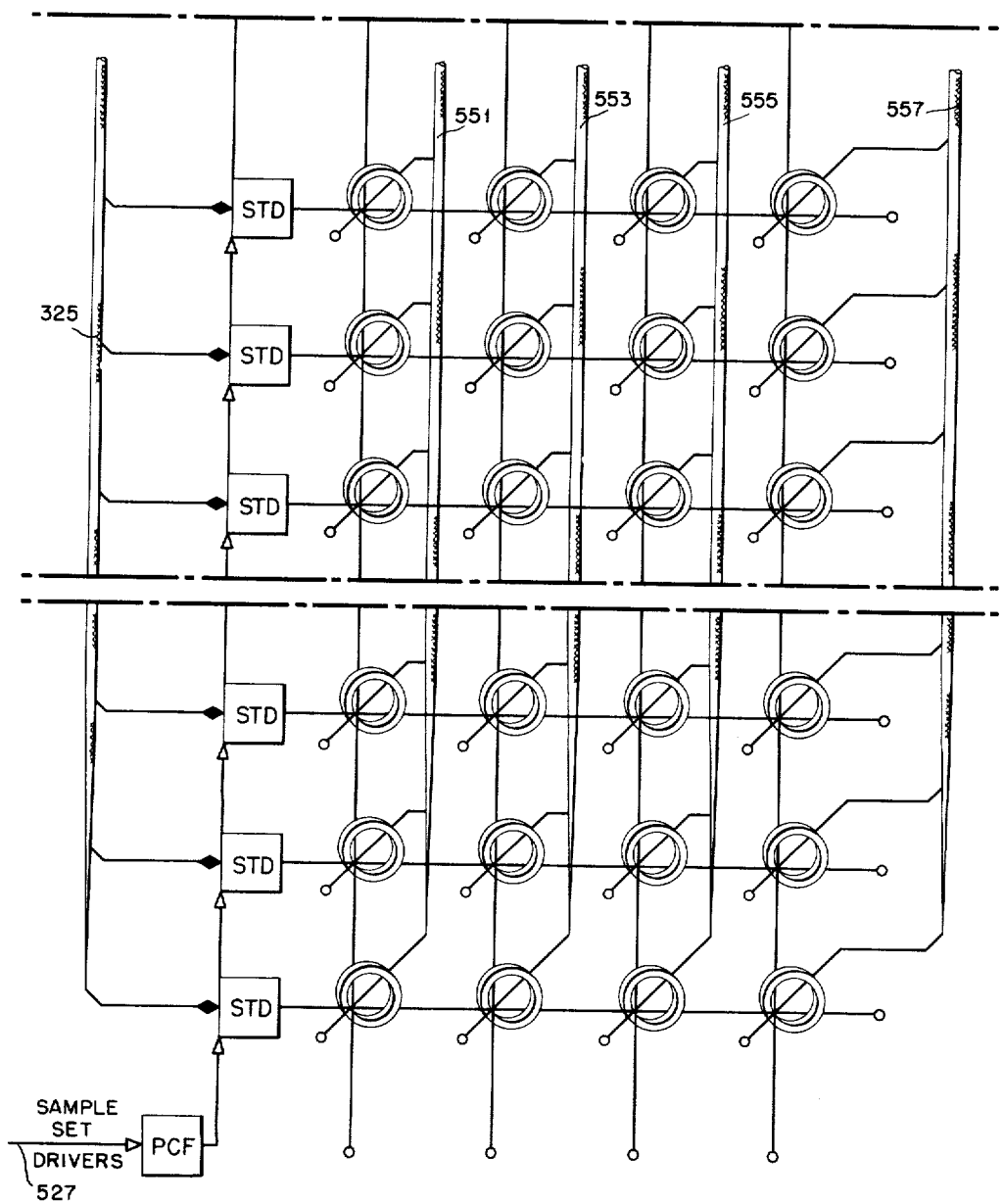

FIGS. 16a and 16b, when arranged one above the other, form a simplified schematic diagram of the Half-Write Current Generator shown as block 531 in FIG. 3d.

FIG. 17 is a simplified schematic diagram, partly in block form, of the Section 1 Array shown as block 560 in FIG. 3c.

Figure 18:
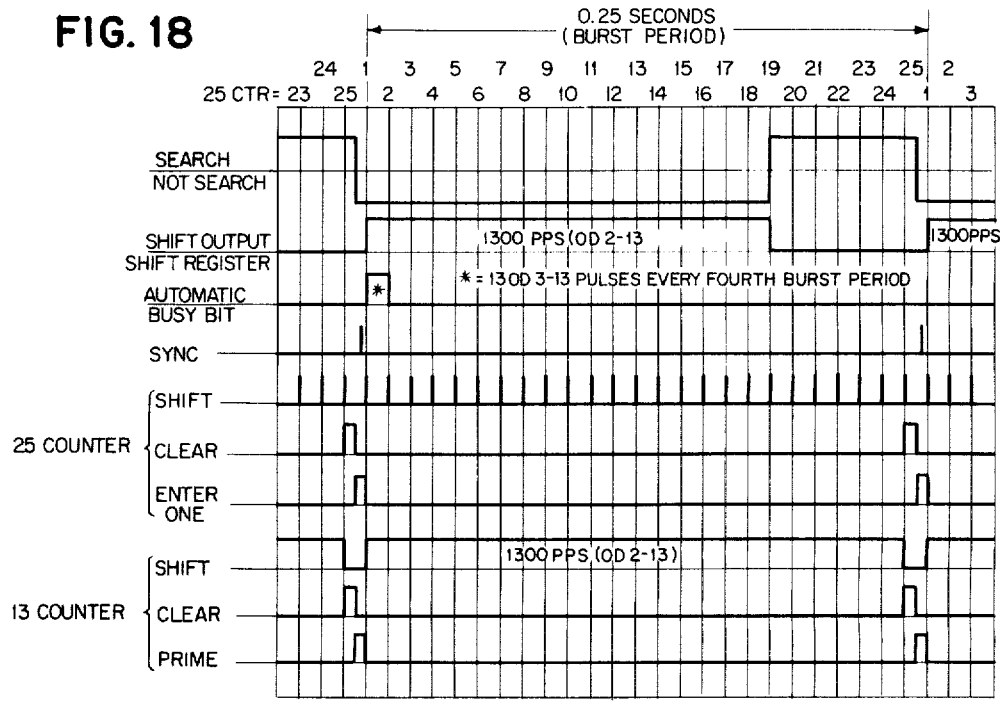

FIG. 18 is a family of curves which illustrates relative timing of operation in the Output System.

Figure 19:
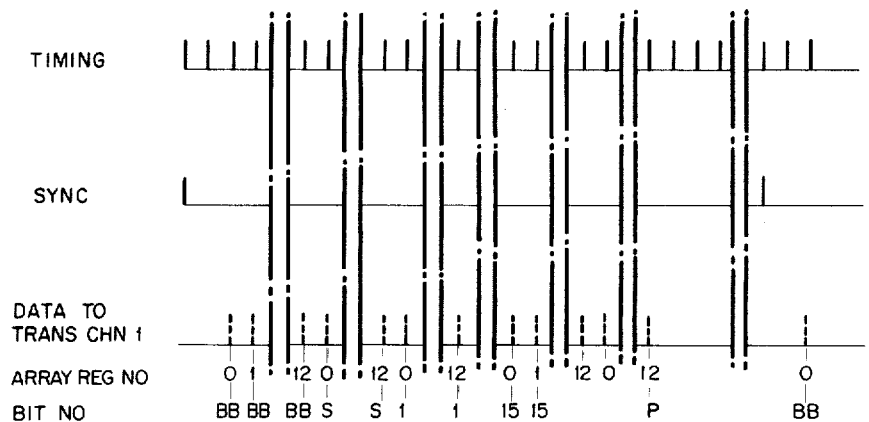

FIG. 19 is a family of curves illustrating the timing relationship of the Timing, Sync. and data signals which are delivered to the Transmission Channels.

Figure 20:
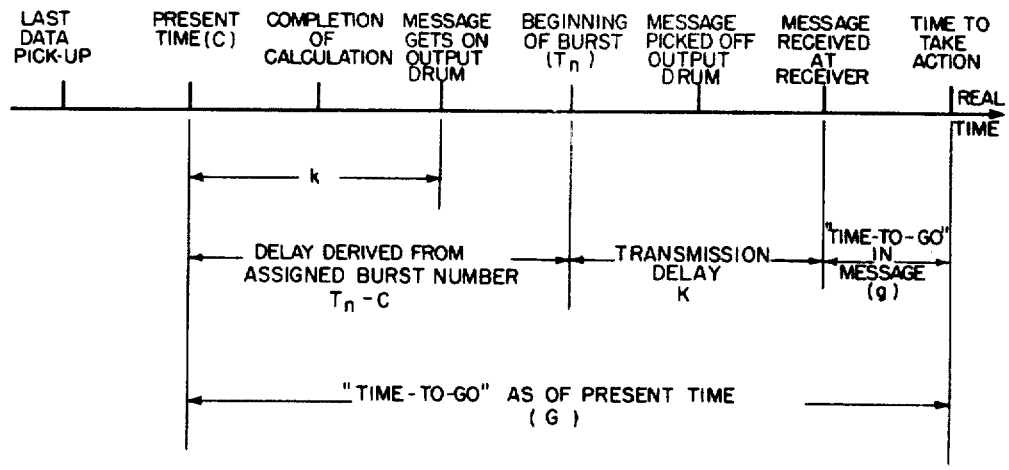

FIG. 20 is a timing chart (not to scale) that illustrates the various delays in the control system.

Figure 21:
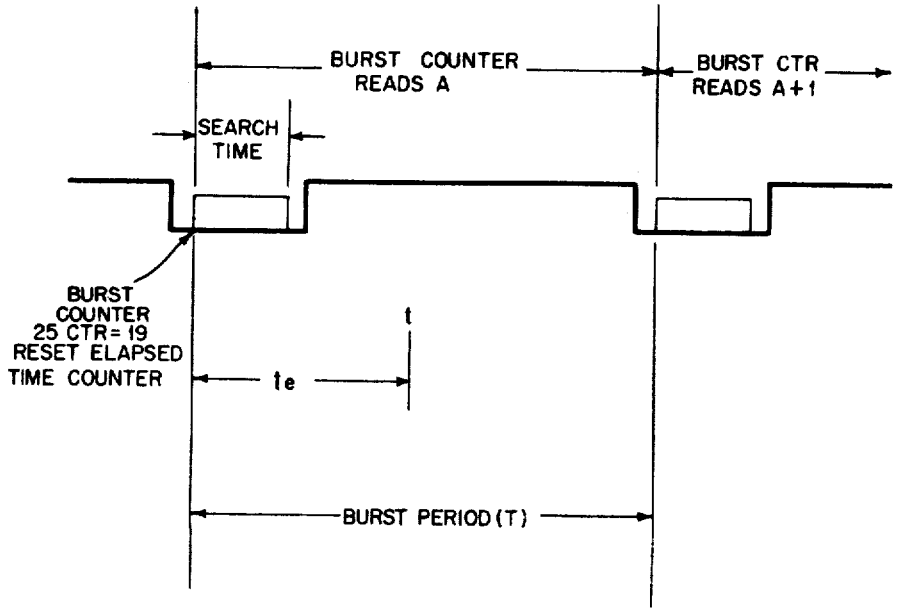

FIG. 21 is a chart which illustrates the significance of the number contained in the Burst Counter 481 (FIG. 3d) at various times during an Output System cycle.

Figure 22:
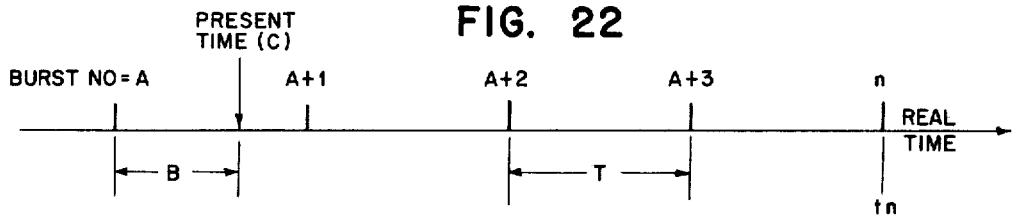

FIG. 22 is a timing chart which illustrates the computation of time delay before a given burst will be transmitted.

Figure 23:
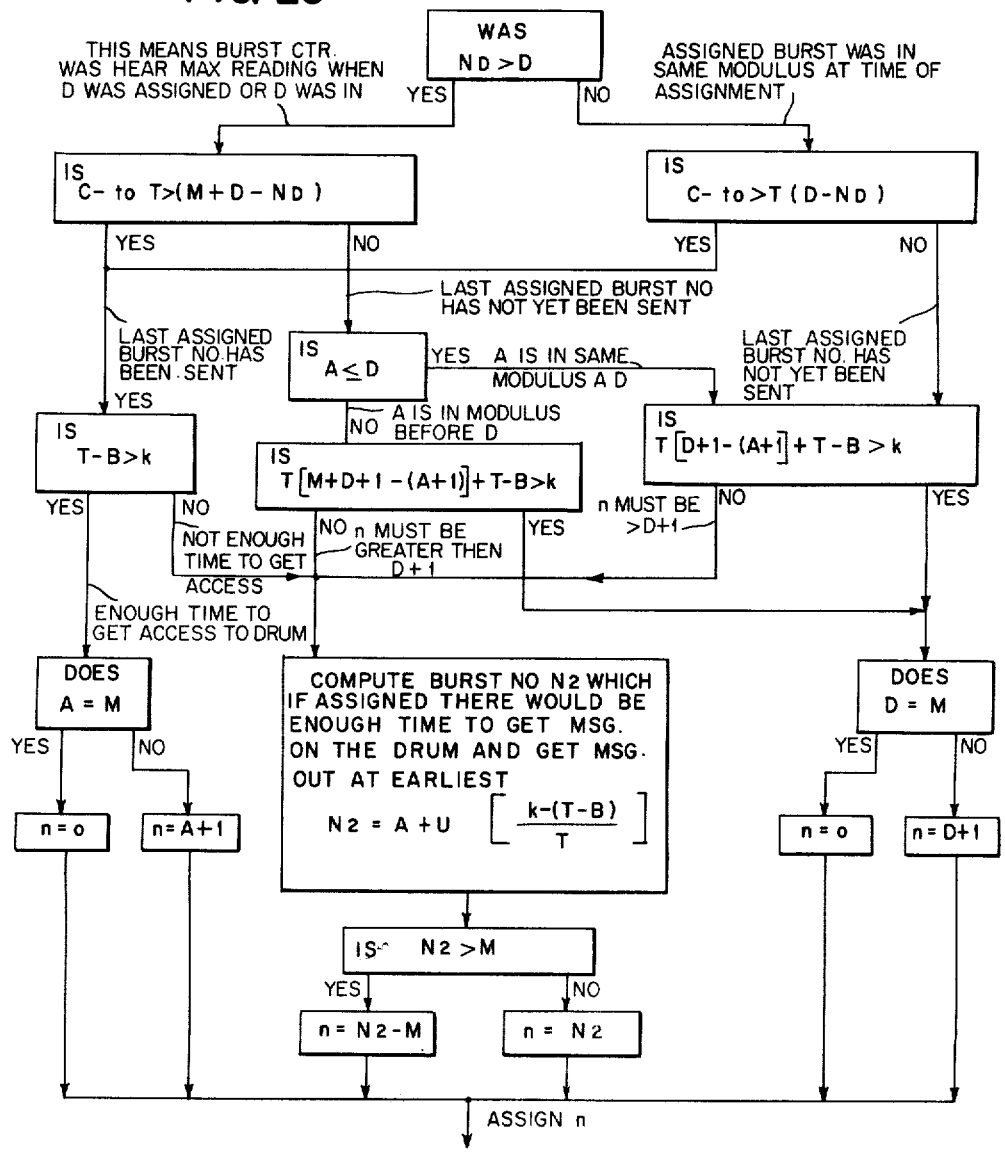

FIG. 23 is a flow chart which illustrates a possible way in which the calculation of the burst number to be assigned to an output message might be programmed.

Figure 24:
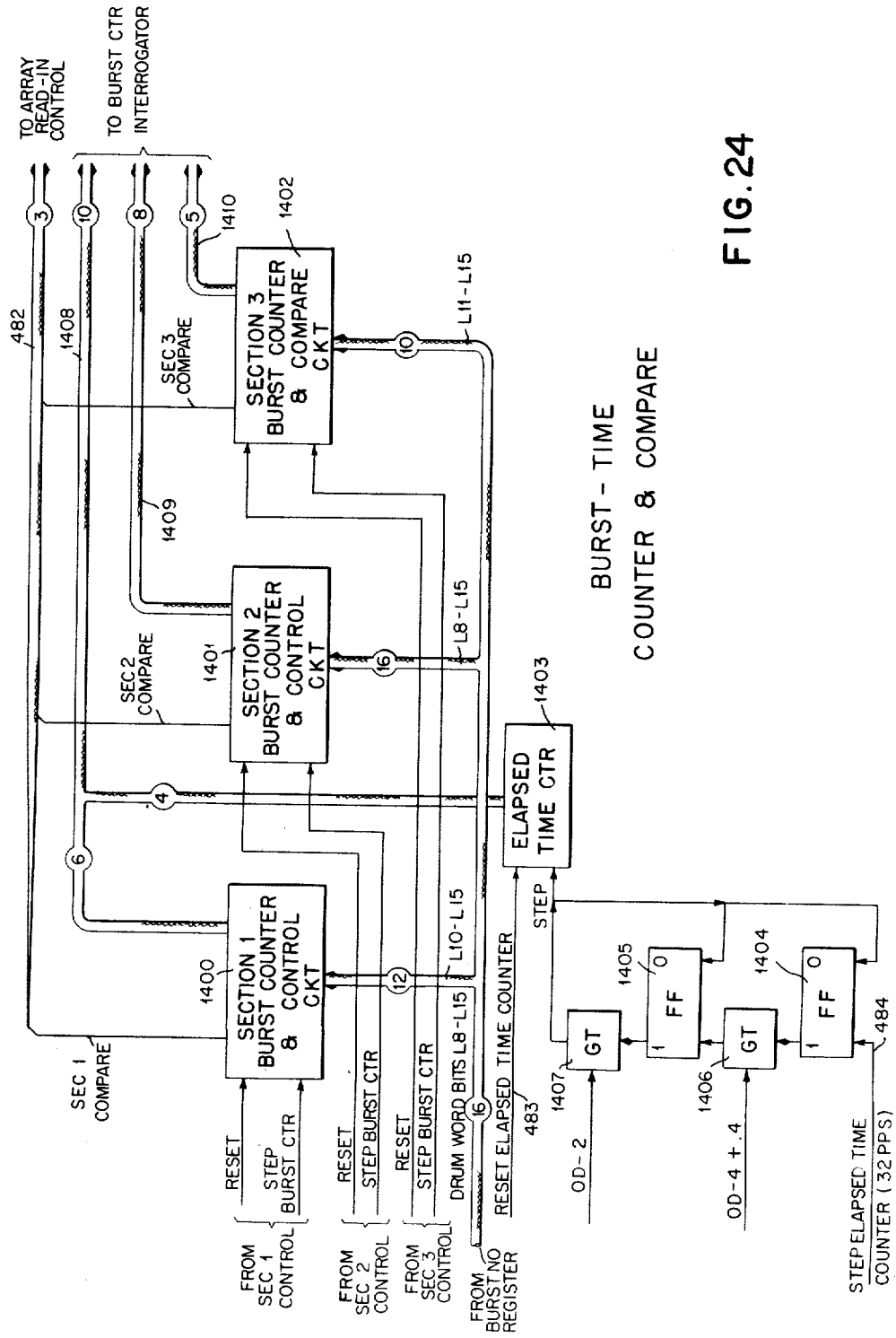

FIG. 24 is a functional block diagram of the Burst Time Counter and Compare Element shown as block 481 in FIG. 3d.

Figure 25:
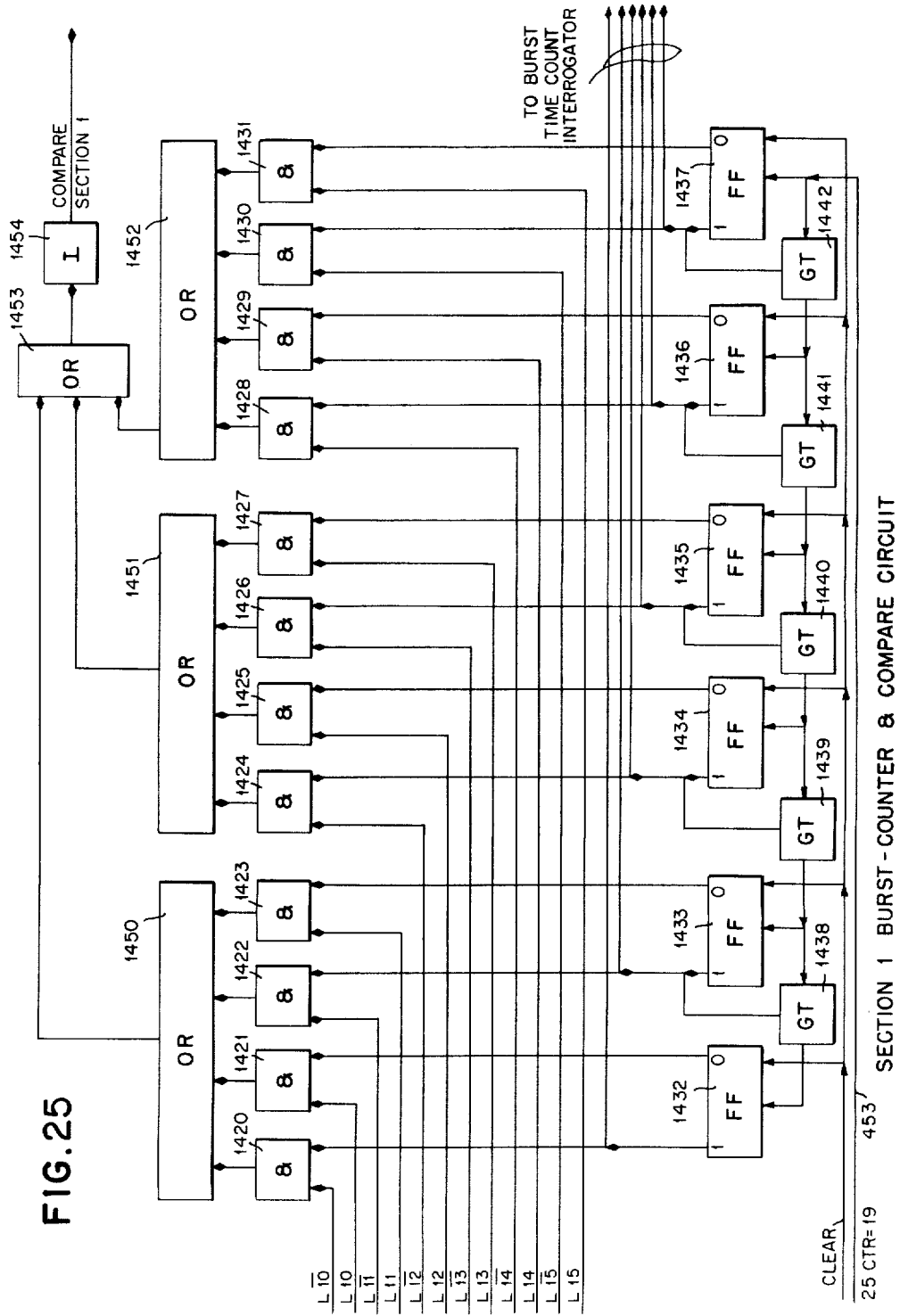

FIG. 25 is a logical block diagram of the Section 1 Burst Counter and Compare Circuit shown as block 1400 in FIG. 24.

FIG. 26 is a diagram partly in logical block form and partly in functional block form of the Burst Counter Interrogator indicated as block 611 in FIG. 3d.

CONVENTIONS EMPLOYED

Throughout the following description and in the accompanying drawings there are certain conventions employed which are familiar to certain of those skilled in the art. Additional information concerning those conventions is as follows:

In FIG. 1 of the drawing, each major part of the apparatus is shown as a block and data transfer and control between major parts is shown by single lines which interconnect those parts. Arrows on the lines of FIG. 1 indicate the direction of data transfer or control.

*In the Block Diagram figures of the drawing* subsequent to FIG. 1, a conventional filled-in arrowhead is employed on lines throughout the drawing to indicate (1) a circuit connection, (2) energization with standard positive pulses and (3) the direction of pulse travel which is also the direction of control. A conventional un-filled-in arrowhead is employed on lines throughout the drawing to indicate the same things indicated by a conventional filled-in arrowhead except that the un-filled-in arrowhead illustrates a non-standard pulse generally having a duration considerably longer than the pulse represented by a filled-in arrowhead. A diamond-shaped arrowhead indicates (1) a circuit connection and (2) energization with a D.C. level. Cables which are used to transfer data are shown as two parallel lines with the arrowheads at one end thereof and at some point intermediate the ends of those cables, the two parallel lines are widened either in the form of a circle or in the form of a rectangular box and numbers appear within the circle or the rectangular box. Cables employing the circle indicate that the lines or conductors of that cable convey information by the presence or absence of a pulse in parallel transfer whereas those cables having a rectangular box indicate that (1) if those lines are pulse lines, the lines of that cable convey information at different times or (2) that those lines are D.C. level conductors. The numbers appearing within the circle or the rectangular box of a cable indicate the numbers of conductors within the cable. The D.C. levels are on the order of 10 volts when positive and 30 volts when negative, whereas pulses indicated by conventional filled-in arrowheads are positive-going $\frac{1}{10}$ microsecond, half-sine 20 to 40 volts in amplitude. Pulses indicated by conventional un-filled-in arrowheads are not necessarily sinusoidal, are usually pulses considerably longer than $\frac{1}{10}$ microsecond in duration and those referred to hereinafter are in general on the order of 1 to 10 microseconds in duration. The input and output lines of the block symbols are connected to the most convenient side of the block including the same side in some cases. An input line to a corner of a block symbol and an output line from the adjacent corner of that block symbol indicates that the pulses or D.C. levels are applied to the input of the circuit represented by the block and the input conductor is electrically connected to the output conductor of the adjacent corner.

Bold face character symbols appearing within a block symbol identify the common name for the circuit represented, that is, FF identifies a flip-flop, GT a gate circuit, OR a logical OR circuit, and so forth. The character subscripts preceding bold face characters identify the model of the circuit identified by the bold face character, that it, $_A$FF identifies the model A flip-flop, $_C$FF identifies the model C flip-flop and so forth.

*In the description* the general arrangement of the apparatus of a preferred embodiment of this invention will first be described with respect both to the manner in which the various circuit components and apparatus are interconnected and in respect to the general over-all operation which is performed by these components and apparatus. The description of the general arrangement will be followed by separate and detailed descriptions of the various components and apparatus, which so require it, and each section of the description will have a heading which indicates the apparatus about to be described. The following is an Index or Table of Contents of the description:

TABLE OF CONTENTS

| | Column |
|---|---|
| Introduction to Control Equipment | 5 |
| Functional Description of Control Equipment | 7 |
| Input System | 7 |
| Drum System | 7 |
| Computer System | 9 |
| Memory Element | 12 |
| Computer System Timing | 12 |
| Table 1 (Machine and Memory Cycles) | 12 |
| Table 2 (Instructions) | 13 |
| Instruction Control Element | 15 |
| Table 3 (Class Cycle Matrix Codes) | 15 |
| Table 4 (Instruction Matrix Codes) | 16 |
| Command Generation | 17 |
| Table 5 (Commands Directly Generated by Time Pulse Distributor) | 18 |
| Table 6 (Commands Generated by PT Condition) | 18 |
| Table 7 (Core Memory Commands) | 18 |
| Table 8 (Commands Generated by Mult-OT Condition) | 18 |
| Table 9 (Commands Generated by wrt-PT or rds-PT Condition) | 19 |
| Table 10 (Commands Generated by Set PT or Set OT Condition) | 19 |
| Table 11 (Commands Generated by dvd-PT or tdv-PT Condition) | 20 |
| Table 12 (Commands Generated by nul-OT or tmu-OT Condition) | 21 |
| Table 13 (Consolidated List of Commands) | 22 |
| Common Commands | 23 |
| Table 14 (Commands Common to All PT Cycles) | 24 |
| Table 15 (Commands Common to All OT Cycles) | 24 |
| Read Operation from Input Drum | 25 |
| Load Address Counter Instruction | 25 |
| Table 16 (Unique Commands of ldc) | 25 |
| Select Drums Instruction | 26 |
| Table 17 (Unique Commands of sdr) | 26 |
| Read Instruction | 26 |
| Table 18 (Unique Commands of rds) | 27 |
| Table 19 (Break-In Commands) | 27 |
| Clear and Subtract Word Counter Instruction | 31 |
| Table 20 (Unique Commands of csw) | 32 |
| Determining Age of Input Words | 33 |
| Generation of Moving Object Control Signals | 33 |
| Writing Operation of the Output Drum | 34 |
| Table 21 (Unique Commands of wrt) | 35 |
| Table 22 (Break-Out Commands) | 35 |
| Reading from the Output Drum | 36 |
| Section 1 Control | 37 |
| Array Read-In Control | 39 |
| Half-Write Current Generator | 42 |
| Section 1 Array | 44 |
| Reading Signals from Section 1 Array | 45 |
| Summary of Output System Operation | 46 |
| Retaining Full Status of Drum Registers | 47 |
| Reading the Burst Counter and Elapsed Time Counter | 48 |
| Table 23 (Unique Commands of Select Instruction) | 49 |
| Calculation of Burst Number and Delay for Output Messages | 49 |
| Computer Instructions for Data Processing | 50 |
| Table 24 | 52 |
| Table 25 | 52 |
| Detailed Description of Components (Table of Cross-References) | 52 |
| Burst Time Counter and Compare | 53 |
| Section 1 Burst Counter and Compare Circuit | 54 |
| Burst Counter Interrogator | 55 |
| Table 26 | 56 |

INTRODUCTION TO CONTROL EQUIPMENT

Reference is made to FIG. 1 which shows in simplified block form the equipment comprising the invention. The Control Equipment may be considered as having four major systems, each system, each signal source and each controlled object being shown by a block symbol in FIG. 1.

FIG. 1 shows a SIGNAL SOURCE 1 and a SIGNAL SOURCE 2. There may be as many signal sources as required, that is, there may be a signal source for each object to be controlled, there may be several signal sources for any one object to be controlled or there may be one signal source for several objects to be controlled. The signal sources may be of any suitable form and their characteristics will be largely determined by the device or devices which are to be controlled. In the case that the controlled object is a moving object, such as an aircraft, and the control equipment is so constructed as to automatically deliver signals which indicate the degree of control to be effected upon the moving object, the signal sources may be suitable radar equipment so constructed as to produce signals representative of the instantaneous position or positions of the object or objects to be controlled.

The signals produced by the signal sources may be in serial digital data form and are transmitted to an INPUT SYSTEM 3 where, if in serial form, they are converted into parallel form and stored for subsequent delivery to a DRUM SYSTEM 4. Signals stored in the INPUT SYSTEM 3 are delivered to the DRUM SYSTEM 4 and written in parallel form into the first available empty drum register. These stored signals are processed by a COMPUTER SYSTEM 5 in accordance with a program and results of the computation (signals in parallel form) are delivered to the DRUM SYSTEM 4 where they are stored in the first available empty register. These signals representative of computations are read from the DRUM SYSTEM 4 to an OUTPUT SYSTEM 6 where the parallel signals are converted into serial signals and delivered to controlled moving objects 7 and 8.

As so far described, it will be apparent that the signals stored in the INPUT SYSTEM 3 will be delivered to the COMPUTER SYSTEM 5 with a variable time delay which is primarily a function of the rate at which reading operations of the COMPUTER SYSTEM take place, which are in turn controlled by the program.

Figure 2:
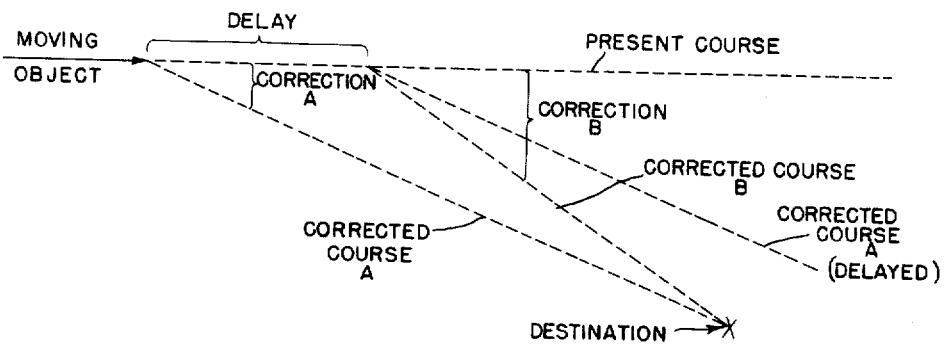
FIG. 2 is a diagram illustrating the effects of delays encountered in the transmission of signals in the equipment of FIG. 1.

Reference is now made to FIG. 1 and FIG. 2. It will be assumed that the SIGNAL SOURCE 1 produces signals indicating the successive instantaneous positions of the moving object, the last of which is shown by the head of the arrow in FIG. 2. If these instantaneous positions are delivered to the COMPUTER SYSTEM 5 without delay, the computer can generate a control signal having a magnitude indicated as Correction A in FIG. 2. This Correction Signal A if immediately received by the moving object will cause the moving object to move in a direction indicated in FIG. 2 as Corrected Course A and the moving object would arrive at the point marked Destination. However, if the instantaneous position of the moving object was delayed in transmission through the INPUT SYSTEM 3 and the DRUM SYSTEM 4, and the COMPUTER SYSTEM 5 generated the signal Correction A and immediately delivered that Correction A signal to the moving object, the moving object would move in the direction marked Corrected Course A Delayed and the moving object would not arrive at the destination.

In accordance with one of the features of this invention, each signal delivered from the INPUT SYSTEM 3 through the DRUM SYSTEM 4 to the computer has a time tag which accompanies it. With this time tag the COMPUTER SYSTEM 5 can detect the amount of delay which the input signal has had and generate a control signal (based upon predictions) having a magnitude indicated in FIG. 2 as Correction B and therefore the moving object will arrive at the destination by way of Corrected Course B.

From the above description with reference to FIG. 1 it will also be noted that signals produced by the COMPUTER SYSTEM 5, which are representative of final computations, are delayed in the DRUM SYSTEM 4 by an amount of time which is primarily a function of the rate at which the OUTPUT SYSTEM 6 accepts signals from the DRUM SYSTEM 4. These signals are also delayed by an amount of time determined by the empty and full status of the registers of the DRUM SYSTEM 4.

Referring again to FIG. 2 and assuming that the instantaneous position of the moving object is as shown by the arrow in FIG. 2 and the COMPUTER SYSTEM 5 generates a control signal having a magnitude indicated in FIG. 2 as Correction A, if this Correction A signal is immediately effective upon the moving object it will arrive at the destination as indicated by Corrected Course A in FIG. 2. However, if this Correction A signal is delayed in the DRUM SYSTEM 4 by the amount indicated in FIG. 2 then the path of the moving object would be as indicated in the drawing Corrected Course A Delayed, and the moving object would not arrive at the destination.

In accordance with another feature of this invention the COMPUTER SYSTEM 5 receives signals from the OUTPUT SYSTEM 6 which indicate the amount of delay which a signal now generated by the COMPUTER SYSTEM 5 will encounter. The COMPUTER SYSTEM 5 uses these signals from the OUTPUT SYSTEM 6 to make the necessary computations so that when generated control signals are effective upon the moving object it will move in the direction marked Corrected Course B in FIG. 2 and the moving object will arrive at the destination.

FUNCTIONAL DESCRIPTION OF THE CONTROL EQUIPMENT

Reference is now made to FIG. 3a through 3h which when arranged in accordance with FIG. 3 illustrates in block form the Control Equipment comprising this invention.

Input System

The INPUT SYSTEM referred to in FIG. 1 is shown in FIG. 3e to include a Range, Theta and Identity Section 9 and a Time Tag Section 10. The Range, Theta and Identity Section 9 receives signals from each of the SIGNAL SOURCES 1 and 2 (FIG. 1) by way of their corresponding group of three conductors, labeled Timing, Sync and Data.

Reference is now made to FIG. 4 which is a timing chart which shows the timing relationship between timing, sync and data signals. The input signals are in the form of pulses, the pulses appearing on the three separate input conductors. The first input conductor is called the timing input, the second input conductor is called the sync input and the third input conductor is called the data input. As shown in FIG. 4, successive pulses are received on the timing conductor. Coincident in time with one of the timing pulses, a sync pulse may occur on the sync input. In FIG. 4 the sync pulse is assumed to occur coincident in time with the timing pulse labeled ITP–1. Beginning with the third timing pulse following the sync pulse, a pulse or no pulse coincident in time with corresponding timing pulses will be received on the data input, the presence of a pulse indicating a binary ONE and the absence of a pulse indicating a binary ZERO. In FIG. 4 the data signals are shown as dotted lines to emphasize that there may or may not be a pulse at any of those indicated times. The bit coincident in time with timing pulse ITP–4 is called a "busy" bit and if there is a pulse in the busy bit, this pulse indicates that a message follows. A message is in digital form having two words and each word could be said to have two half-words. Bits 1 through 10, which are coincident in time with timing pulses ITP–5 through ITP–14, could be said to be the first half-word or left half-word and may be binary signals representing the R coordinate of the instantaneous position of the moving object. Bits 1 through 12, which are coincident in time with timing pulses ITP–15 through ITP–26, could be said to be the second half-word or right half-word and may be binary signals representing the theta coordinate of the instantaneous position of the moving object. In order to simplify the operational description, it will be assumed that the position of an object is defined in a plane. It will be understood however that in many applications the position will be in 3 dimensions. The bit coincident in time with ITP–27 is called a parity bit and is either a pulse or no pulse dependent upon the number of binary ones in the R data and theta data, that is, the sum of binary ones in R and theta and the parity bit is an even number. The presence of a pulse on the data conductor coincident with ITP–28 indicates that a second word occurs in the message. The second word may be representative of any desired information.

The second sync pulse occurs at ITP–53 time and the busy bit for the next message occurs at ITP–56 time. The second message, like the first message, could be said to have two words, each word having two half-words.

Referring back to FIGS. 3a through 3h, and particularly to FIG. 3e, the busy bits as well as the sync pulses and timing pulses are used in the Range, Theta and Identity Data Section for control purposes. This section of the INPUT SYSTEM also receives timing pulses (DTP pulses) and Demand pulses from the DRUM SYSTEM 4.

As will be described in greater detail hereinafter, as the magnetic drum of the DRUM SYSTEM 4 rotates, successive drum registers pass beneath the data writing heads and data reading heads. Each drum register occupies a space such that the register takes approximately 10 microseconds to pass beneath those reading and writing heads. During each of these 10 microsecond intervals four timing pulses (DTP1, DTP2, DTP3 and DTP4) are generated which are approximately 2.5 microseconds apart and appear on separate conductors. Of these drum timing pulses DTP1, DTP2 and DTP4 are delivered to the Range, Theta and Identity Section 9 for synchronizing operations therein. Each pulse received from the conductor labeled Drum Demand effectively requests the INPUT SYSTEM to deliver two successive 33 bit parallel words spaced 10 microseconds apart. The Range, Theta and Identity Section 9 also receives D.C. level signals from the Time Tag Section by way of conductors labeled Odd and Even. The Time Tag Section receives pulses from each of the conductors labeled One Pulse Every 8 Seconds and One Pulse Every .25 Second. This section is basically a binary counter which is reset to ZERO in response to a pulse on the conductor labeled One Pulse Every 8 Seconds and counts the pulses received from the conductor labeled One Pulse Every .25 Second. If the total number of binary ONES of the count is an even number, a positive D.C. level is delivered to the conductor labeled Even whereas if the total number of binary ONES in the count is an odd number, a positive D.C. level is delivered to the conductor labeled Odd. The Time Tag Section also receives Drum Timing pulses DTP1, DPT2 and DTP3 in order to synchronize the operation of that section with respect to the Drum System.

The INPUT SYSTEM functions as follows:

(1) The input data bits of a message are received in serial form and are stored in the Range, Theta and Identity Section for delivery in parallel form provided that the data bits are preceded by a busy bit pulse and the total number of binary ONES in the message is an even number.

(2) Provided that (a) data bits of a message have been stored and (b) a Drum Demand pulse is received, pulses representative of the Range and Theta data of the first word of the message are delivered to 22 of the conductors of cable 11 and 10 microseconds thereafter, pulses representative of the second word of the message are delivered to those conductors of cable 11.

(3) When pulses representative of the first or second word of a message are delivered to those 22 conductors of cable 11, pulses identifying which source that message came from are delivered to three of the other conductors of cable 11.

(4) Each time that pulses are delivered to the above mentioned 22 conductors of cable 11, a parity signal is delivered to still another conductor of cable 11. This parity signal will be a pulse if an odd signal is received from the Tim Tag Section and the total number of pulses delivered to the 22 conductors of cable 11 is an even number or if an even signal is received from the Time Tag Data Section and the total number of pulses delivered to the 22 conductors of cable 11 is an odd number. The parity signal will be a no pulse if an even signal is received from the Time Tag Data Section and the total number of pulses delivered to the conductors of cable 11 is an even number or if an odd signal is received from the Time Tag Data Section and the total number of pulses delivered to the 22 conductors of cable 11 is an odd number.

(5) Each time that pulses are delivered to the conductors of cable 11; (*a*) a pulse is delivered to the conductor labeled Data Available and (*b*) a pulse is delivered to the conductor labeled Time Tag Read-Out.

(6) In response to a pulse on the conductor labeled Time Tag Read-Out, the Time Tag Data Section delivers signals to the conductors of a cable 12 representative of the instantaneous count of One Pulse Every .25 Second pulses which have been received subsequent to the last pulse received from the conductor labeled One Pulse Every 8 Seconds.

Summarizing the operation of the INPUT SYSTEM, if the message has been received and checked for parity, and subsequent thereto a Drum Demand pulse is received, two 33 bit words are produced with a Data Available pulse accompanying each word. The bit assignment of the first word of each message produced by the INPUT SYSTEM are shown in FIG. 6.

Referring now to FIG. 6, starting from the left, the first bit (called the parity bit) is either a pulse or no pulse (binary ONE or ZERO) dependent upon the number of binary ONES in the remaining 32 bits of the word. The parity bit makes the total number of binary ONES in the 33 bit word an odd number. The left sign bit is meaningless while the L1 through L5 bits represent the binary count of the number of 1 pulses per .25 second pulses which have been received since the last received pulse of the 1 pulse per 8 second pulses. This count of the number of 1 pulse per .25 second pulses is called a "time tag" and as will be explained in greater detail hereinafter, this count can be used to determine the age of a word of data at the time that the word is used by the COMPUTER SYSTEM 5. The L6 through L15 bits are the bits of the left half-word of the first word of the message received by the INPUT SYSTEM. As noted with respect to FIG. 4, this half-word represents the R coordinate of the position of the moving object. The right sign bit is meaningless while the R1 through R3 bits are a binary code that indicates which one of the several SIGNAL SOURCES that particular word was received from. The R4 through R15 bits are the bits of the right half-word of the first word of the message received from the INPUT CHANNEL SECTION and may represent the θ coordinate of the position of the moving object.

The bit assignments of the second word of each message may be identical to the bit assignments of the first word. However, bits of the second word which correspond to the R and theta bits of the first word may be representative of information other than Range and theta, such as, for example, the amount of delay which this message has received prior to having been delivered to the INPUT SYSTEM. Although the time tag and the source identity information accompanies both the first word and the second word of the message, it will be understood that in certain applications the time tag and the source identity information need be sent with only one word of the message.

More detailed information concerning the INPUT SYSTEM and a preferred embodiment of the INPUT SYSTEM will be found in the above noted copending application "B."

Drum System

As previously noted with respect to FIG. 1, signals from the INPUT SYSTEM 3 are delivered to the DRUM SYSTEM 4. Those circuits of the DRUM SYSTEM 4 which deliver signals to or receive signals from the COMPUTER SYSTEM are designated CD (Computer and Drum Interchange) whereas those circuits of the DRUM SYSTEM which deliver signals to or receive signals from systems other than the COMPUTER SYSTEM are designated OD (Outside and Drum Interchange). As illustrated in FIGS. 3e and 3f, the DRUM SYSTEM 4 may be considered as including (1) an OD DRUM WRITE ELEMENT 13, (2) a CD DRUM READ ELEMENT 14, (3) an OD DRUM READ ELEMENT 15, (4) a CD DRUM WRITE ELEMENT 16, (5) a DRUM AND HEAD ASSEMBLY 17 and (6) a DRUM COMMON ELEMENT 18.

As the drum rotates, a portion of the drum surface (known in the art as a timing channel) passes beneath a reading head 19. This timing channel is indicated in FIG. 3 as a dotted line, labeled accordingly, and is in reality merely a succession of magnetized spots. These spots are recorded on the drum surface in such a manner that when the drum rotates a sine wave signal is induced in the read head 19. Each magnetized spot of the timing channel occupies a space indicating a drum register. As a magnetized spot passes underneath the read head 19 one sine wave cycle of voltage is induced in the winding of that read head. Assuming that there are 2,048 equidistantly spaced spots in the timing channel, the drum is said to have a closed timing channel and 2,048 registers. As the drum rotates, another portion of the drum surface (designated as an index channel) passes underneath another read head 20 and still another read head 21. This index channel is indicated in FIG. 3 as a dotted line, labeled accordingly, and is in reality merely a succession of equidistantly spaced magnetized spots with one of those spots being magnetized in the opposite direction with respect to all other spots. When this one magnetized spot passes underneath the read head 20 and read head 21, one sine wave of voltage of opposite phase with respect to the other cycles is induced in the windings of each of those read heads. These heads are circumferentially displaced so that this unique sine wave is induced in those heads at different times.

Since the timing channel effectively divides the drum surface into 2048 equidistantly spaced registers around the circumference of the drum, the oppositely polarized spot in the index channel when received by the read head 20 is arbitrarily said to be the zero register and the oppositely polarized spot when received by the read head 21 coincides in time with the last or 2047th register.

The signals induced in the read heads 19, 20 and 21 are delivered to a Timing and Index circuit 22. For the purposes of the immediate description this timing and index circuit is capable of performing the following functions:

(1) Upon receipt of each cycle of voltage from the read head 19, the previously noted DTP1 through DTP4 pulses are generated, and (2) In response to the cycle of voltage received from the read head 20 which is of opposite phase to all other cycles, the TIMING AND INDEX CIRCUIT produces a pulse on the conductor labeled CD IX hereinafter referred to as the CD index pulse and this pulse occurs coincident in time with one of the DTP1 pulses, and (3) In response to the cycle of voltage induced in the read head 21, which is of opposite phase, the TIMING AND INDEX CIRCUIT produces a pulse on the conductor labeled OD IX, hereinafter referred to as the OD index pulse and this pulse occurs coincident in time with one of the DTP3 pulses.

As the drum rotates still another portion of the drum surface (referred to hereinafter as OD STATUS CHANNEL) passes beneath a read head 22 and a write head 23. The OD STATUS CHANNEL is also a succession of magnetized spots representative of binary ONES and binary ZEROS. A binary ZERO recorded in the OD STATUS CHANNEL indicates that the register of the drum which corresponds to that bit is empty whereas a binary ONE recorded in the OD STATUS CHANNEL indicates that the register corresponding to that bit is full.

As the drum rotates still another portion of the drum surface (hereinafter referred to as the CD STATUS CHANNEL) passes beneath a write head 24 and a read head 25. The CD STATUS CHANNEL is also a succession of magnetized spots. A binary ONE recorded in the CD STATUS CHANNEL indicates that the register corresponding to that bit is full, whereas a binary ZERO recorded in the CD STATUS CHANNEL indicates that the register corresponding to that bit is empty.

Signals from the read head 22 are delivered to an OD WRITE STATUS CONTROL SECTION 26 of the INPUT DRUM WRITE ELEMENT 13. The OD WRITE STATUS CONTROL SECTION 26 in addition to receiving the signals from the OD STATUS CHANNEL receives the previously mentioned Data Available signals from the Range, Theta and Identity Section 9 of the INPUT SYSTEM 3 and also receives DTP and OD index pulses as well as Status Write Sample pulses.

The OD WRITE STATUS CONTROL SECTION 26 functions as follows:

(1) If a ZERO signal or no signal is received from the read head 22 (indicating that the next register which is available to be written into either contains no word or a word which has already been transferred from the drum) a Demand pulse at DTP3 time is applied to the conductor labeled Drum Demand provided that this next register is an even numbered register.

(2) If a binary ONE signal is received from the read head 22 (indicating that the next register which is available to be written into contains a word which has not yet been transferred from the drum) a Write a One signal at DTP3 time is applied to the write head 24.

(3) If a pulse is received from the conductor labeled Data Available, a write pulse at DTP3 time is applied to the conductor labeled Write followed by a reset pulse at DTP4 time being applied to the conductor labeled Reset, and a Write a One signal at DTP3 time is applied to the write head 24.

(4) If a ZERO signal or no signal is received from the read head 22 and no Data Available pulse is received in response to the pulse on the conductor labeled Drum Demand, a Write a Zero signal beginning at DTP3 time is applied to the write head 24.

The OD DRUM WRITE ELEMENT 13 also includes an OD WRITE SECTION 27 which receives 33 bit word signals from the INPUT SYSTEM 3, stores those signals and in response to the Write pulse from the OD WRITE STATUS CONTROL SECTION 26 it delivers signals representative of the 33 bit word to a set of write heads 28 which are positioned adjacent to an input drum field 29.

The circuits involved in the operation of writing two successive words in adjacent registers of the drum on a "Status" basis are described in detail in the above noted copending application "G."

Signals recorded in the CD STATUS CHANNEL are delivered from the read head 25 to a CD READ STATUS CONTROL SECTION 30 of the CD DRUM READ ELEMENT 14. The CD READ STATUS CONTROL SECTION 30 also receives timing pulses from the Timing and Index Circuit 22. The CD READ STATUS CONTROL SECTION 30 performs the following functions:

(1) Provided that a read signal (positive 10 volts) is received from a conductor labeled Read, and a binary ONE signal (indicating a full register) is received from the read head 25, then a pulse is delivered to the conductor labeled Read Sample. If no pulse is received on the conductor labeled No Compare before the next DTP3 pulse following the Read Sample pulse, then a Write a Zero signal is delivered to the write head 23. If a pulse is received on the conductor labeled No Compare before the next DTP3 pulse following the Read Sample pulse, then a Write a One signal is delivered to the Write head 23.

(2) Provided that a read signal is received from the conductor labeled Read, and a binary ZERO signal (indicating an empty register) is received from the read head 25, then NO pulse is delivered to the conductor labeled Read Sample and a Write a Zero signal is delivered to the write head 23.

(3) Provided that a no read signal (−30 volts) is received from the conductor labeled Read then (*a*) if a binary ONE signal is received from the read head 25, a Write a ONE signal is delivered to the write head 23 and (*b*) if a binary ZERO signal is received from the read head 25, a write a Zero signal is delivered to the write head 23.

The CD DRUM READ ELEMENT 14 also includes an INPUT READ SECTION 31 which receives signals from the read heads 31*a* and delivers those signals in the form of .1 microsecond pulses to the conductors of cables 32 and 33 provided that a Read Sample pulse is received from the CD READ STATUS CONTROL SECTION 30.

*Computer System*

As noted above, reading operations from the drum require control signals on the conductor labeled Read and No Compare. These control signals result from operations within the COMPUTER SYSTEM 5 of FIG. 1. The COMPUTER SYSTEM shown as block 5 in FIG. 1 is shown in more detail in FIGS. 3*a*, 3*b*, 3*g* and 3*h*.

*Memory Element*

The COMPUTER SYSTEM includes a MEMORY ELEMENT 34 which functions as follows:

(1) In response to a pulse on a conductor 59 followed by a pulse on the conductor 36, the signals, stored in the particular memory register defined by the signals on the conductors of a cable 37, are delivered to the conductors of a cable 38 and a cable 39. The signals delivered to the conductors of cable 38 represent the left half-word of the word stored in the particular memory register whereas the signals delivered to the conductors of cable 39 represent the right half-word. This operation will hereinafter be referred to as reading a word from memory. This operation does not take place if a pulse is received on the conductor 40.

(2) In response to a pulse on the conductor 59 followed by a pulse on each of the conductors 36 and 40, the signals received from the conductors of a cable 41 and a cable 42 are stored in the memory register defined by the signals on the conductors of cable 37. This operation will hereinafter be referred to as storing a word in memory.

More detailed information concerning the Memory Element 34 and a preferred embodiment will be found in the above noted copending application "D."

As a result of the operation of reading a word from memory, the left half-word and the right-half word are delivered by way of the conductors of cables 38 and 39 to a Left Memory Buffer Register 43 and a Right Memory Buffer Register 44, respectively. In response to a pulse on the conductor labeled Left Memory Buffer Register to Operation Register, bits 1 through 10 of the left half-word stored in the Left Memory Buffer Register 43 are delivered by way of the conductors of a cable 46 to an Operation Register 47 and bits 10 through 15 are delivered by way of the conductors of a cable 48 to a Selection and Input-Output Control Element 49.

*Computer System Timing*

Signals stored in the Operation Register 47 are delivered by way of the conductors of cable 50 to an INSTRUCTION CONTROL ELEMENT 51. The INSTRUCTION CONTROL ELEMENT generates various pulses dependent upon the signals received from the Operation Register 47. These pulses are delivered to units of the COMPUTER SYSTEM to cause various operations in a manner to be described in detail hereinafter. The relative occurrence times of these pulses with respect to other COMPUTER SYSTEM events are shown in FIG. 7. In FIG. 7 it will be seen that there are 15 time pulses in a machine cycle. Instruction pulses are numbered in the following manner: IP1, IP2, IP3, IP4, IP5, IP6, IP6A, IP7, IP8, IP8A, IP9, IP10, IP11 and IP11A. A similar method of numbering is utilized for the time pulses (TP's). A machine cycle begins with IP1 and ends with IP11A at which time the cycle is resequenced from 1 through 11A for the next machine cycle. TP and IP pulses are usually generated simultaneously.

The minimum time between successive words read from or written into the MEMORY ELEMENT 34 is called a memory cycle. As illustrated and described herein the time interval of a memory cycle is 7½ microseconds. The time pulses (shown as occurring at ½ microsecond intervals along the horizontal axis of FIG. 7) establish approximate relationships between events in the memory cycle and in the machine cycles. Except for those pulses which coordinate and synchronize the core memory with respect to the COMPUTER SYSTEM, the internal memory timing is independent of the time pulses. The machine cycle comprises an interval of time equal to the memory cycle and its events are controlled by the TP or IP pulses described above. Although the machine cycle is of the same duration as the memory cycle, the two should be distinguished since in certain program instructions, information from core memory is not used.

Operation of the COMPUTER SYSTEM may also be discussed in terms of an instruction cycle. An instruction cycle is defined as that time required for the COMPUTER to execute one complete instruction and is usually composed of from one to three machine cycles. Of the many instructions which may be performed by the COMPUTER SYSTEM some involve simple operations such as setting up control circuits or transferring words between registers. Because of this simplicity of operation, these instructions are completed in one memory cycle, or less, and are called "one-memory-cycle instructions."

Some of the many instructions require two memory cycles for completion and these instructions are called "two-memory-cycle instructions." Before such instructions can be completed, an operand must be obtained from the MEMORY ELEMENT 34 and therefore a second memory cycle is provided and during this second memory cycle the operand is obtained and the instruction completed. Still other instructions require three memory cycles for completion; the instruction word is obtained and decoded during the first memory cycle; an operand is obtained and the required operation is performed during the second memory cycle; and the result of the operation is stored in the MEMORY ELEMENT during the third memory cycle. The memory or machine cycles which compose the instruction cycle, have been assigned distinctive names for easy reference. The names and characteristics of these are listed in Table 1 below:

TABLE 1.—NAMES AND CHARACTERISTICS OF MACHINE OR MEMORY CYCLES

| Memory or Machine Cycle | Name | Characteristic |
| --- | --- | --- |
| First | Program Time (PT) | Decodes instruction and initiates execution. |
| Second | Operate Time A (OTA) | Obtains operand and performs operation. If no operate time B follows, this cycle is called simply operate time. |
| Third | Operate Time B (OTB) | Stores result of operation in core memory. |

Although a machine cycle begins with TP–0, an instruction cycle starts with IP7 of a program time cycle which is denoted PT7. FIG. 8 shows the basic machine and instruction cycle timing relationships. In FIG. 8 the instruction cycles are shown as cross-hatched areas on the sequence of the machine cycles.

Thus in a one-memory cycle instruction, the decoding process starts at PT7 and the instruction is completed by PT6 of the subsequent machine cycle and the decoding of the next instruction is initiated at this time. Similarly, a two-memory-cycle instruction starts at PT7, continues through the subsequent OTA cycle and is completed by PT6 of the next PT cycle, when the execution of the next instruction begins. As has been noted, the time from IP1 to IP6 of a program time cycle is used to complete an instruction previously begun and this time interval is also utilized to bring the new instruction out of the MEMORY ELEMENT 34.

An exception to the usual sequence of machine cycles as described above occurs in certain instructions performed by the COMPUTER SYSTEM. In these instructions additional time is required for the performance of a series of repetitious operations. Such operations are multiplication, which requires repeated addition; and division, which requires repeated subtraction. This additional time is supplied by stopping the generation of IP pulses thus stopping the operation of instruction and machine cycle sequences. This stoppage is known as "Pause" since the COMPUTER SYSTEM pauses in its usual sequential operation long enough to complete the repetitious operations. An example of an instruction cycle utilizing a pause is depicted in the last diagram of FIG. 8. In the illustration, the decoding of the instruction begins at PT7; the operand (in this case either the multiplicand or the divisor) is obtained during the subsequent OTA cycle. At the end of the OTA cycle, the generation of instruction pulses is stopped and the COMPUTER SYSTEM goes into a pause, the duration of which is determined by the particular instruction being executed. The repetitious additions or subtractions composing the multiplication or division, for example, are executed during this period. The "pause" condition then ends and the program time cycle begins, completing the instruction by PT6.

An instruction word is read from the MEMORY ELEMENT 34 during each program time cycle. This word contains coded information which specifies the particular operations that the CENTRAL COMPUTER is to perform during the ensuing cycle. As stated in the preceding paragraph this cycle normally begins at PT7, when decoding of the instruction word is just beginning. The decoding of the instruction word takes place principally in the INSTRUCTION CONTROL ELEMENT 51. The 32 bits of the instruction word are given names to facilitate reference or discussion; these names are shown in FIG. 9.

Referring now to FIG. 9, the 32 bit instruction word is divided into two 16 bit half-words termed respectively the left and right half-words. Each half-word consists of the sign bit and 15 numerical bits which are designated LS, L1, L2, . . . L15 for the left half-word and RS, R1, R2, . . . R15 for the right half-word. The left half-word is sometimes called the operation part of the word and the right half-word the address part. Bits L1 through L3 are termed the "Index Indicator" since they are used to specify which one of several index registers is to be used during indexing. Indexing provides a means of altering or cycling the COMPUTER SYSTEM program for repetitive operation and is more fully described in the above referred to copending application "D."

Bits L4 through L10 are termed the "operation code." These bits determine which one of the many instructions is to be performed. Bits L4 through L6 specify one of 8 classes of instructions whereas L7 through L10 specify one of the variations of the basic instruction class. Bits L10 through L15 are termed the index interval and are used to provide additional information required by particular instructions as described in greater detail in the previously referred to copending application "D." Bits L10 through L15 are also used for selection of one of the several input or output devices as will be subsequently described. Bit 10 is utilized in both the operation code and the index interval. However this causes no ambiguity for whenever the index interval is used by an instruction, bit 10 is not used to identify the instruction involved. Thus when the whole index interval is utilized, the appropriate instruction is completely specified by only those bits of the operation code instead of the usual seven.

The right half-word of the instruction word usually denotes the location in the MEMORY ELEMENT 34 where data may be stored or from which additional pertinent data may be obtained. This additional data usually takes the form of an operand required in the execution of a mathematical operation. In certain instructions the right half-word is used to load some of the registers within a PROGRAM ELEMENT 46 (FIG. 3h). The address part of an instruction word is meaningless in certain instructions since no reference to a memory unit is required. An example of this is the Clear and Subtract Word Counter instruction. In this case no new information from memory is necessary and there is no new information to be stored in memory and therefore the address part is extraneous and meaningless.

For the purpose of illustrating and describing this invention, the following table lists by name and code number those instructions which will be specifically described subsequently. It is to be understood that in many practical embodiments of this invention, many other instruction operations may be preformed by the Equipment.

they will cause various ones of its output conductors to be pulsed. The particular ones of those conductors which are pulsed is dependent upon which of the various output conductors from a Cycle Control Circuit 54, a Class Cycle Matrix 55 and a Variation Matrix 56 are positive. It should be noted that various output conductors of the Class Cycle Matrix 55 and the Variation Matrix are applied to the input of an Instruction Matrix 57 whose outputs are connected to the Command Generator 53. It should be further noted that a Memory Unit Selector 58 has its outputs also connected to the Command Generator 53.

The Class Cycle Matrix 55, which is essentially a decoder and preferably of the conventional diode type, receives bits 4 through 6 of the Left half-word of an instruction. As previously noted, these bits specify one of several classes of instruction. The Class Cycle Matrix also receives signals from the Cycle Control Circuit 54. The output conductors of the Class Cycle Matrix are appropriately labeled in accordance with the conditions under which those conductors will be positive.

The following table shows which combination of positive potentials on input conductors will produce a positive potential on a given output conductor of the Class Cycle Matrix 55:

TABLE 2

| Class | Binary Code | Variation | Binary Code | Abbrev. |
|---|---|---|---|---|
| MISCELLANEOUS | 000 | Program Stop | 0000 | hlt |
| | | Clear and Subtract Word Counter. | 0100 | csw |
| ADD | 001 | Clear & Add | 0000 | cad |
| | | Add | 0001 | add |
| | | Twin & Add | 0010 | tad |
| | | Clear & Subtract | 0110 | csu |
| | | Subtract | 0111 | sub |
| | | Twin & Subtract | 1000 | tsu |
| | | Clear & Add Magnitude | 1100 | cam |
| | | Difference Magnitude | 1101 | dim |
| MULTIPLY | 010 | Multiply | 1010 | mul |
| | | Twin & Multiply | 1011 | tmu |
| | | Divide | 1100 | dvd |
| | | Twin & Divide | 1101 | tdv |
| STORE | 011 | Store | 0101 | fst |
| | | Left Store | 0110 | lst |
| | | Right Store | 0111 | rst |
| | | Store Address | 1000 | sta |
| | | Right Add ONE | 1001 | adr |
| | | Exchange | 1010 | ech |
| INPUT-OUTPUT | 110 | Load IO Address Counter | 0000 | ldc |
| | | Select Drum | 001– | sdr |
| | | Select | 010– | sel |
| | | Read | 1110 | rds |
| | | Write | 1111 | wrt |

*Instruction Control Element*

As previously noted with respect to FIG. 3a, the signals stored in the Operation Register 47 are delivered to the INSTRUCTION CONTROL ELEMENT 51. Although the ONE and ZERO signals of each of the 10 bits stored in the Operation Register are delivered by way of the 20 conductors to the INSTRUCTION CONTROL ELEMENT 51, bits 1 through 3 will receive no further consideration herein since their purpose is fully described in the previously mentioned copending application "D."

Reference is now made to FIGS. 10a, 10b and 10c which, when arranged end to end in that order, illustrate in logical block form the INSTRUCTION CONTROL ELEMENT shown as block 51 in FIG. 3a.

A Time Pulse Distributor 52, in response to a positive D.C. level on the conductor labeled Break or No Pause and pulses on the conductors labeled IP Driver and TP Driver, causes the IP conductors as well as the TP conductors to be sequentially and cyclically pulsed. The IP pulses are delivered to a Command Generator 53 where

TABLE 3

| Output Conductor | Positive Potentials on Input Conductors— | |
|---|---|---|
| | Code from Operation Register | From Cycle Control Circuit |
| MISC-OT | 000 | OT. |
| IO-OT | 110 | OT. |
| ADD-PT | 001 | PT. |
| ADD-OT | 001 | OT. |
| MULT | 010 | |
| MULT-PT | 010 | PT. |
| MULT-OT | 010 | OT. |
| STORE-PT | 011 | PT. |
| STORE-OTA | 011 | OT and A. |
| STORE-OTB | 011 | OT and B. |
| MISC-PT | 000 | PT. |
| IO-PT | 110 | PT. |

The Variation Matrix 56, which is also a decoder of the diode type, receives bits 7 through 10 of the left half-word of an instruction. As previously noted, these bits specify a variation within a given class of instructions. The output conductors of the Variation Matrix 56 are appropriately labeled in accordance with the binary code which causes the conductor to be positive.

Certain of the output conductors from the Class Cycle Matrix 55 and the output conductors from the Variation Matrix 56 are applied to the Instruction Matrix 57. The output conductors of the Instruction Matrix 57 are appropriately labeled in accordance with the conditions under which those conductors will be positive.

The following table shows which combination of positive potentials on input conductors will produce a positive potential on a given output conductor of the Instruction Matrix 57:

TABLE 4

| Output Conductor | Positive Potentials on Input Conductors— | | |
|---|---|---|---|
| | From Class Cycle Matrix | From Variation Matrix | From cycle Control Circuit |
| tmu | MULT | 1011 | |
| mul | MULT | 1010 | |
| tad-OT | ADD-OT | 0010 | |
| dim-OT | ADD-OT | 1101 | |
| tsu-OT | ADD-OT | 1000 | |
| csu-OT | ADD-OT | 0110 | |
| add-OT | ADD-OT | 0001 | |
| sub-OT | ADD-OT | 0111 | |
| cad-OT | ADD-OT | 0000 | |
| cam-OT | ADD-OT | 1100 | |
| dud | MULT | 1100 | |
| tmu | MULT | 1011 | |
| tdv | MULT | 1101 | |
| dvd-PT | MULT-PT | 1100 | |
| tdv-PT | MULT-PT | 1101 | |
| mult-OT | MULT-OT | 1010 | |
| tmu-OT | MULT-OT | 1011 | |
| dvd-OT | MULT-OT | 1100 | |
| tdv-OT | MULT-OT | 1101 | |
| fst-PT | STORE-PT | 0101 | |
| ech-PT | STORE-PT | 1010 | |
| rst-OTA | STORE-OTA | 0111 | |
| aor-OTA | STORE-OTA | 1001 | |
| lst-OTA | STORE-OTA | 0110 | |
| sta-OTA | STORE-OTA | 1000 | |
| ech-OTA | STORE-OTA | 1010 | |
| rst-OTB | STORE-OTB | 0111 | |
| aor-OTB | STORE-OTB | 1001 | |
| lst-OTB | STORE-OTB | 0110 | |
| sta-OTB | STORE-OTB | 1000 | |
| fst-OTB | STORE-OTB | 0101 | |
| ech-OTB | STORE-OTB | 1010 | |
| hlt-PT & IO interlock ON. | MISC-PT | 0000 | IO Interlock ON. |
| csw-PT | MISC-PT | 0100 | |
| hlt-PT | MISC-PT | 0000 | |
| IO-PT & IO Interlock ON. | IO-PT | | IO Interlock ON. |
| sel-PT | IO-PT | 010– | |
| sdr-PT | IO-PT | 001– | |
| rds-PT | IO-PT | 1110 | |
| wrt-PT | IO-PT | 1111 | |
| sel-OT | IO-OT | 010– | |
| sdr-OT | IO-OT | 001– | |

The Class Cycle Matrix 55, the Variation Matrix 56 and the Instruction Matrix 57 may be of well known construction and require no further description as to their structure; however, to illustrate by way of example the manner in which those circuits operate it will be assumed that the binary code 000 0100 is received from bits 4 through 10 of the operation register.

As noted in Table 2 above, the binary code 000 identifies the Miscellaneous Class of Instruction and this class code in combination with the variation binary code 0100 identifies the Clear and Subtract Word Counter instruction. While the binary code 000 is received by the Class Cycle Matrix 55, either the conductor PT or the conductor OT will be positive; if the conductor PT is positive, then the output conductor labeled MISC–PT will be positive. If the OT conductor is positive, then the output conductor labeled MISC–OT will be positive. When the variation binary code 0100 is received by the Variation Matrix 56, its output conductor labeled 0100 will be positive. The conductors labeled MISC–PT, MISC–OT, and 0100 are applied to the Instruction Matrix 57. In response to a positive potential on the conductor labeled MISC–PT and the conductor labeled 0100, a positive potential is applied to the conductor labeled csw–PT. As will become apparent from the subsequent description, the conductor MISC–OT will not be positive during the time that the Clear and Subtract Word Counter instruction is being performed.

Since the Command Generator 53 produces many command pulses which are generated in a particular order for various instructions and since an understanding of those command pulses will assist in an understanding of this invention, the commands will be discussed as to the conditions under which a given command is generated and these commands are also tabulated in FIGS. 11a through 11y. FIGS. 11a through 11y show for a given instruction, the commands which are generated during that instruction time and also show the time of the PT and OT cycles at which a given command occurs. While reading the following discussion as to under what circumstances a given command is generated it should be noted that the information is tabulated in FIGS. 11a through 11y.

In FIGS. 10a, 10b and 10c the commands produced by the Command Generator 53 and the Time Pulse Distributor 52 are identified by a particular reference number on each conductor. The reference numbers will not only serve to identify the conductors but also serve to identify the command number associated with a given conductor.

The following commands are generated at the indicated time directly from the output of the Time Pulse Distributor 52:

TABLE 5

| Command Name | Conductor (Command) Number | Time |
|---|---|---|
| Clear Memory Controls | 59 | TP-0 |
| Clear Left Memory Buffer Register | 60A | TP-1 |
| Clear Right Memory Buffer Register | 60B | TP-1 |

Each of the following commands is generated by the Command Generator 53 as a result of a positive potential received from the conductor labeled PT:

TABLE 6

| Conductor (Command Number) | Command Name | Time |
|---|---|---|
| 61 | Program Counter to Memory Address Register | IP-1 |
| 62 | Clear Address Register | IP-6 |
| 63A | Clear Operation Register | IP-6 |
| 63B | Clear Index Interval Register | IP-6 |
| 64 | Clear Step Counter & Divide Time Pulse Distributor | IP-6 |
| 65A | Record Left Overflow | IP-6 |
| 65B | Record Right Overflow | IP-6 |
| 66 | Add ONE to Program Counter | IP-7 |
| 67A | Left Memory Buffer to Operation Register | IP-7 |
| 67B | Right Memory Buffer to Address Register | IP-7 |

In response to a positive D.C. level on the conductor labeled OT, the Command Generator 53 produces a pulse on the conductor 68 and this command which occurs at IP–1 time is called Address Register to Memory Address Register.

In response to a positive potential on the conductor labeled Core Memory the following commands are generated at the times indicated:

TABLE 7

| Command Name | Conductor (Command) Number | Time |
|---|---|---|
| Start Memory | 69 | IP-2 |
| Parity Check | 70 | IP-11 |

In response to a positive potential on the conductor labeled ADD-PT the Command Generator 53 produces a pulse on the conductors 71A and 71B and these commands which occur at IP-2 time are called Left End Carry and Right End Carry, respectively. In response to a positive potential on the conductor labeled MULT-PT the Command Generator produces a pulse on the conductors 72A and 72B and these commands which occur at IP-6 time are called Left Correct Sign and Right Correct Sign, respectively.

In response to a positive potential on the conductor labeled MULT-OT, the following commands are generated at the times indicated:

TABLE 8

| Command Name | Conductor (Command) Number | Time |
| --- | --- | --- |
| Start 2 m.c. Pulses | 73 | IP-8 |
| Clear Left Sign Control | 74A | IP-6 |
| Clear Right Sign Control | 74B | IP-6 |

In response to a positive potential on the conductor labeled ADD-OT, the conductor MULT-OT or the conductor labeled STORE-OTA, a pulse is produced on the conductor 75 and this command which occurs at IP-7 time is called Left Memory Buffer Register to Left A Register.

In response to a positive potential on the conductor labeled STORE-OTB, a pulse is produced on the conductor 76 and this command which occurs at IP-11 time is called Clear A-B flip-flop to A. In response to a positive potential on the conductor labeled TIME CLOCK, a pulse is produced on the conductor 77 and this command which occurs at TP-3 time is called Clock Register to Memory Buffer Register. Although this command may occur during various instructions, for the purpose of illustrating and describing this invention, it will be assumed that it occurs only in response to a specific Clear and Add (CAD) instruction and therefore this command has been tabulated only in FIG. 11c and is underlined therein.

In response to positive potentials on the conductor labeled Core Memory and the conductor labeled B, a pulse is produced on the conductor 78 and this command which occurs at IP-2 time is called Inhibit Sample.

In response to a positive potential on the conductor labeled wrt-PT or the conductor labeled rds-PT the following commands are generated at the times indicated:

TABLE 9

| Command Name | Conductor (Command) Number | Time |
| --- | --- | --- |
| Address Register Complement to IO Word Counter | 79 | IP-2 |
| Clear IO Word Counter | 80A | IP-1 |
| Set IO Interlock ON | 80B | IP-1 |
| Clear Left IO Register | 81A | IP-2 |
| Clear Right IO Register | 81B | IP-2 |
| Sense IO Word Counter | 82 | IP-3 |

In response to a positive potential on the conductor labeled ldc-PT a pulse is produced on the conductor 83 at IP-3 time, a pulse is produced on the conductor 84 at IP-2 and these commands are called Address Register to IO Address Counter and Clear IO Address Counter, respectively.

In response to a positive potential on the conductor labeled sel-PT, a pulse is produced on the conductor 85 and this command which occurs at IP-5 time is called Select Pulse.

In response to a positive potential on the conductor labeled rds-PT a pulse is produced on the conductor 86 and this command which occurs at IP-6 time is called PT-6 on Read.

In response to a positive potential on the conductor labeled wrt-PT, a pulse is produced on conductor 87 and this pulse which occurs at IP-6 time is called PT-6 on Write. In response to a positive potential on the conductor labeled sdr-PT a pulse is produced on conductor 88 and this pulse, which occurs at IP-5 time is called Select Pulse for Drums.

In response to a positive potential on the conductor labeled csw-PT a pulse is produced on the conductor 89 and this pulse, which occurs at IP-9 time, is called Clear 2nd csw Flip-Flop.

In response to a positive potential on the conductor labeled csw-PT and the conductor labeled 1st Transfer Flip-Flop ON, a pulse is produced on the conductors 90 and 91 and these commands which occur at IP-1 time are called IO Word Counter to Right Accumulator Register and 1st or 2nd Transfer, respectively. The command 1st or 2nd Transfer is also produced at IP-5 time in response to a positive potential on the conductor labeled csw-PT or 2nd Transfer Flip-Flop ON.

In response to a positive potential on the conductor sel-PT or the conductor sdr-PT, the following commands are generated at the times indicated:

TABLE 10

| Command Name | Conductor (Command) Number | Time |
| --- | --- | --- |
| Address Register to Drum Control Register | 92 | IP-3 |
| Clear Drum Control Register | 94 | IP-2 |

In response to a positive potential on either conductor labeled sdr-OT or sel-OT a pulse is produced on conductor 93 at IP-5 time and this command is called Deselect pulse.

In response to a positive potential on any one of the conductors labeled sdr-PT, MULT-PT, hlt-PT, ADD-PT, STORE-PT or sel-PT, a pulse is produced on the conductor 95 and the command, which occurs at IP-11 time, is called Set PT-OT flip-flop to OT.

In response to a positive potential on any one of the conductors labeled IO-PT and IO Interlock ON, MULT-OT, or hlt-PT and IO Interlock ON, a pulse is produced on the conductor 96 and this command which occurs at IP-10 time is called Pause.

In response to a positive potential on either of the conductors labeled hlt-PT and IO Interlock ON or IO-PT and IO Interlock ON, a pulse is produced on the conductor 97 if a pulse is received on the conductor labeled Clear IO Interlock. A pulse on conductor 97 is called the command Clear Pause Flip-Flop. Since this pulse does not occur at any particular time of the Instruction, this command is not tabulated in FIGS. 11a through 11s.

In response to a positive potential on any one of the conductors MULT-OT, ADD-OT, or ADD-PT, a pulse is produced on conductor 98 and 99 and these commands, which occur at IP-1 time, are called Clear Left A Register and Clear Right A Register, respectively. Conductor 98 is also pulsed at IP-6 time in response to a positive potential on any one of the conductors labeled ech-OTA, rst-OTA, 1st-OTA, sta-OTA, or aor-OTA. Conductor 99 is also pulsed at IP-6 time in response to a positive potential on any one of the conductors labeled rst-OTA, aor-OTA, ech-OTA, or 1st-OTA.

In response to a positive potential on the conductor labeled aor-OTA a pulse is produced on the conductor 100 and this command which occurs at IP-8 time is called Right Carry ONE. In response to a positive potential on any one of the conductors labeled ADD-PT, dvd-PT, or tdv-PT, a pulse is produced on each of the conductors 101A and 101B and these pulses, which occur at IP-5 time, are called Left Accumulator Conditional Shift Left and Right Accumulator Conditional Shift Left.

In response to a positive potential on any one of the conductors labeled fst-OTB, 1st-OTB or ech-OTB, a pulse is produced on conductor 102 and this command, which occurs at IP-2 time, is called Left Accumulator Register to Left Memory Buffer Register. In response to a positive potential on any one of the conductors labeled aor–OTB, fst–OTB, rst–OTB or ech–OTB, a pulse is produced on conductor 103 and this command which occurs at IP-2 time is called Right Accumulator Register to Right Memory Buffer Register.

In response to a positive potential on the conductor aor–OTB a pulse is produced on the conductor 104 and this command, which occurs at IP-1 time is called Right End Carry After Add ONE. In response to a positive potential on any one of the conductors labeled ech–OTA, aor–OTA, lst–OTA, mul–OT, dvd–OT, add–OT, sub–OT, dim–OT, cam–OT, csu–OT or cad–OT, a pulse is produced on conductor 105 and this pulse, which occurs at IP-7 time is called Right Memory Buffer Register to Right A Register.

In response to a positive potential on the conductor labeled STORE–OTA or the conductor labeled fst–PT, a pulse is produced on conductor 106 and this command, which occurs at IP-11 time, is called Set A–B Flip-Flop to B.

In response to a positive potential on any one of the conductors labeled MISC–OT, ADD–OT, IO–OT, MULT–OT, or STORE–OTB, a pulse is produced on the conductor 107 and this command, which occurs at IP-11 time is called Clear PT–OT Flip-Flop to PT.

In response to a positive potential on any one of the conductors labeled aor–OTB, rst–OTB, or sta–OTB, a pulse is produced on the conductor 108 and this command, which occurs at IP-2 time, is called Left A Register to Left Memory Buffer Register. In response to a positive potential on the conductor labeled lst–OTB or sta–OTB, a pulse is produced on the conductor 109 and this command, which occurs at IP-2 time, is called Right A Register to Right Memory Buffer Register.

In response to a positive potential on the conductor ADD–OT or the conductor ech–OTB, a pulse is produced on conductors 110A and 110B and these commands, which occur at IB-10 time, are called Left Carry ZERO and Right Carry ZERO, respectively.

In response to a positive potential on the conductor labeled dvd–OT or the conductor labeled tdv–OT, a pulse is produced on each of the conductors 111A, 111B and 112. These commands, which occur at IP-7 time, are called Make Left Accumuator Register and Left B Register Positive, Make Right Accumulator and Right B Register Positive, and Set Step Counter equal to 17, respectively. In response to a positive potential on the conductor labeled dvd–PT or the conductor labeled dvd–PT, the following commands are generated at the times indicated:

TABLE 11

| Command Name | Conductor (Command) Number | Time |
| --- | --- | --- |
| Correct Left Remainder | 113A | IP-2 |
| Correct Right Remainder | 113B | IP-2 |
| Make Left A Register and Left Accumulator Register Signs Unlike | 114A | IP-1 |
| Make Right A Register and Right Accumulator Register Signs Unlike | 114B | IP-1 |

In response to a positive potential on any one of the conductors labeled mul–OT, tmu–OT, or dim–OT, a pulse is produced on each of the conductors 115A and 115B and these pulses, which occur at IP-8 time, are called Left Accumulator Register to Left B Register and Right Accumulator Register to Right B Register, respectively.

In response to a positive potential on any one of the conductors labeled tmu–OT, tad–OT, tsu–OT, or tdv–OT, a pulse is produced on the conductor 116 and this command, which occurs at IP-7 time, is called Left Memory Buffer Register to Right A Register.

In response to a positive potential on the conductor labeled hlt–OT, a pulse is produced on the conductor 117 and this command, which occurs at IP-11 time, is called Clear Continue Flip-Flop. In response to a positive potential on any one of the conductors labeled sub–OT, tsu–OT, dim–OT, or csu–OT, a pulse is produced on the conductor 118A and the conductor 118B and these pulses, which occur at IP-9 time, are called Complement Left A Register and Complement Right A Register, respectively.

In response to a positive potential on any one of the conductors labeled MULT–OT, dim–OT, or cam–OT, a pulse is produced on the conductor 119A and the conductor 119B and these commands, which occur at IP-8 time, are called Make Left A Register Positive and Make Right A Register Positive, respectively.

In response to a positive potential on any one of the conductors labeled ech–OTB, cam–OT, csu–OT, or cad–OT, a pulse is produced on conductor 120 and conductor 121 and these pulses, which occur at IP-6 time, are called Clear Left Accumulator Register and Clear Right Acumulator Register, respectively. The commands 120 and 121 are also generated at IP-8 time in response to a positive potential on the conductor labeled mul–OT or the conductor labeled tmu-OT. The command 121 is also generated at IP-6 time in response to a positive potential on the conductor labeled aor–OTA and is generated at IP-9 time in response to a positive potential on the conductor labeled csw–PT.

In response to a positive potential on the conductor labeled mul–OT or the conductor labeled tmu–OT, the command generator, besides causing the previously indicated commands 120 and 121 to be produced, causes each of the following commands to be generated at the time indicated:

TABLE 12

| Command Name | Conductor (Command) Number | Time |
| --- | --- | --- |
| Clear Left B Register | 122 | IP-7 |
| Set Step Counter to 15 | 123 | IP-7 |
| Make Left Accumulator Register Positive | 124 | IP-7 |
| Make Right Accumulator Register Positive | 125 | IP-7 |
| Clear Right B Register | 126 | IP-7 |

The command 126, Clear Right B Register, is also produced at IP-6 time in response to a positive potential on the conductor labeled dim–OT.

In response to a positive potential on the conductor labeled ADD–PT or the conductor labeled ech–PT, a pulse is produced on each of the conductors 127 and 128 and these commands, which occur at IP-1 time, are called Left Division Shift Left and Right Division Shift Left, respectively.

The command 128 is also produced at IP-11 time in response to a positive potential on the conductor labeled aor–OTA.

In response to a positive potential on the conductor labeled STORE–OTB, a pulse is produced on the conductor 129 and this command, which occurs at IP-3 time, is called Parity Count. This command 129 is also produced in response to each IP-7 pulse.

In response to a positive potential on the conductor labeled tdr or the conductor labeled dvd, a positive potential is produced on the conductor labeled dvd or tdv and also a pulse is produced on conductors 130A and 130B. These commands 130A and 130B, which occur at IP-1 time, are called Complement Left Divide Connect Flip-Flop and Complement Right Divide Connect Flip-Flop, respectively.

In order to clarify the commands which are tabulated by command number in FIGS. 11a through 11y, those command numbers and the command names which have been mentioned above are tabulated as follows:

TABLE 13

| Conductor (Command) Number | Title |
|---|---|
| 59 | Clear Memory. |
| 60A | Clear Left Memory Buffer Register. |
| 60B | Clear Right Memory Buffer Register. |
| 61 | Program Counter to Memory. |
| 62 | Clear Address Register. |
| 63A | Clear Operation Register. |
| 63B | Clear Index Interval Register. |
| 64 | Clear Step Counter and dvd TPD. |
| 65A | Record Left Overflow. |
| 65B | Record Right Overflow. |
| 66 | Add ONE to Program Counter. |
| 67A | Left Memory Buffer to Operation Register. |
| 67B | Right Memory Buffer to Address Register. |
| 68 | Address Register to Memory Address. |
| 69 | Start Core Memory. |
| 70 | Parity Check. |
| 71A | Left End Carry. |
| 71B | Right End Carry. |
| 72A | Left Correct Sign. |
| 72B | Right Correct Sign. |
| 73 | Start 2 m.c. Pulses. |
| 74A | Clear Left Sign Control. |
| 74B | Clear Right Sign Control. |
| 75 | Left Memory Buffer Register to Left A Register. |
| 76 | Clear AB Flip-Flop to A. |
| 77 | Clock Register to Memory Buffer Register. |
| 78 | Inhibit Sample. |
| 79 | Address Register Complement to IO Word Counter. |
| 80A | Clear IO Word Counter. |
| 80B | Set IO Interlock ON. |
| 81A | Clear Left IO Register. |
| 81B | Clear Right IO Register. |
| 82 | Sense IO Word Counter. |
| 83 | Address Register to IO Address Counter. |
| 84 | Clear IO Address Counter. |
| 85 | Select Pulse. |
| 86 | PT-6 on Read. |
| 87 | PT-6 on Write. |
| 88 | Select Pulse for Drums. |
| 89 | Set 2nd csw FF. |
| 90 | IO Word Counter to Right Accumulator Register. |
| 91 | 1st csw Transfer. |
| 92 | Address Register to Drum Control Register. |
| 93 | Deselect Pulse. |
| 94 | Clear Drum Control Register. |
| 95 | Set PT-OT Flip-Flop to OT. |
| 96 | Set Pause FF. |
| 97 | Clear Pause Flip-Flop. |
| 98 | Clear Left A Register. |
| 99 | Clear Right A Register. |
| 100 | Right Carry ONE. |
| 101A | Left Accumulator Conditional Shift Left. |
| 101B | Right Accumulator Conditional Shift Left. |
| 102 | Left Accumulator Register to Left Memory Buffer Register. |
| 103 | Right Accumulator Register to Right Memory Buffer Register. |
| 104 | Right End Carry After Add ONE. |
| 105 | Right Memory Buffer Register to Right A Register. |
| 106 | Set A-B Flip-Flop to B. |
| 107 | Clear PT-OT Flip-Flop to PT. |
| 108 | Left A Register to Left Memory Buffer Register. |
| 109 | Right A Register to Right Memory Buffer Register. |
| 110A | Left Carry ZERO. |
| 110B | Right Carry ZERO. |
| 111A | Make Left Accumulator Register and Left B Register Positive. |
| 111B | Make Right Accumulator Register and Right B Register Positive. |
| 112 | Set Step Counter Equal to 17. |
| 113A | Correct Left Remainder. |
| 113B | Correct Right Remainder. |
| 114A | Make Left A Register and Left Accumulator Signs Unlike. |
| 114B | Make Right A Register and Right Accumulator Signs Unlike. |
| 114C | Left Combined Shift Left. |
| 114D | Right Combined Shift Left. |
| 115A | Left Accumulator Register to Left B Register. |
| 115B | Right Accumulator Register to Right B Register. |
| 116 | Left Memory Buffer Register to Right A Register. |
| 117 | Clear Continue Flip-Flop. |
| 118A | Complement Left A Register. |
| 118B | Complement Right A Register. |
| 119A | Make Left A Register Positive. |
| 119B | Make Right A Register Positive. |
| 120 | Clear Left Accumulator Register. |
| 121 | Clear Right Accumulator Register. |
| 122 | Clear Left B Register. |
| 123 | Set Step Counter to 15. |
| 124 | Make Left Accumulator Register Positive. |
| 125 | Make Right Accumulator Register Positive. |
| 126 | Clear Right B Register. |
| 127 | Left Division Shift Left. |
| 128 | Right Division Shift Left. |
| 129 | Parity Count. |
| 130A | Complement Left Divide Connect Flip-Flop. |
| 130B | Complement Right Divide Connect Flip-Flop. |

Common Commands

Certain commands, called Common Commands, are generated during every instruction cycle.

From FIGS. 11a through 11y it will be noted that the following Common Commands are generated during the PT cycle of each instruction:

TABLE 14

| Command Number | Name | Time |
|---|---|---|
| 59 | Clear Memory Controls | PT-0 |
| 60A | Clear Left Memory Buffer Register | PT-1 |
| 60B | Clear Right Memory Buffer Register | PT-1 |
| 61 | Program Counter to Memory Address Register. | PT-1 |
| 69 | Start Memory | PT-2 |
| 62 | Clear Address Register | PT-6 |
| 63A | Clear Operation Register | PT-6 |
| 63B | Clear Index Interval Register | PT-6 |
| 64 | Clear Step Counter & Divide Time Pulse Distributor. | PT-6 |
| 65A | Record Left Overflow | PT-6 |
| 65B | Record Right Overflow | PT-6 |
| 66 | Add ONE to Program Counter | PT-7 |
| 67A | Left Memory Buffer to Operation Register | PT-7 |
| 67B | Right Memory Buffer to Address Register | PT-7 |
| 129 | Parity Count | PT-7 |
| 70 | Parity Check | PT-11 |

Referring now to FIGS. 3a through 3h and Table 6 above, the commands 60A and 60B, as their names imply, are delivered to the Left and Right Memory Buffer Registers 43 and 44 and cause those registers to have all of their stages cleared to the binary ZERO state.

The commands 61 and 66 are delivered to a Program Counter 150. This counter is essentially a binary counter which may be initially set to any desired number; in response to the command 66 a binary ONE is added to that number and in response to the command 61 the Program Counter delivers the signals stored therein to the conductors of a cable 151. These signals are delivered through an OR circuit 152 to the previously mentioned conductors of the cable 37.

Pulses on the conductors 36 cause the Memory Element 34 to perform the previously described Read operation and the particular memory register, which is read during the PT cycle, is indicated by the signals delivered from the Program Counter 150. The memory registers whose locations are specificied by the Program Counter are those registers containing instruction words.

The Read Memory operation performed during Program Time (PT) causes the binary signals representative of the left and right half-words of the instruction to be delivered to the conductors of cables 38 and 39, respectively. Since the Left and Right Memory Buffer Registers 43 and 44 were cleared by commands 60A and 60B at PT-1 time and since the signals on the conductors of cables 38 and 39 occur at substantially PT-6 time, those signals are stored in those registers.

The commands 62, 63A and 63B are delivered to an Address Register 155, the Operation Register 47 and the Selection and IO Control Element 49, respectively. These commands, as their names imply, cause a conventional clearing operation of the registers that they are delivered to.

The commands 64, 65A, 65B, 129 and 70 perform operations not essential to the immediate description and therefore further discussion of them will be made only when required.

The commands 67A and 67B, as their names imply, are delivered to the Left and Right Memory Buffer Registers, respectively, where, in response to command 67A, the signals stored in the Left Memory Buffer Register are delivered to the Operation Register and, in response to 67B, the signals stored in the Right Memory Buffer Register are delivered by way of the conductors of a cable 156 to the Address Register 155.

Summarizing the operation described which occurs during each Program time cycle, left and right half-words of the instruction whose location is specified by the contents of the Program Counter are stored in the Operation Register and Address Register, respectively, at the end of the PT cycle and the contents of the Program Counter is increased by ONE.

From FIGS. 11a through 11y it will be noted that at PT–11 time of each instruction which requires an Operate Time, the command 95 (Set PT–OT Flip-Flop to OT) is generated. In a manner to be described in detail hereinafter, this command essentially prevents the commands occurring from PT–0 through PT–7 of the instruction cycle from being generated until the operate time commands for that instruction have been generated.

It will be noted that during the OT cycle of those instructions the following common commands are generated:

TABLE 15

| Command Number | Name | Time |
|---|---|---|
| 59 | Clear Memory Controls | OT–0 |
| 60A | Clear Left Memory Buffer Register | OT–1 |
| 60B | Clear Right Memory Buffer Register | OT–1 |
| 68 | Address Register to Memory Address Register | OT–1 |
| 69 | Start Memory | OT–2 |
| 129 | Parity Count | OT–7 |
| 70 | Parity Check | OT–11 |
| 107 | Clear PT–OT Flip-Flop to PT | OT–11 |

Command 68 is delivered to the Address Register 155 where, in response to this command, the signals stored therein are delivered to the conductors of a cable 157 and through OR circuit 152 to the conductors of cable 37.

Commands 129 and 70 perform operations an understanding of which is not essential to the immediate description and therefore will not be discussed further at this time.

The commands 59 and 69 cause the previously noted Read Memory operation; however, during the OT cycle, the particular memory register being read is specified by the contents of the Address Register since command 68 (Address Register to Memory Address Register) is generated.

The command 107 (Clear PT–OT Flip-Flop to PT) essentially results in the Program time being resumed, that is, the commands during PT–0 through PT–6 of the instruction cycle are generated subsequent to the OT cycle of the instruction.

*Read Operation from Input Drum*

In order to effect a reading operation from the Input Drum, the program must include a sequence of three instructions. Those three instructions, which are Load Address Counter (ldc), Select Drums (sdr) and Read (rds), are preferably *performed in the order as stated.*

Drum Reading as well as Drum Writing operations are normally performed on a block basis, that is, the sequence of three instructions merely establishes that a specified memory register (whose address is indicated by the Load Address Counter instruction) is the first register to be involved in a transfer, that words are to be transferred between the drum and Memory (the Select Drum Instruction) and that a specified maximum number of words are to be read from the drum or written on the drum (the maximum number being specified by a part of the Read or Write instruction word).

As indicated in FIG. 11u, the Load Address Counter instruction causes the following commands, besides the Common Commands described with reference to Table 14 above, to be generated:

TABLE 16

| Command Number | Name | Time |
|---|---|---|
| 96 | Pause | PT–10 |
| 84 | Clear IO Address Counter | PT–2 |
| 83 | Address Register to IO Address Counter | PT–3 |

Command 96 is a conditional command (indicated by being underlined in FIG. 11u), that is, it is generated only if a certain condition is met. For the immediate description, it will be assumed that this condition is not met and therefore the command is not generated.

Referring back to FIGS. 3a through 3h and more particularly to FIGS. 3a, 3b, 3g and 3h, command 84 is delivered to an IO Address Counter 158 where it causes a conventional Clearing Operation. Command 83 is delivered to the Address Register 155 where in response to this command, the signals stored therein are delivered by way of the conductors of a cable 159 to the IO Address Counter 158 for storage therein.

As indicated in FIG. 11v, the Select Drums instruction, besides causing the common commands described with respect to Tables 14 and 15 above to be generated, causes generation of the following commands:

TABLE 17

| Command Number | Name | Time |
|---|---|---|
| 96 | Pause | PT–10 |
| 95 | Set PT–OT Flip-Flop to OT | PT–11 |
| 93 | Deselect Pulse | OT–5 |
| 107 | Clear PT–OT Flip-Flop to PT | OT–11 |
| 94 | Clear Drum Control Register | PT–2 |
| 92 | Address Register to Drum Control Register | PT–3 |
| 88 | Select Pulse for Drums | PT–5 |

At PT–10 time of the Select Drums instruction, as during the Load Address Counter instruction, the command Pause (96) may be generated. Since this command is conditional and since an understanding of this operation is not essential to the immediate description, it will be assumed that the command is not generated. At PT–11 time of the Select Drums instruction the previously mentioned command Set PT–OT Flip-Flop to OT (95) is generated in order to provide an OT cycle.

Figure 3G:
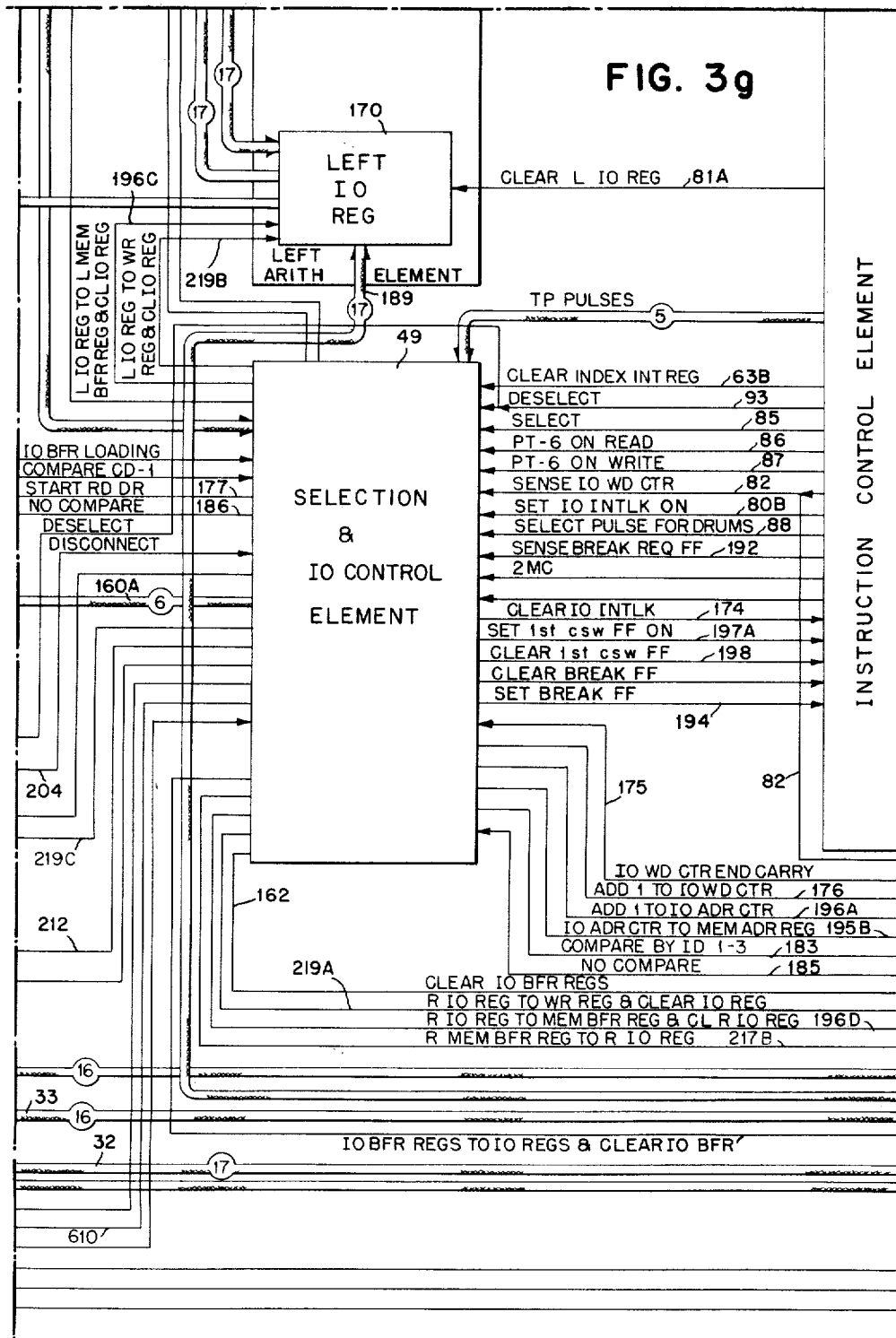
Figure 3H:
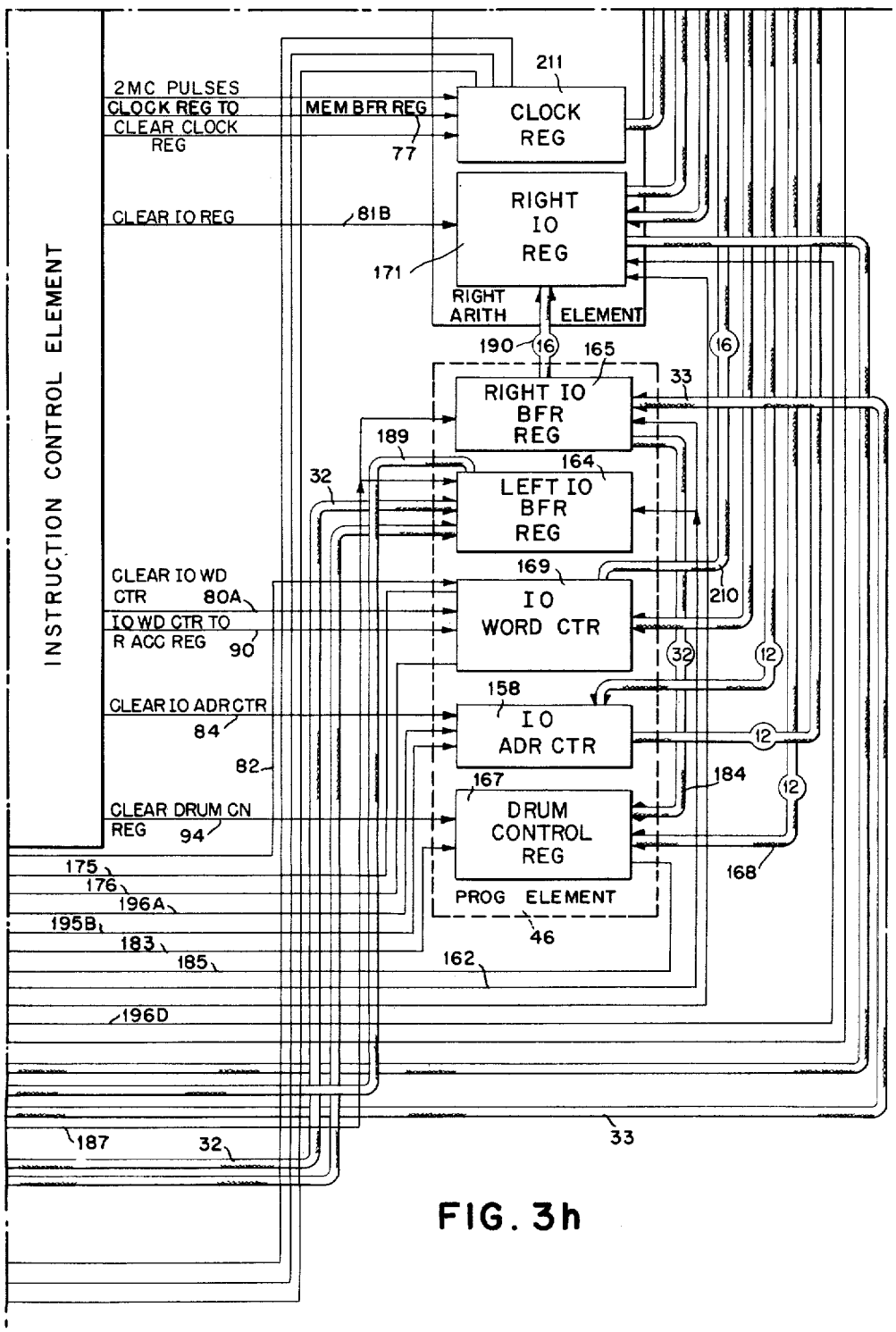

At OT–5 time the command 93 (Deselect Pulse) is generated and this command (as shown in FIGS. 3g and 3f) is delivered to (1) the Selection and IO Control Element 49, (2) a Drum Selection Register 160 and (3) a CD Write Control Circuit 161. The Deselect Pulse received by the Selection and IO Control Element causes various control flip-flops therein to be set to their ZERO state and further causes a pulse to be delivered to a conductor 162 (Clear IO Buffer Registers). The Deselect Pulse received by the Drum Selection Register 160 causes each stage of that register to be cleared to the ZERO state. The Deselect Pulse received by the CD Write Control Circuit 161 causes various control flip-flops therein to be cleared to their ZERO state, causes a pulse to be delivered to a conductor 163 (Write Register Reset) and further causes a negative D.C. level to be established for a predetermined length of time on a conductor 161A (Deselect SS output). The pulse on conductor 162, as its name implies, causes a conventional clearing operation of a Left IO Buffer Register 164 and a Right IO Buffer Register 165. The pulse on conductor 163, as its name implies, causes a conventional clearing operation of a Write Register 166. A preferred embodiment of this invention includes many physical drums, each having many fields (logical drums). In that preferred embodiment the CD Read Section 31 (FIG. 3f) and the CD Write Section 253 (FIG. 3f) have their inputs and outputs, respectively, switched by means of diode type switches to the drum heads selected by the Drum Selection Register 160 (FIG. 3f). In the interest of simplifying and thereby clarifying the description of this invention, no switching circuits of the CD Read Section or the CD Write Section have been shown; however, the Control circuits 161 and 178, to be described in detail hereinafter, include to a certain degree some of the logical circuits necessitated by the switching circuits. The negative D.C. level established on conductor 161A (Deselect SS output) has a duration sufficient to permit the switching operation to be completed before the read or write operation can be effective.

Although the common commands described with respect to Table 15 are generated during this OT cycle of the Select Drums instruction, they will have no effect on the overall result of the instruction as will be apparent hereinafter.

At PT–2 of the Select Drums Instruction, the command 94 (Clear Drum Control Register) is delivered to a Drum Control Register 167 (FIG. 3h) to effect a conventional clearing operation. At PT–3 time command 92 causes the signals stored in the Address Register 155 (FIG. 3b) to be delivered by way of the conductors of a cable 168 to the Drum Control Register 167 for storage therein. From the preceding description it will be seen that the signals delivered to the Drum Control Register are those signals of the right half word of the instruction. As will become more apparent hereinafter, the right half-word of a Select Drum instruction is used to determine which words read from the drum are to be accepted and delivered to the Memory Element 34.

At will be recalled from the description relating to the Input System, each word stored on the drum has source identification bits accompanying it. During normal operation, it is desirable, by means of the Select Drums instruction, to specify which words will be read from the drum, that is, words from only a specified source will be accepted.

The right half-word of the Select Drums instruction is therefore provided with a binary code in bit positions R1 through R3 which identifies the source from which words are to be accepted. It will be recalled with respect to the description of FIG. 6 that source identity bits are assigned to R1 through R3 of all input words.

Referring back to Table 9 above, at PT–5 time of the Select Drums instruction the command 88 (Select Pulse for Drums) is generated. This command is delivered to the Selection and IO Control Element 49 where it effects a Set operation of various control flip-flops and also causes the Index Interval Bits 10 through 15, which had previously been delivered to and stored in the Selection and IO Control Element 49, to be delivered by way of the conductors of a cable 160A to the Drum Selection Register 160 whose output is decoded by a suitable decoder 160B. When the index interval portion of the Select Drums instruction is the binary code 011 101, a positive D.C. level is established on conductor 160C (Select Input Drum) by the decoder 160B.

As indicated in FIG. 11x, the Read (rds) instruction, besides causing the common commands described with respect to Table 14 above to be generated, causes the following commands to be generated:

TABLE 18

| Command Number | Name | Time |
|---|---|---|
| 96 | Pause | PT–10 |
| 80A | Clear IO Word Counter | PT–1 |
| 80B | Set IO Interlock ON | PT–1 |
| 79 | Address Register Complement to IO Word Counter | PT–2 |
| 81A | Clear Left IO Register | PT–2 |
| 81B | Clear Right IO Register | PT–2 |
| 82 | Sense IO Word Counter | PT–3 |
| 86 | PT–6 on Read | PT–6 |

At PT–10 time, the command 96 is generated provided that a certain condition is met, and it will be again assumed that this condition is not met and the command not generated.

At PT–1 time the command 80A (Clear IO Word Counter) is delivered to an IO Word Counter 169 where it effects a conventional clearing operation. The command 80B (Set IO Interlock ON) is generated and this command is delivered to the Cycle Control Circuit 54 (FIG. 10b) where it causes the output conductor labeled IO Interlock ON to be made positive. The primary purpose of this command is to prevent any further instruction of the Input-Output class or a Program Stop instruction from being executed until the present Input (or Output) operation has been completed. As will be more apparent subsequently, an input or output operation is not complete until the number of words involved in the transfer have actually been transferred or for some reason or other there can be no further transfers made.

At PT–2 time the commands 81A and 81B cause conventional clearing operations of a Left IO Register 170 and a Right IO Register 171, respectively. At this same time, command 79 causes signals representative of the complement of the number stored in the Address Register 155 to be transferred by way of the conductors of a cable 173 to the IO Word Counter 169 for storage therein. The right half-word of the Read instruction is a binary number indicating the maximum number of words to be transferred, the actual number of words transferred during a read instruction will of course be determined by the actual number of words available for transfer provided that there are less than the number specified by the Read instruction.

The command 82 (Sense IO Word Counter) is delivered to the Selection and IO Control Element 49 as well as to the IO Word Counter 169. When this command is received by the IO Word Counter a binary ONE is added to the contents thereof. This command 82 (Sense IO Word Counter) which occurs at PT–3 time as well as the command 86 (PT–6 on Read) are delivered to the Selection and IO Control Element where if a pulse is received on a conductor 175 (IO Word Counter End Carry) between the time of command 82 and command 86, a pulse is delivered to the conductor 174 (Clear IO Interlock). The IO Word Counter is a binary counter which in response to a pulse on the conductor 82 (Sense IO Word Counter) or a pulse on a conductor 176 (Add ONE to IO Word Counter) a binary ONE is added to the number stored therein. The IO Word Counter produces a pulse on the conductor 175 (IO Word Counter End Carry) if, when a pulse is received on either the conductor 82 or the conductor 176, the counter has the binary number of all ONES stored therein. As noted above, the *complement* of the number specified by the right half-word of the Read instruction is transferred to the IO Word Counter. If the Read instruction specified zero number of words then, all stages of the IO Word Counter would be set to their ONE state and the command 82 (Sense IO Word Counter) of the Read instruction would cause an end carry pulse resulting in a pulse being delivered to the conductor Clear IO Interlock. This pulse, generated by the Selection and IO Control Element 49, is delivered to the Cycle Control Circuit 54 (FIG. 10b) where it causes a negative potential to be produced on the conductor labeled IO Interlock ON. The use and importance of an instruction to read zero number of words will become apparent subsequently.

Assuming for the purpose of description that the Read instruction specifies a number of words greater than ZERO, then no pulse will be delivered to the conductor 174 labeled Clear IO Interlock during the Read Instruction cycle. The subsequent instructions of the program will be executed provided that IP pulses are delivered to the Command Generator 53 (FIGS. 10a through 10c).

When a transfer of a word from the drum to Memory is actually ready to take place, controls are effected to interrupt the generation of IP pulses. It is to be understood that if any one of the instructions of the Input-Output class or the instruction Program Stop appears in the Program before the Clear IO Interlock pulse is delivered to the conductor 174, then at PT-10 time of that instruction the aforementioned conditional command 96 (Pause) will be generated which, as will be apparent from the subsequent description, effectively prevents further commands of that instruction from being generated until the Clear IO Interlock pulse has been received.

If, as previously assumed, the Read instruction specifies a number of words greater than ZERO, the Selection and IO Control Element will generate a pulse on a conductor 177 (Start Read Drums) which is delivered to a Read Control Circuit 178. In response to this pulse, the Read Control Circuit 178 produces a positive potential on a conductor 179 (Read Drum Flip-Flop ON) which is delivered to the CD Write Control Circuit 161. The CD Write Control Circuit in response to this D.C. level and in response to a pulse on the conductor labeled DTP-4 causes a positive D.C. level to be established on a conductor 180 (Sync FF ON) which begins at substantially CD-4 time. It should be noted that time pulses (TP) and the Instruction Pulses (IP) are asynchronous with respect to the Drum Time Pulses (DTP). For this reason synchronizing circuits are employed in the CD Write Control Circuit 161 to synchronize control pulses from the Selection and IO Control Element 49 with respect to the Drum System timing.

The Read Control Circuit 178 in response to the previously mentioned pulse on conductor 177 (Start Read Drums) and in response to a positive potential on each of the conductors 180 and 161A causes a positive potential on a conductor 181 (Read).

As previously described with respect to the CD Read Status Control Section 30, a positive potential on the conductor labeled Read causes a drum register which is full to be read, the left half-word of the word read from the drum being delivered to the conductors of the cable 32 and the right half-word being delivered to the conductors of the cable 33.

These signals on the conductors of cables 32 and 33 are stored in the Left and Right IO Buffer Registers 164 and 165, respectively.

As was described in detail in the description of the CD Read Status Control Section 30, this reading a word from the drum resulted from a pulse on the conductor labeled Read Sample. As shown in FIGS. 3f and 3g, this Read Sample pulse is also delivered to the Selection and IO Control Element 49 and to Read Control Circuit 178.

If the CD Read Status Control receives a positive D.C. level from the conductor labeled Read at such a time that the first register which is sampled by the Read Sample pulse is the second register of a two-register slot, no signal will be delivered to a conductor 182 labeled Compare. This condition will be sensed by the Selection and IO Control which will generate a pulse on conductor 186 labeled No Compare. As previously described with reference to the operation of the CD Read Status Control Circuit this no compare pulse will cause the status of the drum register to remain "full," that is, a Write a ONE signal is delivered to Write head 23. In response to a Read Sample pulse, the Read Control Circuit 178 generates a pulse on the conductor 182 (Compare) provided that the drum register which is being read is the first register of a two-register slot. This compare pulse on conductor 182 is delivered to the Selection and IO Control Element 49.

The Selection and IO Control Element 49, in response to this compare pulse, causes a pulse to be produced (after a suitable delay) on a conductor 183 (Compare by Identification 1-3) provided that the previously mentioned Select Drum instruction had the binary code 011 101 specified by its Index Interval bits 10 through 15.

The pulse on the conductor 183 (Compare by Identification 1-3) is delivered to the Drum Control Register 167 and it will also be noted that the right half-word of the word read from the drum (now stored in the Right IO Buffer Register 165) is also delivered by way of the conductors of a cable 184 to the Drum Control Register 167. As noted previously in the description relating to the Select Drum instruction, the drum control register has stored therein (at this time) the right half-word of that Select Drums instruction.

If, at the time that the pulse on conductor 183 (Compare by ID 1-3) is received, bits 1 through 3 of the right half-word read from the drum compare with bits 1 through 3 of the word stored in the Drum Control Register, no signal will be delivered to a conductor 185 (No Compare).

If the comparison is not successful, a pulse is delivered by way of the conductor 185 (No Compare) to the Selection and IO Control which in turn delivers a succession of pulses to a conductor 186 (No Compare). These pulses on conductor 186 are delivered to the CD Read Status Control Circuit 30 where they cause two successive Write a ONE signals to be delivered to the Write head 23 as described in detail in the above description relating to the CD Read Status Control Circuit 30.

If the comparison was successful, since no pulse is received from conductor 185, the Selection and IO Control Element delivers a pulse to a conductor 187 (IO Buffer Registers to IO Registers and Clear IO Buffer Registers), delivers a pulse to the conductor 176 (Add ONE to IO Word Counter) and stores the fact that the comparison was successful. The pulse on conductor 187, as its name implies, causes the signals stored in the Left and Right IO Buffer Registers 164 and 165 to be delivered by way of the conductors of cables 189 and 190 to the Left and Right IO Registers 170 and 171, respectively. This pulse on conductor 187 also causes the Left and Right IO Buffer Registers to be cleared. The pulse on conductor 188 causes a binary ONE to be added to the signals previously stored in the IO Word Counter 169.

It should be noted that this pulse on conductor 188 is asynchronous wtih respect to the operations controlled by the Instruction Control Element, that is, the Instruction Control Element may well be proceeding to perform subsequent instructions of the program and during such time an incoming word from the drum may have been accepted, transferred from the buffer registers to the IO registers and a binary ONE added to the IO Word Counter. In the event that the particular instruction being controlled by the Instruction Control Element at this instant is the instruction Clear and Subtract Word Counter, the contents of the IO Word Counter should not be transferred while it is in the act of being changed. For this reason, whenever a pulse is delivered to the conductor 188 to cause a binary ONE to be added to the IO Word Counter, a pulse is delivered to a conductor 197A labeled Set the 1st csw Flip-Flop ON and with a short and suitable delay thereafter a pulse is delivered to the conductor 198 labeled Clear the 1st csw Flip-Flop. The precise way in which pulses on the conductor 197A and the conductor 198 operate to insure that the contents of the IO Word Counter are not transferred while that counter is being stepped will become more apparent subsequently.

Since two-word messages are stored on the input drum, any set of instructions to read words from that drum should establish an even number of words to be read.

If as has been assumed, the first word read from the drum is accepted and transferred to the IO Registers, then the second one is bound to be accepted and for this reason when the CD Read Status Control Circuit 30 generates the Read Sample pulse for that second word, although the Read Control Circuit 178 receives this Read Sample pulse, it does not generate a pulse on the conductor 182

(Compare) in response thereto. The Read Sample pulse causes the signals stored in the drum register to be delivered to the IO Buffer Registers 164 and 165 and although the Read Sample pulse is delivered to the Selection and IO Control Element 49 and no pulse is received from the conductor 185 (No Compare) this second word might or might not be immediately transferred to the IO Registers 170 and 171 since those registers may still contain the first word read from the drum. The fact is stored in the Selection and IO Control Element 49 that the second accepted word is now stored in the IO Buffer Registers.

When the first word was transferred from the IO Buffer Registers to the IO registers (in response to the pulse on conductor 187) that fact (called a break request) was stored in the Selection and IO Control Element 49.

Referring back now to FIG. 10a, it will be noted that TP-11 pulses are delivered through an OR circuit 191 to a conductor 192 (Sense Break Request Flip-Flop). If IP pulses are being generated then at IP-11 time of each PT or OT cycle, a pulse will be delivered to the conductor 192 (Sense Break Request Flip-Flop). As will be described subsequently, IP pulses are generated except during the previously noted Pause operation and during a Break Operation. If a Pause operation is being performed and no Break operation is being performed, pulses at a 2 megacycle rate are produced on a conductor 193 labeled 2 mc. (Pause and No Break) and these pulses are delivered through OR circuit 191 to the conductor 192 (Sense Break Request Flip-Flop.).

The Sense Break Request Flip-Flop pulses on conductor 192 are delivered to the Selection and IO Control Element 49, where in response to one of these pulses and if the previously noted fact (called Break Request) has been stored, an operation called "Break in" is initiated by the generation of a pulse on a conductor 194 (Set Break Flip-Flop). This command 194 (Set Break Flip-Flop) is delivered to the Instruction Control Element 51 where it causes the generation of IP pulses to cease and insures the generation of TP pulses.

This "Drum Break in" operation essentially starts a memory cycle and during that memory cycle the word stored in the Left and Right IO Registers 170 and 171 is delivered to the Memory Element 34 where it is stored at the location specified by the contents of the IO Address Counter 169. This Memory cycle, like any other, begins at TP-1 and ends at TP-11. In order to distinguish this type of memory cycle from other memory cycles the time periods from 1 through 11 are referred to as "break in" (BI) pulses BI-1, BI-2, etc. Since these BI time periods are controlled by TP pulses generated by the Time Pulse Distributor 52 (FIG. 10a), they are substantially coincident in time therewith.

As previously noted, the commands 59 (Clear Memory Controls), 60A (Clear Left Memory Buffer Register) and 60B (Clear Right Memory Buffer Register) are generated directly from the output of the Time Pulse Distributor 52 (FIG. 10a). During the "Break in" operation of the Selection and IO Control Element 49 (FIG. 3g) the following commands are generated by the Selection and IO Control Element 49 at the times indicated:

TABLE 19

| Conductor (Command) Number | Name | Time |
| --- | --- | --- |
| 195A | Start Memory | BI-2 |
| 195B | IO Address Counter to Memory Address Register. | BI-1 |
| 195C | Clear Break Request Flip-Flop | BI-1 |
| 196A | Add ONE to IO Address Counter | BI-2 |
| 196B | Clear IO Reg Status Flip-Flop | BI-2 |
| 196C | Left IO Register to Left Memory Buffer Register. | BI-2 |
| 196D | Right IO Register to Right Memory Buffer Register. | BI-2 |
| 196E | Inhibit Sample | BI-2 |
| 199 | BI-11 | BI-11 |

In response to the command 59 (Clear Memory Controls), the command 195A (Start Memory), and the Command 196E (Inhibit Sample), the Memory Element 34 performs the previously noted write memory operation. The word written into memory is the first word accepted from the drum since commands 196C and 196D are generated at BI-2 time and these commands cause the signals stored in the Left and Right IO Registers 170, 171 to be transferred to the Left and Right Memory Buffer Registers 43 and 44 by way of the conductors of cables 200 and 201, respectively. The memory location into which this word is written is the location specified by the contents of the IO Address Counter since the command 195B (IO Address Counter to Memory Address Register) is generated at BI-1 time.

The command 196A (Add ONE to IO Address Counter) is delivered to the IO Address Counter 158 which in response to this pulse causes the number stored therein to be increased by ONE so that the second word read from the drum will be stored in the next higher address in memory.

During the time period BI-1 through BI-5, the fact is stored in the Selection and IO Control Element 49, that the IO Register status has been made empty (commands 196C and 196D having been generated). As previously mentioned, the fact that the IO Buffer Register now contains the second accepted word is also stored therein. These two facts cause the Selection and IO Control Element 49 to generate a pulse on conductor 187 (IO Buffer Registers to IO Registers and Clear IO Buffer Registers) and also causes the fact (called Break Request) to be stored, thus initiating another "Break in" operation when the next pulse on conductor 192 (Sense Break Request Flip-Flop) is received.

In this manner words read from the drum are stored in memory and this operation of reading words from the drum, comparing and storing accepted words in memory continues until either the IO Word Counter 169 produces a pulse on the conductor 175 (IO Word Counter End Carry) or the Read Control Circuit 178 generates a pulse on a conductor 202 (Read disconnect). The pulse is generated on the conductor 202 if the drum has made a complete revolution since the Read Control Circuit 178 received a pulse on the conductor 177 (Start Read Drum).

The pulse on conductor 202 is delivered through an OR circuit 203 and by way of a conductor 204 (Drum Disconnect) to the Selection and IO Control Element 49. A pulse on either the conductor 204 (Drum Disconnect) or the conductor 175 (IO Word Counter End Carry) causes the Selection and IO Control Element to generate a pulse on a conductor 205 (Clear IO Interlock). The primary result of the command 205 (Clear IO Interlock), which is delivered to the Cycle Control Circuit 52 (FIG. 10b) is to allow subsequent Input Output class instructions or a Program Stop Instruction to be executed.

*Clear and Subtract Word Counter Instruction*

Before instructions are executed to process the words read from the drum, it is important that the exact number of words which were read, be stored in the Memory Element 34. In actual use, it is sometimes desirable to inspect the contents of the IO Word Counter and if the contents are ZERO (indicating that the drum may still have words stored thereon which would compare as to source identification), to perform a Branch operation in the program back to the same read sequence of instructions (Load Address Counter, Select Drums and Read) described above. Conditional Branch operations (conditional upon the sign of the word in the accumulator register of the computer) are well known in the art and one form of such a data processing machine is described in the above mentioned copending application Serial Number 471,002. When it is desired to inspect the contents of the IO Word Counter, the instruction called Clear and Subtract Word Counter is executed.

Referring back now to FIG. 11b, besides the Common Commands described with respect to Table 6 above, the following commands are generated by the Instruction Control Element 51 in response to the instruction Clear and Subtract Word Counter.

TABLE 20

| Command (Conductor) Number | Name | Time |
| --- | --- | --- |
| 89 | SET 2nd csw FF | PT-9 |
| 121 | Clear Right Accumulator Register | PT-9 |
| 90 | IO Word Counter to Right Accumulator Register. | PT-1 |
| 91 | 1st csw Transfer | PT-1 |
| 90 | IO Word Counter to Right Accumulator Register. | PT-5 |

At PT 9 time the command 121 causes the Right Accumulator Register to be cleared. At this same time the command 89 is generated and this command is delivered to the Cycle Control Circuit 54 (FIG. 10b) where it causes the conductor labeled 2nd csw FF ON to be made positive. At PT-1 time the commands 90 and 91 are generated provided that the conductor from the Cycle Control Circuit labeled 1st csw Flip-Flop ON is positive. As previously stated, each time that the IO Word Counter 169 is stepped, the Selection and IO Control Element 49 generates the command 197A (Set 1st csw Flip-Flop ON) and after a suitable delay it generates the command 198 (Clear 1st csw Flip-Flop). These two commands are delivered to the Cycle Control Circuit 54 (FIG. 10b) where in response to these commands, the conductor labeled 1st csw FF ON is first made negative (command 197A) and then returned to a normally positive potential (command 198). As a result of these commands, the conductor labeled 1st csw Flip-Flop ON is made negative during the time that the IO Word Counter 169 is being stepped. Referring back now to Table 20 above, if the IO Word Counter is being stepped at PT-1 time, the commands 90 and 91 will not be generated at PT-1 time; however, the command 90, under this condition, will be generated at PT-5 time since command 89 was generated at PT-9 time and command 91 was not generated at PT-1 time. If the IO Word Counter is not being stepped at PT-1, then the output conductor of the Cycle Control Circuit 54 will be positive and for this reason the commands 90 and 91 are generated at this time. The command 91 is delivered to the Cycle Control Circuit 54 where it causes a negative potential to be produced on the conductor 2nd csw Flip-Flop ON. This negative potential prevents the command 90 from being generated at PT-5 time.

This command 90 is delivered to the IO Word Counter where, in response to this command, signals are delivered by way of the conductors of a cable 210 to the Right Accumulator Register of the Right Arithmetic Element.

From this description of the Clear and Subtract Word Counter Instruction, it will be evident that this instruction may be performed while the IO Interlock is still on and that the contents of the IO Word Counter are stored in the Right Accumulator Register at the completion of this instruction. It will also be noted that the number represented by the contents of the IO Word Counter is the complement of the number of words specified by the Read instruction plus ONE plus the number of words which have been transferred. By suitable subsequent instructions, this number may be converted, for example, to the actual number of words which have been transferred.

Determining Age of Input Words

From the above description it will be seen that all input words or messages were time tagged and at the conclusion of reading operations these time tagged messages were stored in the high speed memory element 34. In certain real time applications it is entirely possible that due to the length of the program or for any one of numerous other reasons, certain input words or messages may be of such an age that they are no longer useful and further processing would be unnecessary. It is therefore sometimes desirable even before processing of input words begins to discard all input words which are too old. For this reason operations are performed to permit the present contents of the clock register to be transferred to the high speed memory or to the arithmetic elements where processing of that time information and the input words can take place to determine which of the input words are beyond a predetermined age. As mentioned previously the time tagging of input words was accomplished by means of the equipment in the Time Tag Section 10, FIG. 3e, and this Time Tag Section was essentially a counter which counts the number of pulses received on the conductor labeled 1 Pulse Every 0.25 Seconds and this counter is reset, if required, by pulses on the conductor labeled 1 Pulse Every 8 Seconds. The pulses on the conductors labeled 1 Pulse Every 0.25 Seconds and 1 Pulse Every 8 Seconds are produced by the equipment shown as block 211 in FIG. 3h and labeled Clock Register. The equipment within block 211 essentially includes a very accurate source of timed pulses and a register for counting the number of pulses produced; therefore effectively this equipment is a clock. This clock preferably has a capacity for indicating time up to approximately 34 minutes, 8 seconds, which time can be specified by binary signals having 16 orders. Therefore the clock register is a 16 stage register.

When it is desired to transfer the contents of the clock register to the arithmetic element where the information may be either used directly or subsequently stored in memory, the instruction Clear and Add is performed and this Clear and Add instruction in its address part has a binary number which in the 3 highest orders specifies the clock register rather than the high speed memory element 34. When this address part of the Clear and Add instruction has been received by the address register 155 (FIG. 3b) and the operation part of this Clear and Add instruction has been decoded by the Instruction Control Element 51, the command Address Register to Memory Address Register (68) is delivered to the address register 155 where in response to this pulse the binary code in the 3 highest orders of the address cause a pulse to be delivered to the memory unit selection circuit 58 (FIG. 10c) whereupon that circuit causes a positive potential to be delivered to the conductor labeled Time Clock. This positive potential on the conductor labeled Time Clock causes the command 77 (Clock Register to Memory Buffer Register) to be generated and this command is generated at OT-3 time. The normal commands of the Clear and Add instruction are also performed during this instruction of Clear and Add the Clock Register and therefore at the conclusion of the Clear and Add the Clock Register instruction, the contents of the clock register are stored in the right accumulators. Since the present time as indicated by the contents of the clock register is now available to the programmer it is a mere matter of suitable programming instructions to determine which of the input words are of such age that they can be disregarded.

Generation of Moving Object Control Signals

In the particular application of the apparatus shown and described herein the incoming messages indicate in polar form the instantaneous position or positions of various moving objects. By suitable programming of the computer this information in polar form may be converted into rectangular form and the various instantaneous positions of a given moving object can be correlated into a track of that object so that its past and its present position can be used to predict its future position by the computer. If the past, present, as well as probable future positions of a given object are known it is merely a problem of suitable programming to generate binary signals representative of the turn required for the moving object to arrive at a predetermined position. However, as mentioned above and as will be more fully described hereinafter, any such control signals which are computed would have to be delivered without time delay to the moving object. Since the delivery of control signals from the computer to the moving object does not involve time delay and furthermore since this time delay is variable, it will be necessary for information to be made available to the machine program as to precisely how much delay will be involved in any given control signal which is to be generated.

*Writing Operation on the Output Drum*

In order to effect a writing operation on the Output Drum, the program must include a sequence of three instructions. These three instructions, which are Load Address Counter (ldc), Select Drums (sdr) and Write (wrt), are preferably performed in the order as stated.

Drum Writing operations are normally performed on a block basis, that is, the sequence of three instructions merely establishes that the word stored in a specified memory register (whose address is indicated by the Load Address Counter instruction) is the first word to be written on the drum, subsequent words are to be taken from successively higher order addresses in memory, that words are to be transferred from Memory to the Output Drum (the Select Drums instruction) and that a specified maximum number of words are to be written on the drum (the maximum number of words being specified by the Write instruction).

The Load Address Counter instruction and the Select Drums instruction, during a Drum writing operation, perform exactly the same results as previously described with respect to the above drum reading operation except that during a writing operation the index interval part of the Select Drums instruction specifies the binary code 011 000 to write in odd numbered registers of the output drum or 011 001 to write in even numbered registers.

As indicated in FIG. 11Y, the Write (wrt) instruction causes the following commands, besides the Common Commands described with respect to Table 6 above, to be generated:

TABLE 21

| Conductor Command Number | Name | Time |
|---|---|---|
| 96 | Pause | PT-10 |
| 80A | Clear IO Word Counter | PT-1 |
| 80B | Set IO Interlock ON | PT-1 |
| 81A | Clear Left IO Register | PT-2 |
| 81B | Clear Right IO Register | PT-2 |
| 79 | Address Register Complement to IO Word Counter | PT-2 |
| 82 | Sense IO Word Counter | PT-3 |
| 87 | PT-6 on Write | PT-6 |

The operation performed by these commands is substantially identical to that described with respect to Table 18 above, except that at PT-6 time the command 87 (PT-6 on Write) is generated instead of 86 (PT-6 on Read).

In the event that the write instruction specifies a zero number of words to be transferred, then essentially the same results are obtained as those produced during the read zero instruction except that during a write zero instruction the Selection and IO Control Element 49 does not produce a pulse on a conductor 212 labeled Start Write.

In the event that the write instruction specifies a number of words to be written on the drum which is greater than zero, the command PT-6 on Write (87) being delivered to the Selection and IO Control Element 49 causes the generation of the command 212 Start Write Drums by the Selection and IO Control Element with substantially no time delay and a fact which is called 1st Break Request is stored in the Selection and IO Control Element and another fact called 2nd Break Request is stored. This Start Write command 212 is delivered to the CD Write Control circuit 161. As mentioned above during the select drums instruction the index interval part of that instruction specifies by means of a binary code that the words to be written are to be written in even numbered registers or in odd numbered registers of the drum. This binary code being delivered from the Selection and IO Control Element to the Drum Selection Register 160 and being decoded causes a conductor 213 (Select OB EVEN) or a conductor 214 (Select OB ODD) to be accordingly made positive. The positive potentials on the conductors 213 or 214 are delivered to the CD Write Control Circuit 161 which in response to this positive D.C. level, in response to the Deselect pulse (93) which is generated at OT-5 time of the select drums instruction and in response to the Start Write command 212, produces a positive D.C. level on conductor 215 (Write) after a pulse is received on conductor 219C which indicates that the Write Register is full. The manner in which the words are delivered to the Write Register 166 will now be described.

As mentioned above at the end of the Write instruction the Selection and IO Control Element 49 has stored therein the fact called 1st Break Request as well as the fact called 2nd Break Request. With these facts stored and in response to a pulse on a conductor 192 Sense Break Request (Sense Break Request is generated at TP-11 time as well as at a 2 megacycle rate during pause) the Selection and IO Control Element generates the command 194—Set Break Flip-Flop—with substantially no time delay. The Selection and IO Control Element then generates the following commands at the times indicated:

TABLE 22

| Command Number | Name | Time |
|---|---|---|
| 195B | IO Address Counter to Memory Address Register. | BO-1 |
| 195A | Clear Break Request Flip Flop | BO-1 |
| 195A | Start Memory | BO-2 |
| 196A | Add One to IO Address Counter | BO-2 |
| 217A | Set IO Register Status Flip Flop To Full | BO-7 |
| 217B | Right Memory Buffer to Right IO Register | BO-7 |
| 217C | Left Memory Buffer to Left IO Register | BO-7 |
| 218 | BO-11 | BO-11 |

Since the memory controls are cleared with TP-0 pulses and since Start memory is generated at BO-2 time and no inhibit sample pulse is generated the memory element produces the above noted read operations and the word stored in the memory location specified by the IO address counter is delivered to the Left and Right Memory buffers since the contents of the IO address counter is transferred to the memory address register at BO-1 time. The command 195A Clear Break Request Flip-Flop being generated at BO-1 time causes the previously noted fact called 1st Break Request to be destroyed. At BO-7 time the signals stored in the left and right memory buffers are transferred by way of the conductors of cables 43A and 44A to the left and right IO registers 170 and 171 respectively and the fact is stored in the Selection and IO Control Element that the IO Register Status is now full. The Selection and IO Control Element further includes a Status Flip-Flop for storing information as to the status of the Write Register 166. That flip-flop for remembering the status of the Write Register is always set to indicate an empty status during the Select Drums instruction in response to the Deselect command 155. Since the Selection and IO Control Element now has stored therein the fact that the Write Register is empty, the IO Register is full, and further has stored the fact that the drums have been selected, the Selection and IO Control Element now generates a command 219A (Right IO Register to the Write Register), 219B (Left IO Register to Write Register), and both of these commands also clear the respective IO Registers.

When the commands 219A and 219B are delivered to the Right and Left IO Registers 171 and 170, respectively, those registers deliver the signals stored therein to the Write Register 166 by way of the conductors of cables 171A and 170A.

When commands 219A and 219B are generated, the command 219C (IO Register to Write Register) is delivered to the CD Write Control Circuit 161 (FIG. 3f). Following this time of BO–7, since the fact called 2nd Break Request is now stored, a fact called Break Request is stored and the fact called 2nd Break Request is destroyed. The Selection and IO Control Element receives TP–11 pulses and if the above noted fact called Break Request is stored, a pulse is produced by the Selection and IO Control Element on the conductor 194 labeled Set Break Flip-Flop and in this manner the second memory cycle is devoted to a break out operation. The commands of Table 22 are again generated resulting in the word stored in the next higher address in memory being delivered to the IO registers and of course the facts are now stored in the Selection and IO Control Element that the IO Register and the Write Register are now both full. It will be recalled that the CD Write Control circuit 161 caused the conductor 215 (Write) to be made positive after the Write Register has received the first word to be written on the drum. This positive D.C. level on conductor 215 sets the CD Write Status Control section into operation, that is, that circuit now receives signals from a read head 250 which reads the status signals recorded in the OB–CD status control channel. Therefore if a binary ONE signal is received by the CD Write Status Control section indicating that the register is full, that circuit delivers a Write a One signal to a Write head 251 causing a binary ONE to be written in the OB–OD status control channel. In the event that a binary ZERO is read from the OB–CD status control channel then the CD Write Status Control section 216 delivers a pulse to a conductor 252 which causes a CD Write Section 253 to be sampled, the signals which were previously stored in the Write register are written into the register in the drum which was empty and the CD Write Status control section 216 delivers a binary ONE signal to the Wrte head 251 to store in the OB–OD status control channel the information that this register is now full. The CD Write Status control section delivers a pulse to a conductor 254 2½ microseconds after each time that it samples the write circuits 253. This pulse on conductor 254 is delivered through an OR circuit 255 to the reset input of the Write register. The pulse on conductor 252 which as previously mentioned samples the write circuits 253 is also delivered on the conductor labeled Word Demand to the Selection and IO Control Element 49. In response to this pulse on conductor 252 the IO register contents will be transferred to the Write register and if the IO word counter has not gone to ZERO another break out operation as above described will be performed wherein the 3rd word is transferred from memory to the IO register and this operation continues, that is, the words placed in the Write register are written on the drum and another word is taken from memory until such time as the IO word counter goes to ZERO or one complete revolution of the drum has been made in which event the CD write control circuit 161 delivers a pulse to a conductor 256. This pulse on conductor 256 is delivered through an OR circuit 203 to the Selection and IO Control element where various control flip-flops are reset in response to this pulse and a pulse is delivered to the conductor 174 (Clear IO Interlock).

Reading From Output Drum

Words delivered by the computer to the output drum each consists of a left half and a right half word. The right half word of each word is the actual data to be transmitted to some load device whereas the left half word includes various binary coded tags. Reference is now made to FIG. 12 which illustrates the bit assignments of a drum word. Bits left sign through left 2 are a binary code which specifies to which of several output transmission systems the word is to be sent. Although in a preferred embodiment of this invention there are 3 distinct output sections for words read from the drum, only that output section hereinafter referred to as section 1 will be described. In order to cause a drum word to be delivered to that section, the binary code 100 is placed in bit positions left sign through left 2 of the drum word. Bits left 3 through left 7 of the left half word of each drum word are binary code specifying which one of a possible 26 addresses of a core memory array the particular word is to be temporarily stored in. Bits left 8 through left 15 of the left half word of each drum word are a binary code which specifies the order in which this word with respect to all other drum words is to be taken from the output drum. The entire right half word, right sign and right 1 through right 15 are binary signals which are to be actually transmitted to the load device which in the assumed instance is the device or devices to be controlled.

Referring now to FIGS. 3a through 3h and more particularly to FIG. 3e, a read head 300 is positioned adjacent to the OB–OD status channel and signals induced in that read head are delivered to an OD read status control section 301. When a binary ONE is read from the OB–OD status channel the OD read status control section 301 delivers a pulse to a conductor 302 thereby causing sampling of OD read circuits 303. That same pulse on conductor 302 is also delivered to a parity generator 307 where in response to this pulse a pulse is delivered to a conductor 308 which is delayed in time by a suitable amount (delayed long enough to insure that the word read from the drum is actually stored in the drum word register). This pulse on conductor 308 inspects each bit of the word read from the drum and determines whether there was an odd or an even number of binary ONES in the word which was delivered from the OD read circuits 303 in response to the read sample pulse and those signals read from the drum are stored in the various registers 309 through 313 of the Drum Word Register. If there was an odd number of binary ONES in the word read from the drum, a pulse is delivered to a conductor 314 labeled Parity OK whereas if the word has an even number of binary ONES then a pulse is delivered to a conductor 315 labeled Parity No Good. In response to this pulse on conductor 308 the data register 309 as well as the various other storage circuits of the drum word register were inspected to determine the total number of binary ONES and if the total number of binary ONES stored in the data register 309 is odd, a pulse is delivered to a conductor 316 which when received by the parity generator 307 causes a positive D.C. level to be established on a conductor labeled Parity. As will be apparent hereinafter the timing and control is such that immediately prior to reading a drum word the drum word register is cleared, that is, all storage circuits in the drum word register are set in their binary ZERO state and therefore only those circuits receiving a binary ONE signal (a pulse) from their corresponding read heads of the drum will be set to their binary ONE state. The D.C. levels representative of the bits stored in the section address register 312 are delivered by way of the conductors of a cable 320 to a section decoder 321 where these D.C. levels on the conductors of cable 320 cause a selected one of the conductors of a cable 322 to be made positive. The D.C. levels representative of the bits stored in the array address register 311 are delivered by way of the conductors of a cable 323 to an address decoder 324 where the particular code causes a selected one of the conductors of a cable 325 to be made positive provided that the signals received from the conductors of cable 323 represent a binary number between 0 and 26. In the event that the binary number represented by the signals on the conductor of cable 323 is a number greater than 26 then a positive D.C. level will be established on one of the conductors of a cable 326 labeled Address Too High.

*Section 1 Control*

Before proceeding with a further description of FIGS. 3a through 3h, a detailed description will be made of the Section 1 Control which is shown as block 327 in FIGS. 3c and 3d.

Referring now to FIGs. 13a and 13b, OD–1 pulses are delivered through a delay unit 400 to a conductor 401 labeled OD–1+1.0 microsecond as well as to another delay unit 402 whose output conductor 403 is labeled OD–1+1.9 microseconds. OD–4 pulses are delivered through a delay unit 404 to a conductor 405 labelled OD–4+0.4 microsecond. The Section 1 Control circuit further includes a source of 1300 pulses per second which is derived from a tuning fork oscillator 406 whose output is applied through a Schmitt Trigger 407 and a pulse generator 408. These 1300 pulses per second appear on a conductor 409 and each of these pulses causes a flip-flop 410 to be set in its binary ONE state. The flip-flop 410, when in the binary ONE state, conditions a gate 411 to pass a pulse received from the delay unit 404. The OD–4+0.4 μsec. pulses which are passed by gate 411 cause a flip-flop 412 to be set in the binary ONE state thereby conditioning each of the gates 413, 414, and 415. Gate 413, when conditioned, passes a pulse from the conductor labeled OD–2 to a conductor 416 labeled OD–2–13. A pulse on the conductor 416 causes the flip-flop 410 to be cleared. Gate 414, when conditioned, passes a pulse received from the conductor labeled OD–3 to a conductor 417 labeled OD–3–13 and gate 415 when conditioned passes a pulse received from the conductor labeled OD–4 to a conductor 418 labeled OD–4–13. A pulse on conductor 418 causes flip-flop 412 to be cleared. OD–3–13 pulses on conductor 417 are delivered to a conductor labeled Timing as well as to various other circuits within the Section 1 Control circuit. From the above description it will be seen that each pulse on conductor 409 causes first a pulse to be delivered to the conductor labeled OD–2–13 followed by a pulse on conductor labeled OD–3–13 followed by a pulse on conductor labeled OD–4–13. Pulses on those conductors are therefore pulses which occur at a 1300 pulse per second rate and the OD–2–13 pulses precede the OD–3–13 pulses by 2½ microseconds and the OD–3–13 pulses precede the OD–4–13 pulses by 2½ microseconds.

The delayed OD pulses and the 1300 pulses thus far described are delivered to various control circuits as will be described hereinafter. The Section 1 Control further includes a circuit outlined by dotted lines 419 to be referred to hereinafter as a 13 counter. This Section 1 Control further includes a circuit outlined by dotted lines 420 which will be referred to hereinafter as a 25 counter.

Assuming for purposes of illustration that the 1st stage 421 of the 13 counter is in its binary ONE state, having been primed into that state in a manner which will be subsequently described, and furthermore assuming that a flip-flop 422 is in its binary ZERO state, each OD–2–13 pulse on conductor 416 is passed by a gate 423 since that gate is conditioned when flip-flop 422 is in the binary ZERO state. Pulses passed by gate 423 to a conductor 424 are delivered through an OR circuit 425 to cause a flip-flop 426 to be set in its binary ONE state and this flip-flop 426 is cleared to its ZERO state by each OD–3 pulse. In this manner, as long as flip-flop 422 is in its binary ZERO state flip-flop 426 will be set in its ONE state at a 1300 cycle rate and will remain in that state for 2½ microseconds. The one output of flip-flop 426 on conductor 427 is applied to the shift windings of each stage of the 13 counter. Under the above assumed condition that the 1st stage 421 of the 13 counter is in its binary ONE state a first shift pulse on conductor 427 will cause that binary ONE state to be transferred to the 2nd stage of that register, a second shift pulse will cause the binary ONE state to be transferred from the 2nd stage to the 3rd stage, and so forth. When the binary ONE state is transferred from the 13th stage of the 13 counter a gate 428 is conditioned to pass an OD–3–13 pulse to a conductor 429. A pulse on conductor 429 causes a flip-flop 430 to be set in its ONE state. Further assuming that a gate circuit 431 is conditioned, OD–4–13 pulses are passed by that gate through an OR circuit 432 to cause the flip-flop 430 to be cleared. In this way when the 13 counter produces an end carry, flip-flop 430 is turned on for 2½ microseconds and the output of flip-flop 430 on conductor 433 is applied to the shift winding of each stage of the 25 counter. Further assuming that the 1st stage 434 of the 25 counter has been primed, the first shift pulse on conductor 433 will cause the binary ONE state to be transferred from the 1st stage 434 of the 25 counter to the 2nd stage. This operation of shifting the 13 counter at a 1300 cycle rate and shifting the 25 counter in response to the end carry of the 13 counter continues until such time as the 25th stage of the 25 counter produces an output on conductor 435. A pulse on conductor 435 is applied to the conditioning input of a gate 436 which is sampled by OD–4–13 pulses and delivers an OD–4–13 pulse to its output conductor 437 under the condition that the binary ONE state has been shifted out of the 25th stage of the 25 counter. Pulses on conductor 437 are delivered through the previously mentioned OR circuit 425 to cause the flip-flop 426 to be set in its ONE state. Pulses on the conductor 437 are also delivered to cause the previously mentioned flip-flop 422 as well as another flip-flop 438 to be set in their binary ONE states. Since flip-flop 422 is set in its ONE state under the 25 counter end carry condition, and since flip-flop 426 is set in its binary ONE state at this time, flip-flop 426 will remain in its binary ONE state for approximately 7½ microseconds since this flip-flop is cleared with OD–3 pulses. Since flip-flop 426 remains in its binary ONE state for 7½ microseconds under the condition of the 25 counter end carry, the 13 counter will be cleared due to this long shift. A pulse on conductor 435 in addition to being applied to the gate 436 to perform the above mentioned operation is also applied through an inverter 439 to the conditioning input of the previously mentioned gate 431 and therefore under the condition that the binary ONE state is being transferred from the 25th stage of the 25 counter, gate 431 will not be conditioned and therefore will not pass an OD–4–13 pulse to clear the flip-flop 430. Since flip-flop 430 remains in its binary ONE state under this 25 counter end carry condition, its output conductor 433 which is now positive conditions a gate 440 to pass the next following OD–3 pulse through the previously mentioned OR circuit 432 to clear the flip-flop 430. Since the flip-flop 430 is set by OD–3–13 pulses and under the 25 counter end carry condition is cleared with an OD–3 pulse, that flip-flop remains in its binary ONE state for substantially 10 microseconds which is a sufficiently long time to cause a clearing operation of the 25 counter. The pulse passed by gate 440 during the above described 25 counter end carry condition, in addition to being applied to the OR circuit 432 to clear the flip-flop 430, is also applied to the input of a single shot 441 which in response to this .1 microsecond pulse delivers a pulse 2½ microseconds in duration to a conductor 442 which is applied to the input winding of the 1st stage 421 of the 13 counter as well as to the input winding of the 1st stage 434 of the 25 counter thereby causing the 1st stages of those 2 counters to be primed with a binary ONE. From the above described operation it will be seen that the 13 counter end carry causes a count of one to be entered into the 25 counter until such time as the 25 counter produces an end carry and at that time both the 13 counter and the 25 counter are cleared and subsequently primed with a ONE in their lowest order stages. It should be noted that the 13 counter is a closed ring in its normal operation since the pulse on the output of the 13th stage is applied to the input of its 1st stage.

When the binary ONE state is transferred from the 1st stage to the 2nd stage of the 25 counter a pulse is delivered to a conductor 443 which is applied to the input of a thyratron core driver circuit 444 which in response to this pulse delivers a current pulse to a conductor 445 which as will be subsequently described causes one column of a core array to be read out. When the binary ONE state is transferred from the 2nd stage 446 of the 25 counter to the 3rd stage 447, a pulse is delivered to a conductor 448 which causes another thyratron core driver 449 to produce a current pulse on its output conductor 450. In this manner each of the stages 1 through 18 of the 25 counter causes its associated thyratron core driver circuit to produce a current pulse on its output conductor when the binary ONE state is transferred from that stage. When the binary ONE state is transferred from the 19th stage 451 of the 25 counter, a gate 452 is conditioned to pass the next received OD-4-13 pulse to its output conductor 453. A pulse on the output conductor 453 causes a flip-flop 454 to be set in its binary ONE state and also causes a flip-flop 455 to be set in its binary ZERO state. When the binary ONE state is transferred from the 1st stage 434 of the 25 counter, the pulse produced on the conductor 443 besides being applied to the thyratron core driver 444 as above described is also applied to the conditioning input of a gate 456 to permit that gate to pass the next received OD-4-13 pulse to cause the previously mentioned flip-flop 455 to be set in its binary ONE state. When the binary ONE state is transferred from the 2nd stage of the 25 counter the pulse on conductor 448 causes a gate 457 to be conditioned to pass the next received OD-4-13 pulse, thereby causing the flip-flop 458 to be set in its binary ZERO state. When the 7th stage 459 of the 13 counter transfers its binary ONE state to the 8th stage of the 13 counter a gate 460 is conditioned to pass the next received OD-3-13 pulse to sample a gate 461. When the binary ONE state is transferred from the 12th stage 462 of the 13 counter a gate 463 is conditioned to pass the next received OD-3-13 pulse to sample a gate 464. When the 25 counter end carry is produced, the flip-flop 438 is set in its binary ONE state as above described and when in that state, gates 461 and 464 are conditioned. Gate 461 then passes the pulse produced by gate 460 when the 13 counter equals 7 to cause the previously mentioned flip-flop 454 to be set in its binary ZERO state. When flip-flop 438 conditions the gate 464 it passes the pulse produced by gate 463 under the 13 counter equals 12 condition, to clear the flip-flop 438 and also deliver that .1 microsecond pulse to a conductor labeled Sync. When the 25 counter equals 1 and the previously mentioned gate 456 passes the OD-4-13 pulse to set the shift flip-flop 455 in the ONE state, this pulse passed by gate 456 samples a gate 465 which, if conditioned, passes the pulse to set the flip-flop 458 in its ONE state. Gate 465 is conditioned by the output of an AND circuit 466 whose inputs 467 and 468 are from a burst counter to be subsequently described. Flip-flop 458 when in the binary ONE state conditions a gate 469 to pass the next received OD-3-13 pulse to its output conductor 470 labeled Automatic Busy Bit. When flip-flop 455 is in the binary ONE state it conditions a gate 471 to pass the next received OD-2-13 pulse to set a flip-flop 472 in its binary ONE state. Flip-flop 472 is cleared by OD-3-13 pulses. Since flip-flop 455 is turned on when the 25 counter equals 1 and is not turned off until the 25 counter equals 19, gate 471 is conditioned during this period and will result in flip-flop 472 producing 2½ microsecond pulses on its output conductor 473 labeled Shift the Output Shift Register and these pulses will be equidistantly spaced in time and there will be 5 of these pulses after each thyratron core driver delivers an output.

Briefly summarizing the above, the Section 1 Control first delivers a positive D.C. level on its output conductor labeled Search which is actually the ONE output of flip-flop 454 and this positive D.C. level stays up from the time that the 25 counter equals 19 until the 13 counter equals 7 after the 25 counter equals 25. When the positive D.C. level ceases on the conductor labeled Search then the positive D.C. level is produced on the conductor labeled Not Search which is actually the ZERO output of the flip-flop 454 and this positive D.C. level will remain until the flip-flop 454 is returned to its ONE state. During the time that the positive D.C. level is maintained on the conductor labeled Not Search the 25 counter causes the thyratron core drivers to be sequentially pulsed and as will be apparent subsequently these thyratron core drivers thereby cause the columns of a core array to be sequentially read out of and after each thyratron core driver has produced a pulse, 5 successive 2½ microsecond pulses will be delivered to the conductor 473 labeled Shift the Output Shift Register.

Referring back now to FIGS. 3c, 3d and 3e, the Burst Number Register 310, which receives the bits Left 8 through Left 15 of each drum word, delivers that burst number signal by way of the conductors of a cable 480 to a burst time counter and compare circuit 481. The burst time counter and compare circuit is essentially two counters, one called a burst counter and the other called an elapsed time counter. The burst counter receives pulses from the conductor 453 labeled Step Burst Counter, and in response to each of these pulses, adds one to the contents of the burst counter and the contents of the burst counter are compared with the signals received from the conductors of cable 480. If the comparison is successful, one of the conductors of a cable 482 is made positive. The elapsed time counter in the burst time counter and compare circuit 481 receives pulses from the conductor 483 and each pulse received on that conductor causes the elapsed time counter to be reset to ZERO. The elapsed time counter also receives pulses from the conductor 484 and in response to each pulse on that conductor causes a ONE to be added to the elapsed time counter. In order to synchronize the pulses on the conductor 484 with the drum system timing, OD-2 pulses are also delivered to the elapsed time counter of the burst time counter and compare circuit 481. As previously mentioned, the output system of a preferred embodiment of this invention includes three sections labeled Section 1 through Section 3. Section 1 and Section 2 each have independent control circuits, not shown, and each of the sections 2 through 3 also has a burst counter and therefore the other two conductors of cable 482 are provided for delivering a signal when a successful comparison between the signals in those burst counters and the burst number tag of the drum word has been made. The D.C. levels on the conductors of cable 482 as well as the D.C. levels on the conductors of cables 322 and 326 are delivered to an array read in control 485. The array read in control further receives D.C. levels on the conductors labeled Search, Not Search.

*Array Read-In Control*

Reference is now made to FIGS. 14a and 14b which illustrate in logical block form the details of the array read in control indicated in FIG 3d as block 485. One of the conductors of cable 322 will be made positive under the assumed conditions that the bits Left sign through Left 2 of the drum word specify the binary number 100 and this conductor is indicated in FIG. 14a as conductor 490 labeled Select Section 1. This positive D.C. level on conductor 490 is delivered to an AND circuit 491. The AND circuit 491 receives two additional inputs, one from the conductor 492 labeled Search Section 1 and the other being conductor 493 labeled Compare Section 1. AND circuit 491 will therefore produce a positive D.C. level on its output conductor under the condition that the Section 1 control circuit delivers a positive D.C. level to the conductor 492 labeled Search Section 1, that the burst number of the word read from the drum actually compared with the burst counter of Section 1 and that the bits Left sign through Left 2 specifies the binary number 100. This positive D.C. level from AND circuit 491 is delivered to the conditioning input of a gate 494 and an inverter 495.

There are two AND circuits 497 and 498 associated with the control of transmission of words destined for Section 2 and another AND circuit 499 for control of words destined for Section 3. Only one of these AND circuits 491, 497, 498 or 499 can produce an output D.C. level in response to a given drum word, therefore, under the assumed condition that AND circuit 491 produces a positive output, the other 3 AND circuits will necessarily produce a negative output. The output of AND circuit 497 is delivered to the conditioning input of a gate 500 and an inverter 501, the output of AND circuit 498 is delivered to the conditioning input of a gate 502 and an inverter 503 and the output of AND circuit 499 is delivered to the conditioning input of a gate 504 and an inverter 505.

The outputs of inverters 495, 501, 503 and 505 are applied to the conditioning inputs of gates 506, 507, 508 and 509, respectively.

The outputs of AND circuits 491, 497, 498 and 499 are applied to an OR circuit 510 whose output is applied to each of two gate circuits 511 and 512 and with this arrangement gates 511 and 512 will be conditioned when any one of the AND circuits 491, 497, 498 or 499 produces a positive output potential. Gates 494, 500, 502 and 504 are each sampled with an OD–4+0.4 microsecond pulse whereas gates 502, 507, 508 and 509 are sampled by an OD–2 pulse passed by the gate 511. A pulse passed by gate 494 or 506 causes a flip-flop 513 to be set in its ONE state. This flip-flop is cleared by OD–4 pulses. gates 502 and 508 set a flip-flop 515 and gates 504 and 509 set a flip-flop 516.

Flip-flops 513 through 516 are each set to their ZERO states by a pulse on the conductor OD–1+1.0. The ZERO outputs of flip-flops 513 through 516 are respectively connected to Reset and Inhibit drivers 517 through 520. These reset and inhibit drivers are so constructed that in response to a positive potential they produce substantially no output current on their respective output conductors 521 through 524 whereas in response to a negative input potential they produce relatively large output currents.

As noted previously in the description of the operation of the drum word register in FIG. 3e, in the event that the total number of binary ONE's in the word read from the drum was odd, a pulse is delivered to the conductor 314 labeled Parity O. K. This pulse is delivered to the Array Read-In control of FIGS. 14a and 14b where it is applied through a delay unit 525 to the previously mentioned gate 512 and the timing of this pulse by proper adjustment of the delay unit 525 is such that this pulse arrives at the gate 512 at substantially OD–2+1.2 microseconds and in the event that gate 512 is conditioned, a pulse is passed to cause a flip-flop 526 to be set in its ONE state. This flip-flop is cleared by OD–4 pulses. Flip-flop 526, when in the ONE state, produces a positive output on its conductor 527, labeled Sample Set Drivers.

The operation of the Array Read-In Control thus far described will be explained with reference to FIG. 15 which is a family of curves illustrating in idealized form the potentials on various identified conductors. For the purpose of this description, it will be assumed that AND circuit 491 produces a positive output potential and therefore all of the other AND circuits, namely, 497, 498 and 499, will produce a negative output. This positive output produced by AND circuit 491 causes the gate 494 to be conditioned and gate 506 to be non-conditioned. AND circuit 497 producing a negative output causes gate 500 to be non-conditioned and gate 507 to be conditioned. Likewise, AND circuit 498 causes gate 502 to be non-conditioned and gate 508 to be conditioned, and AND circuit 499 causes gate 504 to be non-conditioned and gate 509 to be conditioned. At OD–1+1.0 time the selected flip-flop 513 as well as the non-selected flip-flops 514 through 516 are cleared. At OD–2 time gates 507, 508 and 509 pass the OD–2 pulse to cause flip-flops 514, 515 and 516 to produce a negative output. At OD–2+1.2 time gate 512 passes a pulse to cause flip-flop 526 to produce a positive output. At OD–4 time flip-flop 526 is cleared thereby producing a negative output. The output of flip-flop 526 therefore is a positive pulse whenever the word read from the drum has good parity and the word is accepted by one of the AND circuits 491, 497, 498 or 499. This positive pulse begins at OD–2+1.2 time and ceases at OD–4 time. At OD–4+0.4 time, gate 494 passes a pulse to cause the selected flip-flop 513 to be set in its binary ONE state thereby producing a negative output and at the next following OD–1+1.0 time, flip-flops 513 through 516 will be cleared.

*Half-Write Current Generator*

Referring back to FIGS. 14a and 14b and FIGS. 3d and 3e, conductors 521 through 524 form a cable group indicated in FIG. 3d as cable 530 and signals on those conductors are delivered to a Half-Write Current Generator 531. The previously described signals on the conductor 527, labeled Sample Set Drivers, are also delivered to the Half-Write Current Generator 531. The D.C. levels from the data register 309 are also delivered to the Half-Write Current Generator by way of the conductors of a cable 533 as well as the parity conductor 534.

As mentioned previously with respect to FIG. 3d, the address bits of the drum word are decoded in address decoder 324 to cause one of the conductors of cable 325 to be made positive and these conductors of cable 325 are also delivered to the Half-Write Current Generator 531.

Referring now to FIGS. 16a and 16b, the conductors of cable 533 (data), the conductor 534 (parity) and the conductors of cable 325 (address) are connected to respective circuits labeled STD and these circuits are known as Set Drivers. Essentially a set driver is a circuit which responds to a positive conditioning input potential and a positive sample pulse to produce a relatively heavy current pulse on its output conductor. These set drivers are so constructed that they will produce sufficient current on their output, in response to positive conditioning input and a sample pulse, to cause one of the four cores associated with that output conductor to assume a binary ONE state provided that the core is not inhibited. More specifically, set driver 540, for example, has associated with its output conductor 541 four cores 542 through 545. Core 542 is associated with another conductor 521 which is one of the conductors previously described with reference to FIG. 14b. Cores 543, 544 and 545 are likewise respectively associated with conductors 522 through 524. It will be understood that each of the conductors of cables 533 and 325 as well as conductor 534 has an associated set driver, the output of which is associated with a row of four cores. Conductor 521 in addition to being associated with core 542 as above described is also associated with a core in each of the rows of the array. Conductors 522 through 524 are likewise associated with a core in each of the rows of the array.

Reviewing the operation thus far described, the drum word is read and stored in the Drum Word Register by sampling the read circuit at OD–1 time and therefore shortly thereafter the conductors of cables 533 and 325 will arrive at their states representative of the data and address respectively identified by the drum word. The parity conductor 534 will arrive at its steady state representative of the parity of the 16 bit data word shortly before OD–2 time. As mentioned previously with reference to FIGS. 14a, 14b and 15, all of the reset and inhibit drivers 517 through 520 receive a positive potential beginning at substantially OD–1+1.0 time and therefore produce substantially no current to conductors 521 through 524. Beginning at OD–2 time the unselected conductors (as above assumed, conductors 522, 523 and 524 are unselected whereas conductor 521 is selected) produce a relatively heavy current and these currents are of such magnitude as to cause the cores associated with those conductors to be driven to their saturated state representative of a binary ZERO. Beginning at OD–2+1.2 time and ending at OD–4 time a positive potential is delivered to conductor 527 labeled Sample Set Drivers and this potential causes those set drivers which have been conditioned in response to the drum word to produce a current on their output conductors. This current is of sufficient magnitude to cause the selected core to be set in its binary ONE state but is not of sufficient magnitude to set the unselected cores since those cores are inhibited by the current from their respective reset inhibit drivers. At substantially OD–4 time those cores which are to be set in their binary ONE state have been so set and therefore the positive potential on conductor 527 ceases and this is immediately followed by the selected reset and inhibit driver producing a relatively heavy current. The current from the selected reset and inhibit driver causes those cores which were previously set in their binary ONE state to be reset to their binary ZERO state hereby producing a pulse in the sense windings associated with those cores.

The sense windings associated with Column 1 cores which receive data and parity signals form a cable group 550. The remaining cores of Column 1 which receive address signals have their sense windings form a cable group 551. The other three columns have their sense windings similarly grouped, that is, column 2 sense windings form cables 552 and 553, column 3 sense windings form cables 554 and 555, and column 4 sense windings form cables 556 and 557. These sense windings in response to a change in binary state from binary ONE to ZERO in their respective cores, receive an induced current of sufficient magnitude to produce what is known in the art as a half-write current.

Referring back to FIGS. 3c, 3d and 3e, the conductors of cable 550 (data) and the conductors of cable 551 (address) are applied to a Section 1 Array 560. The conductors of cable 552 (data) and cable 553 (address) are applied to a Section 2 Array A, cables 554, 555 to a Section 2 Array B and cables 556 and 557 to a Section 3 Array. The construction of the Section 2 and Section 3 Arrays and a description of the control circuits associated with those arrays to cause reading and writing operations in those arrays will be found in the above referred to copending application "C."

*Section 1 Array*

Reference is now made to FIG. 17 which illustrates in simplified schematic form the Section 1 Array shown as block 560 in FIG. 3c.

The data conductors from the Half-Write Current Generators are so arranged that each conductor is associated with a column of cores in the Array and those data conductors when energized furnish what is known as a half-write current to each of the cores in their respective column. This half-write current by itself is ineffective to change the state of the magnetic cores associated therewith. The conductors from the half-write current generator previously identified as address conductors are each associated with a row of cores in the array. In this way when the data conductors are energized with half-write currents representative of data, those bits of data will be written into the particular row of cores which receives a half-write current from its associated address conductor and therefore the cores of that row will be set in their binary ONE state or remain in their binary ZERO state in accordance with the particular bit of data that the core received. The cores of a given row, into which data is written, are labeled in FIG. 17 "S" and 1 through 15 (only cores 1 and 15 being shown in the figure). The core of a given row, into which the parity bit is written, is labeled "P". One core in each row of the array is labeled "BB" and is known as the "Busy Bit" core. These busy bit cores have sufficient number of turns on their windings which are energized by the address conductors of cable 551 that when an address conductor is energized the busy bit core will be set in its ONE state.

As thus far described, the 16 bits of data of the drum word together with the parity bit of the word are written into the particular address of the array which was specified by the address tag of the drum word. The foregoing description in which given data is written in a chosen address of a selected array is also described and claimed in the above referred to copending application "E."

As previously mentioned with reference to the description of FIGS 13a and 13b, the 25 counter causes the conductors of cable 561 to be sequentially pulsed. Those conductors of cable 561 are the reset or read-out conductors for the Section 1 Array. As shown in FIG. 7, those read-out conductors of cable 561 are arranged such that each conductor is associated with a column of the array and, when energized, a conductor causes each of the cores of its associated column to be set in its binary ZERO state. If, for example, conductor 445 which is associated with the column of busy bit cores is pulsed, all of the cores of that column which were in their binary ONE state will cause signals to be induced in their corresponding sense windings.

The array is so divided that 13 rows of cores form a logical group, thereby making 2 logical groups in the array. The rows of the array having addresses 0 through 12 form one group, whereas the rows of the array having addresses 13 through 25 form the other group (shown as block 564 in FIG. 17). The sense windings of the first group of rows form a conductor group 565 whereas the sense windings of the other group of rows form a conductor group 566.

*Reading Words From Section 1 Array*

Referring back to FIG. 3c, the signals induced in the sense windings of the Section 1 Array 560 are delivered to a 13 Stage Register 567 and another 13 Stage Register 568. These 13 Stage Registers are preferably of the magnetic core shifting register type and are constructed such that each stage has its individual input winding energized by its associated conductors from the array so that the 13 bits read from the array are stored in that shift register. Subsequent to the time that one column of the array is read out and prior to the time that the next column is read from the array, each of the 13 stage registers receives 13 pulses on the conductor 473 labeled Shift output shift registers. The output winding of the last stage of shift register 567 is applied to the conditioning input of a gate 570 whereas the output winding of the last stage of shift register 568 is applied to the conditioning input of a gate 571. Gates 570 and 571 are sampled by OD–3–13 so that if a binary ONE signal is received by those gates they will deliver a pulse through their respective OR circuits 572 and 573 to the Transmission Channels 1 and 2 respectively.

Referring back to FIGS. 13a and 13b, pulses on conductor 417 previously referred to as OD–3–13 pulses are delivered by way of the conductor labeled Timing to the Transmission Channels 1 and 2 (FIG. 3c). Signals on this conductor are therefore a continuous succession of pulses which occur at a 1300 cycle repetition rate.

A pulse is passed by gate 464 (FIG. 13a) to a conductor 580 labeled Sync (Sec. 1) under the condition that the 25 counter is equal to 25 and the 13 counter is equal to 12, or stated in a different way, a pulse is delivered to the conductor 580 labeled Sync approximately 770 μseconds before stage 1 of the 25 counter initiates the read-out operation of the first column of cores in the Section 1 Array. Although OD–3–13 pulses sample the gates 570 and 571 (FIG. 3c), the OD–3–13 pulse coincides in time with the sync pulse and the OD–3–13 pulse immediately following the sync pulse will not be passed by those gates since neither of those gates are conditioned at those times. The second OD–3–13 timing pulse following the sync pulse will be accompanied by data pulses from the output of OR circuits 572 and 573 provided that registers of the array having address 0 and 13 have a ONE stored in the "busy bit" cores.

When the 25 counter (FIG. 13b) is equal to 19, gate 452 (FIG. 13a) is conditioned to pass the next OD–4–13 pulse to the conductor 453 labeled Step Burst Counter. Every fourth one of the pulses on conductor 453, when received by the Burst Counter causes that counter to deliver a positive D.C. level on conductors 467 and 468. The positive D.C. levels on these conductors cause the output of AND cicuit 466 to condition gate 465 which passes the pulse received from gate 456 to set flip-flop 458 in the ONE state. When flip-flop 458 is in the ONE state it conditions the gate 464 to pass the next received OD–3–13 pulse to conductor 470 labeled Automatic Busy Bit. This automatic busy bit is delivered to the Transmission Channels 1 and 2 through OR circuits 572 and 573, respectively. In this manner busy bits are periodically (approximately one per second) applied to those transmission channels even if there are no words being delivered from the drum to those channels. The purpose of those automatic busy bits is to ensure that automatic volume control circuits in the receivers of the controlled devices are properly adjusted.

Summary of Output System Operation

Reference is now made to FIG. 18 which is a family of curves which illustrates relative timing of operation in the Output System. Briefly summarizing the operation of the Output System as thus far described, the flip-flop 454 (FIG. 13a) controls the search-not search operation of the Output System, that is, from the time shortly preceding the 25 counter equals 1 time, to the time that the 25 counter equals 19, the not-search time is provided, whereas from the time that the 25 counter equals 19 until a short time after the 25 counter equals 25, the search time is provided. This search-not search cycle (shown by the curve so labeled in FIG. 18) is approximately .25 seconds in duration. During the search period the words read from the drum if acceptable as to parity, burst number, etc., are written into the array. During the not search period, words stored in the array during the preceding search period are delivered from the array to the output shift registers for ultimate delivery to the transmission channels. The curve labeled Shift Output Shift Register illustrates that shortly after the beginning of not search period the output shift register is shifted at a 1300 cycle rate. The curve labeled Automatic Busy Bit illustrates that an automatic busy bit is generated every fourth burst period when the 25 counter equals 1. The curve labeled Sync illustrates that a sync signal is generated immediately before the 25 counter equals 1. The curves labeled 25 counter and 13 counter show that those counters are cleared when the 25 counter equals 25, they are primed shortly after being cleared, the 25 counter is shifted at a 100 cycles per sec. rate and that the 13 counter is shifted at a 1300 cycle per sec. rate.

Reference is now made to FIG. 19 which is a timing diagram showing the relationship between Timing, Sync and Data signals. This diagram shows that those signals, when they occur, are synchronous and that the first data signal occurs in time coincidence with the second timing signal following the sync signal. The data signals are labeled as to the register of the array in which they were stored as well as the bit number of the word. From FIGURE 19 it will be seen that the bits of the words are interleaved, that is, between successive bits of a given word, the bits of the other words are sent. The advantages of and a detailed description of a system employing interleaving is described in the previously mentioned copending application "C."

Retaining "Full" Status of Drum Registers

The above description of the operation of the output system has assumed that a word is always "read" from the drum, that is, each full drum register has its status changed to empty and the words are delivered to a transmission channel. In actual operation a full drum register remains full until all of the conditions have been met to deliver the word to a transmission channel or some error has been detected. As previously mentioned, when a full drum register comes under the read heads, the word in that drum register is delivered to the Drum Word Register. The status of that register is changed to empty by the OD Read Status Control section 301 (FIG. 3e) unless a pulse is received on a conductor 600 labeled No Compare. Pulses are produced on the conductor 600 by the Array Read-In Control 485 (FIG. 3d).

Referring back to FIGS. 14a and 14b, pulses are delivered to the conductor 600 (FIG. 14b) by a gate 601. Gate 601 is sampled by pulses passed by a gate 602 which in turn is sampled by pulses on conductor 314 labeled Parity O.K. As previously mentioned, a pulse is not delivered to the conductor 314 (Parity O.K.) by the parity register 313 (FIG. 3e) unless the word read from the drum has good parity. Therefore if the drum word has a parity error, then no pulse will be delivered to conductor 600 (no compare) and since the OD Read Status Control Section 301 does not receive a pulse on conductor 600, the word on the drum is effectively destroyed, that is, its status is changed to empty. When gate 602 is not conditioned pulses are not delivered to conductor 600 (no compare). Gate 602 is conditioned from the output of OR circuit 510 through an inverter 603.

If the drum word is acceptable for storage in one of the Section Arrays, that is, the burst number of the drum word compares with the burst counter identified by the section address of the drum word and that section's control circuit is in the search period, then OR circuit 510 will produce a positive output which through inverter 603 causes gate 602 to be non-conditioned and no pulse is delivered to the conductor 600 (no compare) and the drum register's status is changed to empty.

If the drum word is not acceptable for storage in one of the Section Arrays and the drum word has good parity, then gate 602 passes the parity O.K. pulse to the sample input of gate 601. Gate 601 is conditioned from the output of an OR circuit 604 through an inverter 605. OR circuit 604 produces a negative output to cause gate 601 to be conditioned except under the conditions that (1) the Section tag (bits LS–L2) of the drum word identifies a non-existent output section, (2) the address tag (bits L3–L7) of the drum word identifies a non-existent address in the selected Section Array, or (3) the burst number of the drum word (bits L8–L15) compares with the burst counter during the not-search period. The logical circuits associated with the inputs of OR circuit 604 to accomplish the recited functions are shown in the drawings however, for a detailed description of those circuits, reference is made to the above referred to copending application "F."

Reading the Burst Counter and Elapsed Time Counter

From the previous description of the Output System it will be recalled that a word on the drum will be delivered to the transmission channel when its burst number compares with the contents of the burst counter which has a ONE added to it when a search period begins. It will further be recalled that the elapsed time counter is reset to zero when the first column of the array is read out and has a ONE added to it every 1/32 second.

Knowing the contents of the burst counter and the elapsed time counter, a word can be deliverd to a transmission channel at a known time. When it is known at what time a word will be delivered to the transmission channel, the magnitude of the control signal represented by the word can be predicted so that the correct course of action will be taken.

The program stored in the Memory Element 34 (FIG. 3a) for reading the contents of the burst counter and the elapsed time counter into memory is similar to the previously described program for reading from the drum. To read the contents of those counters three instructions (1) Load Address Counter (LDC), (2) Select, and (3) Read, are preferably performed in that order. The Select instruction, in order to select the Burst Counters, includes in its index interval portion (bits 10 through 15) the binary code 010 001 (octal 21).

The Load Address Counter instruction causes operations as previously described to set the IO Address Counter to the address in memory into which the first word from the Burst Counter is to be stored.

The Select instruction causes the commands shown in FIG. 11w to be generated at the times indicated. The Select instruction, besides causing the common commands described with reference to Table 14 and Table 15 to be generated, causes generation of the following commands:

TABLE 23

| Command Number | Name | Time |
| --- | --- | --- |
| 96 | Pause | PT-10 |
| 95 | Set PT-OT Flip-Flop to OT | PT-11 |
| 93 | Deselect Pulse | OT-5 |
| 94 | Clear Drum Control Register | PT-2 |
| 92 | Address Register to Drum Control Register | PT-3 |
| 85 | Select Pulse | PT-5 |

The commands 92 through 96 cause operations to be performed as described with reference to Table 17 above. At PT-5 time the command 85 (Select Pulse) is delivered to the Selection and IO Control Element 49 (FIG. 3g) where in response to this pulse and in response to the previously mentioned index interval code 010 001 the fact is stored that the Burst counters have been selected.

The Read instruction causes the generation of the commands previously described with reference to FIG. 11x, Table 14 and Table 18. The command PT-6 on Read (86), when received by the Selection and IO Control Element 49, will cause a pulse to be delivered to a conductor 610 (Start Read BTC) when the Select instruction has selected the Burst Counters and the number of words to be read, as specified by the right half-word of the read instruction, is not zero. This pulse on conductor 610 (Start Read BTC) is delivered to a Burst Counter interrogator 611 (FIG. 3d) which also receives signals from the burst counter associated with each section of the output system as well as of the Elapsed Time Counter which is associated with the Section 1 as previously mentioned. In response to the pulse on conductor 610 (Start Read BTC), the Burst Counter Interrogator 611 delivers signals to certain of the conductors of a cable 612 representative of the contents of one of the burst counters and also delivers a pulse to a conductor 613 (Request Break Burst Time Counter), and repeats this operation for each of the burst counters. When the signals representative of the contents of the Section 1 Burst Counter are delivered to certain of the conductors of cable 612, signals representative of the contents of the Elapsed Time Counter are delivered to the other conductors of the cable 612.

Each time the Burst Counter Interrogator 611 delivers pulses to the conductors of cable 612 and a pulse to the conductor 613, the signals on the conductors of cable 612 are temporarily stored in the Left IO Buffer Register 164 and the pulse on conductor 613 is delivered to the Selection and IO Control Element where it initiates a "Break In" operation. The "break in" operation, as previously described, causes the signals on the Left IO Buffer Register 164 (as well as the signals in the Right IO Buffer Register 165) to be stored in the Memory Element 34.

Calculation of Burst Number and Delay for Output Messages

Certain of the output messages generated by the computer contain signals indicating "time to go" as of the time that the message is received by the receiver, that is, the message indicates at what time with reference to the time of receipt of the message, a given action is to take place. Thus the "real-time" delay between computation by the computer and reception by the receiver must be calculable.

Reference is made to FIG. 20 which is a timing chart (not to scale) that illustrates the various delays in the control system. As previously described, after several messages have been delivered to the computer, the computer can, by suitable programming, determine the present course of the moving object and furthermore, by the use of the time tag on the input words the delay since reception of raw data, representing the last observed position of the moving object, can be determined.

The time required to complete the calculation is insignificant and can be neglected. The transmission delay is constant for any given transmission channel. In order to compute the delay between time of computation and the beginning of transmission from the output system, a burst number must be assigned. A way in which the burst number assignment may be made is as follows using the listed symbols:

$A$=Burst Counter reading now,
$B$=Elapsed Time Counter reading now,
$C$=RTC reading now,
$D$=last burst number assigned,
$k$=maximum time to get through drum,
$T$=burst period,
$U(\ )$=the next higher integer of ( ),
$N_D$=reading of the Burst Counter at the time that the last assigned burst number was assigned,
$t_D$=contents of the real time clock when the last assigned burst number was assigned,
$M$=maximum count of the Burst Counter.

Compute the burst number $N_1$ which if assigned would cause the message to be sent at the earliest possible time.

$$N_1 = A + 1 \text{ (modulus of Burst Counter)}$$

Compute the time $t_N$ at which a message having the burst number $N_1$ would be sent.

$$t_{N_1} = C + T - B \text{ (modulus of Real Time Clock)}$$

Is there enough time that would allow a message with that burst number to be written on drum, read from drum, and written into array?

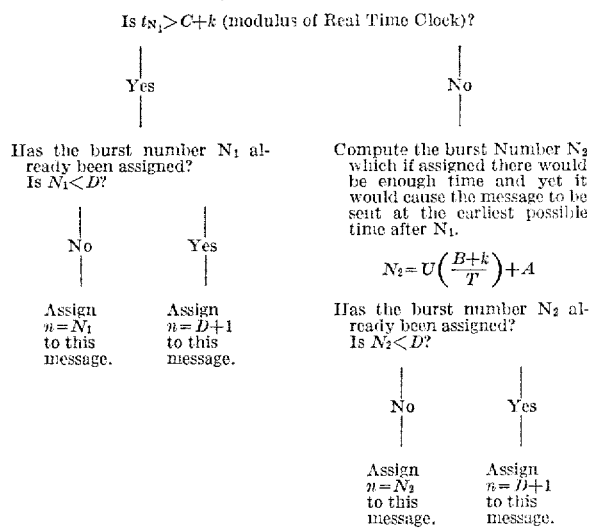

Reference is now made to FIG. 23 which is a flow chart that illustrates an example of various steps which may be employed to determine the burst number which if assigned to a message placed in the buffer storage would cause that message to be delivered to the receiver at the earliest possible time.

The first step is to determine whether or not the last assigned burst member was a number which when computed exceeded the modulus of the burst counter. This is determined by comparing the last burst number assigned with the burst counter reading at the time that the last burst number was assigned. If the number assigned was greater, then that burst number when computer did not exceed the modulus of the burst counter.

This comparison is illustrated in FIG. 23 as determining whether or not the burst counter reading when the assignment was made is greater than the last assigned burst number. If so, then the last assigned burst number exceeded the modulus of the burst counter.

The next step, if the result of the first was yes or no, is to determine if the last assigned burst number has actually been sent. This step is illustrated in FIG. 23, whether the result of the first step is yes or no, by asking the question: Is the present time minus the time at which the last assignment was made greater than the time required to transmit all of the bursts which were yet to be transmitted at the time that the last assigned burst was made? If the answer to the second step is yes, then the next step is to determine whether or not there is sufficient time to get a message having the earliest possible burst number to the drum. This is illustrated in FIG. 23 by asking the correct question for each of the possible results of the second step.

If the result of the second step is yes, the next step is to determine whether or not there is sufficient time remaining in the present burst period to permit a message to be placed in storage before the beginning of the next burst period. This step is illustrated in FIG. 23 by asking the question: Is the burst period minus the elapsed time counter reading greater than the amount of time required to send a message to the storage? If so, the burst number to be assigned is one greater than the present reading of the burst counter. If not, the burst number $N_2$ is computed, $N_2$ being the burst number which is the earliest possible burst number which may be assigned. This is illustrated in FIG. 23 by solving the equation for $N_2$ which is equal to the burst counter reading now plus the next highest integer of the value resulting from subtracting the time remaining in the present burst period from the time required to get a message in storage and dividing by the burst period. The flow chart of FIG. 23 is a general flow chart which takes into account that the time required to get a message into storage ($k$) may take any value. If ($k$) is known and fixed the flow chart can be simplified and becomes very simple when ($k$) is fixed and known to be less than a burst period.

In the cases where the control signal to be transmitted is a control signal indicating the course correction necessary to be executed in order to arrive at a destination (as discussed with reference to FIG. 2), the time at which the signal will arrive is illustrated in FIGS. 20 and 22 and may be determined as follows:

$$t_n + K = C + T - B + T[n - (A+1)]$$

where ($k$) is the transmission delay time.

In certain control systems the message delivered to the receiver indicates the "time to go" from the time of receipt of the message. This "time to go" indicates the time at which an agreed upon action is to take place. The "time to go" to be sent in the message is as illustrated in FIG. 20 and may be determined as follows:

$$g = G - K - (t_n - C)$$

$$t_n - C = T - B + T[n - (A+1)]$$

$$g = G - K - T + B - T[n - (A+1)]$$

where $g$ = "time to go" in message
$G$ = "time to go" from present time $C$.

Reference is made to FIG. 23 which is a flow chart illustrating a posible way in which the calculation of ($n$) might be programmed.

*Computer Instructions for Data Processing*

Those instructions listed in Table 2 above as being Input-Output Class instructions as well as the Clear and Subtract Word Counter instruction have been described in detail above.

The operations performed in response to the following instructions which are listed in Table 2 above as well as operations performed in response to still other instructions are described in the above referred to copending application "D":

TABLE 24

| Class | Binary Code | Variation | Binary Code | Abbrev. |
|---|---|---|---|---|
| ADD | 001 | Clear & Add | 0000 | CAD |
| | | Add | 0001 | ADD |
| | | Clear & Subtract | 0110 | CSU |
| | | Subtract | 0111 | SUB |
| MULTIPLY | 010 | MULTIPLY | 1010 | MUL |
| | | DIVIDE | 1100 | DVD |
| STORE | 011 | STORE | 0101 | FST |
| | | RIGHT STORE | 0111 | RST |
| | | STORE ADDRESS | 1000 | STA |

The operations performed in response to the following instructions which are listed in Table 2 above are described in detail in the above referred to copending application "I":

TABLE 25

| Class | Binary Code | Variation | Binary Code | Abbrev. |
|---|---|---|---|---|
| MISCELLANEOUS. ADD | 000 | Program Stop | 0000 | HLT |
| | 001 | Twin & Add | 0010 | TAD |
| | | Twin & Subtract | 1000 | TSU |
| | | Clear & Add Magnitude. | 1100 | CAM |
| | | Difference Magnitude. | 1101 | DIM |
| MULTIPLY | 010 | Twin & Multiply | 1011 | TMU |
| | | Twin & Divide | 1101 | TDV |
| STORE | 011 | Right ADD ONE | 1001 | ADR |
| | | Exchange | 1010 | ECH |

DETAILED DESCRIPTION OF COMPONENTS

A detailed description of examples of circuits suitable for use as the following components will be found in the identified copending applications:

| Component | Copending Application | |
|---|---|---|
| | Reference Number | Figures |
| Range, Theta and Identity Section 9 (Fig. 3e). | B | 10. |
| Time Tag Section 10 (Fig. 3e) | B | 15. |
| OD Drum Write Element 27 (Fig. 3e) | G | 12 and 13. |
| OD Write Status Control Section 26 (Fig. 3e). | G | 5. |
| Drum and Drum Head Assembly | A | 3 through 7. |
| CD Read Section 31 (Fig. 3f) | A | 14. |
| OD Read Section 303 (Fig. 3e) | A | 14. |
| Write Register 166 (Fig. 3f) | A | 12. |
| CD Write Section 253 (Fig. 3f) | A | 12. |
| Memory Element 34 (Figs. 3a and 3b) | D | 23 through 36. |
| Operation Register 47 (Fig. 3a) | D | 39. |
| Program Counter 150 (Fig. 3b) | D | 41. |
| Address Register 155 (Fig. 3b) | D | 42. |
| Left or Right Arithmetic Elements (Figs. 3a, 3b). | H | 1 through 20. |
| Drum Word Register (Fig. 3e) | C | 20a and 20b. |
| Parity Generator and Delay 307 (Fig. 3e). | C | 20a and 20b. |
| 13 Stage Registers 567 and 568 (Fig. 3c) | C | 24. |
| 13 Counter and 25 Counter (Fig. 13b) | J | 2. |
| Read Status Control Circuits (Fig. 3f) | I | 24. |
| Read Control Circuit (Fig. 3f) | I | 25. |
| CD Write Control Circuit (Fig. 3f) | I | 26. |
| CD Write Status Control Section (Fig. 3f). | I | 27. |
| IO Buffer Registers (Fig. 3h) | I | 28 and 29. |
| IO Registers (Fig. 3g) | I | 30. |
| IO Address Counter (Fig. 3h) | I | 31. |
| IO Word Counter (Fig. 3h) | I | 32. |
| Drum Control Register (Fig. 3h) | I | 33. |
| Memory Buffer Registers (Figs. 3a and 3b). | I | 34 and 35. |
| Selection and IO Control Element (Fig. 3g). | I | 36a through 36d. |
| Time Pulse Distributor Control (Fig. 10a). | I | 37. |
| Command Generators (Figs. 10a through 10c). | I | 38a through 38e. |
| Cycle Control Circuit (Fig. 10b) | I | 39. |
| Memory Unit Selection (Fig. 10c) | I | 40. |
| Clock Register (Fig. 3h) | I | 41. |
| Timing and Index Circuit (Fig. 3f) | I | 45. |

*Burst Time Counter and Compare*

Reference is now made to FIG. 24 which is a functional block diagram of the Burst Time Counter and Compare Element shown as block 481 in FIG. 3d. The Burst-Time Counter and Compare Element includes a Burst Counter and Compare Circuit for each of Sections 1 through 3, 1400, 1401 and 1402, respectively, an Elapsed Time Counter 1403 and a synchronizing circuit which includes flip-flops 1404, 1405 and their associated gates 1406, 1407. Each Burst Counter and Compare Circuit has a reset input which, upon receipt of a pulse, causes each stage of the Burst Counter to be reset to ZERO. Each of those circuits also has another input labeled Step Burst Counter which, upon receipt of a pulse causes a ONE to be added to the previous count stored in the counter.

Each Burst Counter and Compare Circuit receives certain of the bits L8 through L15 (Burst Number Tag) of the drum words and when the contents of the counter of that Section compares with the Burst Number Tag a positive D.C. level is established on the conductor labeled Compare for that Section. As previously mentioned with reference to the Output System, a preferred embodiment includes three Output Sections. Since all Output Sections need not handle the same number of bursts, in a preferred embodiment the Section 1 Burst Counter and Compare Circuit has only six stages, the Section 2 Burst Counter and Compare Circuit has 8 stages and that for Section 3 has only 5 stages. Each Burst Counter and Compare Circuit also has provisions for delivering as outputs, D.C. levels indicating the instantaneous count stored in the Burst Counter.

The Elapsed Time Counter 1403 is a four-stage counter which, in response to a pulse on conductor 483 (Reset Elapsed-Time Counter), has each of its stages reset to ZERO. A pulse received on conductor 484 (32 p.p.s.) is synchronized with drum timing by means of flip-flops 1404, 1405 and gates 1406, 1407 to cause stepping of the Elapsed Time Counter 1403. The Elapsed Time Counter 1403 delivers at its outputs D.C. levels representative of the count stored in the counter. The output representative of the count stored in the Elapsed Time Counter and the output of the Section 1 Burst Counter representative of the Burst Count are delivered by way of the conductors of cable 1408 to the Burst Counter Interrogator 611 (FIG. 3d). The outputs representative of the Section 2 Burst Count and the Section 3 Burst Count are also delivered, by way of the conductors of cables 1409 and 1410, to the Burst Count Interrogator 611 (FIG. 3d).

*Section 1 Burst Counter and Compare Circuit*

Reference is now made to FIG. 25 which illustrates in logical block form the Section 1 Burst Counter and Compare Circuit shown as block 1400 in FIG. 24. As previously noted with reference to the Output System, both the ONE and ZERO signals stored in the Burst Number Register (FIG. 3e) are delivered to the Burst Counter and Compare Circuit. In FIG. 25 the signals from the Burst Number Register bits L10 through L15 are applied as inputs to AND circuits 1420 through 1431. These conductors are labeled L$\overline{10}$, L10, L$\overline{11}$, L11 etc. This labeling is a convention employed to indicate under what condition the conductor receives a positive potential. If the left half-word of the drum word in its bit position Left 10 has a binary ZERO, then the conductor labeled L$\overline{10}$ is positive. If this bit position has a binary ONE, then the conductor labeled L10 is positive. With this convention of labeling it will be apparent under what condition a given one of those conductors is positive.

The other input to each of the AND circuits 1420 through 1431 is from a six-stage binary counter comprising flip-flops 1432 through 1437 and their associated gates 1438 through 1442. This six-stage binary counter receives reset commands in the form of pulses on the conductor labeled Clear. As indicated in FIG. 25 a pulse on the conductor labeled Clear causes each of the flip-flops 1432 through 1437 to assume its ZERO state. Pulses are applied to the conductor labeled Clear in any suitable manner. Since this counter as will be apparent from the subsequent description automatically resets during normal operation, it is only necessary to apply a pulse to the conductor labeled Clear when the counter is initially put into operation or during operational testing. A pulse received from conductor 453 causes the counter to be advanced since this pulse is applied to the complement input of flip-flop 1437 as well as to the gate 1442. Each pulse causes flip-flop 1437 to change its existing state, every second input pulse causes flip-flop 1436 to change its existing state (since gate 1442 only passes pulses when flip-flop 1437 is in its binary ONE state), every fourth input pulse causes flip-flop 1435 to change its existing state and so forth. When a sufficient number of pulses have been received to cause all of the flip-flops to assume their binary ONE state the next received pulse will cause all the flip-flops to return to the reset state (all set to binary ZERO). As indicated in FIG. 25 the low order stage flip-flop 1437 of the counter has its ONE output applied to AND circuit 1430 and its ZERO output applied to AND circuit 1431. Those AND circuits receive the low order output of the Burst Number Register (bit 15); however, AND circuit 1430 receives the ZERO signal whereas AND circuit 1431 receives the ONE signal. In this way, if the low order bit (bit L15) of the drum word compares with the low order bit (output of flip-flop 1437) of the counter, then neither of the AND circuits 1430 or 1431 will produce a positive output.

In a like manner the remaining orders of the drum word are compared to their corresponding order of the counter and if each order compares then all of the AND circuits 1420 through 1431 deliver negative potentials through OR circuits 1450 through 1453 to an inverter 1454 which in response to this negative signal delivers a positive signal to the conductor labeled Compare Section 1.

If any bit of the drum word fails to compare with the corresponding order of the counter then one or more of the AND circuits 1420 through 1431 will deliver a positive potential to the inverter 1454 which will in turn deliver a negative potential to the conductor labeled Compare Section 1. Signals representative of the count stored in the Burst Counter are delivered to the Burst Time Count Interrogator 611 (FIG. 3d) by having the ONE output of each of the flip-flops 1432 through 1437 connected thereto.

*Burst Counter Interrogator*

Reference is now made to FIG. 26 which shows in logical and functional block form the Burst Counter Interrogator identified as block 611 in FIG. 3d. Upon receipt of a pulse on conductor 610 (Start Read BTC) a flip-flop 1500 is set in its ONE state. When flip-flop 1500 is in its ONE stage a gate 1501 is conditioned to pass the next received OD-3 pulse to set another flip-flop 1502 in its ONE state to thereby condition a gate 1503 to pass OD-1 pulses. Pulses passed by gate 1503 are delivered as stepping pulses to a selecting counter for BTC words 1504 and are also delivered as sample pulses to a set of gates 1505. Flip-flop 1502 is in its ZERO state when the Burst Time Counters have not been selected and therefore prior to the pulse received on conductor 610, flip-flop 1502 was in its binary ZERO state thereby conditioning a gate 1506 which passes OD-1 pulses to the Clear input of the selecting counter for BTC words, 1504. When the selecting counter 1504 is in the ZERO state, one input of each of 10 AND circuits 1507 is conditioned. The other inputs of those AND circuits are the signals indicative of the contents of the Section 1 Burst Counter and the Elapsed Time Counter. The outputs of AND circuits 1507 are delivered through OR circuits 1508 to the conditioning input of gates 1505. Therefore those gates of gates 1505 corresponding to the stages of the Section 1 Burst Counter and Elapsed Time Counter which contain a binary ONE are conditioned when the first pulse is passed by gate 1503. Therefore the first word of the BTC reading operation is delivered and the selecting counter 1504 is advanced to indicate a count of one. When the selecting counter 1504 indicates a count of one, another group of AND circuits 1509 each have one of their inputs conditioned and the other inputs of those AND circuits are the signals representative of the contents of the Section 2 Burst Counter. The outputs of AND circuits 1509 are delivered through OR circuits 1508 to the conditioning input of gates 1505 thereby conditioning those gates associated with the stages of the Section 2 Burst Counter which contain a binary ONE. The second pulse passed by gate 1503 therefore samples gates 1505 to produce a second BTC word and to set the Selecting Counter 1504 to indicate a count of two. When the Selecting Counter 1504 indicates a count of two, one input of each of the AND circuits 1510 is conditioned. The other inputs of those AND circuits 1510 are conditioned by signals representative of the count stored in the Section 3 Burst Counter. The output of AND circuits 1510 is delivered through OR circuits 1508 to the conditioning input of gates 1505 and therefore the third pulse passed by gate 1503 causes gates 1505 to be sampled to generate the third BTC word. Each time that gate 1503 passes a pulse to sample gates 1505 a pulse is delivered also to conductor 613 labeled Request Break BTC. This pulse is delivered to the Selection and IO Control Element to effect the Break-In operation previously described. Whenever the Selecting Counter 1504 produces an end carry or whenever a pulse is received on conductor 1172 labeled Disconnect BTC, flip-flop 1500 is cleared thereby conditioning a gate 1511 to pass the next OD-3 pulse to clear the flip-flop 1502.

A preferred Burst Time Counter Word Bit assignment for each of the three words is as follows:

TABLE 26

| Word | Bit | Counter Information |
|---|---|---|
| 1 | L15 | Section 1 Burst Counter $2^0$. |
|   | L14 | Section 1 Burst Counter $2^1$. |
|   | L13 | Section 1 Burst Counter $2^2$. |
|   | L12 | Section 1 Burst Counter $2^3$. |
|   | L11 | Section 1 Burst Counter $2^4$. |
|   | L10 | Section 1 Burst Counter $2^5$. |
|   | R15 | Elapsed Time Counter $2^0$. |
|   | R14 | Elapsed Time Counter $2^1$. |
|   | R13 | Elapsed Time Counter $2^2$. |
|   | R12 | Elapsed Time Counter $2^3$. |
| 2 | L15 | Section 2 Burst Counter $2^0$. |
|   | L14 | Section 2 Burst Counter $2^1$. |
|   | L13 | Section 2 Burst Counter $2^2$. |
|   | L12 | Section 2 Burst Counter $2^3$. |
|   | L11 | Section 2 Burst Counter $2^4$. |
|   | L10 | Section 2 Burst Counter $2^5$. |
|   | L9 | Section 2 Burst Counter $2^6$. |
|   | L8 | Section 2 Burst Counter $2^7$. |
| 3 | L15 | Section 3 Burst Counter $2^0$. |
|   | L14 | Section 3 Burst Counter $2^1$. |
|   | L13 | Section 3 Burst Counter $2^2$. |
|   | L12 | Section 3 Burst Counter $2^3$. |
|   | L11 | Section 3 Burst Counter $2^4$. |

Throughout the above description and in the drawings, very little reference has been given with respect to passive circuits in component circuits. Passive circuits such as cathode followers, pulse amplifiers, level setters and the like, must obviously be included between various of the component circuits. However, the characteristics of those passive circuits will largely be determined not only by the load component circuits but also by the length of conductors coupling a given logical circuit to its load logical circuit. For example, the various core stages illustrated and described herein require that sufficient current be supplied to the shift windings of those cores for a length of time sufficient to transfer signals from one stage to the next or for reading out the information in a given stage. Since core circuits respond to four conditions, that is, (1) number of turns on the core, (2) the current through the winding, (3) the length of time that the current flows and (4) the rate of change of current, it will be obvious that in a specific design of an equipment constructed in accordance with the principles of this invention, the designer may use these variables in any way that he finds desirable. Furthermore, as described in the preceding section entitled "Conventions Employed" the various logical circuits respond to standard D.C. voltage levels of +10 and −30 volts and respond to pulse levels 20 to 40 volts in magnitude, and it will be obvious that various passive circuits will be required to attain these voltage requirements. These voltage requirements may be met by the use of conventional passive circuits such as level setters, cathode followers, current drivers and the like.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In combination a source of data signals, a buffer storage system having a plurality of signal storage positions and means to produce signals indicating the empty and full status of said storage positions, a source of time signals continuously indicating the amount of elapsed time from a time reference, means responsive to signals from said buffer storage system indicating an empty status of a storage position for delivering data signals from said source of data signals and signals from said source of time signals to the empty storage positions and for changing its status signal from empty to full, a signal processing system, and means responsive to signals from said signal processing system and responsive to signals from said buffer storage system indicating full status to deliver said data signals and said time signals stored in said full register to said signal processing system.

2. In combination a source of data signals, a temporary signal storage device for storing signals from said source of data signals, a buffer storage system having a plurality of signal storage positions and means to produce signals indicating the empty and full status of said storage positions, a source of time signals continuously indicating the amount of elapsed time from a time reference, means responsive to signals from said buffer storage system indicating empty status for delivering data signals from said temporary signal storage device and signals from said source of time signals to the empty storage position and for changing its status signal from empty to full, a signal processing system, and means responsive to signals from said signal processing system and reponsive to signals from said buffer storage system indicating full status to deliver said data signals and said time signals stored in said full register to said signal processing system and for changing the status from full to empty.

3. A signal transmission arrangement for delivering signals from a source to a load comprising a buffer storage device in which data signals and associated burst signals may be stored, means associated with said buffer storage device to generate successive signals indicative of a changing count, means associated with said storage device for delivering data signals stored in said storage device to a load device when a predetermined relationship exists between said successive signals and said burst signals, and means associated with said storage device and responsive to said successive signals for producing said burst signals and associating said burst signals with data signals being supplied to said storage device.

4. A signal transmission arrangement for delivering digital signals from a signal processing system to a load comprising a buffer storage device having a plurality of signal storage positions, each storage position providing sufficient capacity to store said digital signals and associated burst signals, means associated with said buffer storage device to generate successive signals indicative of a changing count, means associated with said storage device for delivering said digital signals stored in said storage positions to a load device when a predetermined relationship exists between said successive signals and the burst signals stored in said storage position, and a signal processing system associated with said storage device and responsive to said successive signals for producing said burst signals and associating said burst signals with said digital signals beng supplied to said storage device.

5. A signal transmission arrangement for delivering signals from a data signal processing system to a load comprising a buffer storage device having a plurality of signal storage positions, each storage position providing sufficient capacity to store data signals and associated burst signals, cyclically operated means to deliver data signals from said storage device in time arrangement having a predetermined relationship to burst signals and to produce signals that identify what burst signals are associated with data signals that are currently being delivered from said signal storage, and a data signal processing system associated with said storage device and responsive to said signals produced by said cyclically operated means for producing said burst signals and associating said burst signals with data signals being supplied to said storage device.

6. A signal transmission arrangement for delivering digital signals from a signal processing system to a load comprising a buffer storage device having a plurality of signal storage positions, each storage position providing sufficient capacity to store said digital signals and associated burst signals, counter means having means to produce signals indicating the number of received input signals, control means responsive to said output signals of said counter means for delivering to a load device all of said digital signals stored in said buffer storage device which have associated burst signals that have a predetermined relationship to said output signals from said counter means and subsequently delivering an input signal to said counter means, and a signal processing system responsive to said output signals from said counter means for producing said burst signals and associating said burst signals with said digital signals being supplied to said storage device.

7. A signal transmission arrangement for delivering digital signals to a load comprising a buffer storage device having a plurality of signal storage positions, each position providing storage for digital data signals and associated burst signals, a temporary storage device, counter means for producing signals indicating the number of received input signals, cyclically operated control means which during each cycle causes those digital data signals stored in said buffer storage device which have associated burst signals bearing a predetermined relationship to said output signals from said counter means to be delivered to said temporary storage device for parallel storage therein and causes said signals to be delivered from said temporary storage device in serial form and further delivers a signal to said input of said counter means, means to produce signals which continuously indicate the present time point of said cycle with reference to an index time of the cycle, and a signal processing system responsive to said signals which indicate the time point of the cycle and responsive to said output signals from said counter means for producing said digital data signals and associated burst signals and delivering the same to said buffer storage device.

8. A control equipment comprising a source of condition responsive signals, a time signal generator for continuously producing signals representative of the elapsed time from a time reference, a first buffer storage device, means to store said condition responsive signals in said first buffer storage device and to store the signals produced by said time signal generator at the time that each condition responsive signal is delivered to said first buffer storage device, a second buffer storage device having a plurality of signal storage positions, each position providing storage for at least digital control signals and associated burst signals, a temporary storage device, counter means for producing signals indicating the number of received input signals, cyclically operated control means which during each cycle causes those digital control signals stored in said second buffer storage device which have associated burst signals bearing a predetermined relationship to said output signals from said counter means to be delivered to said temporary storage device for parallel storage therein and causes said digital control signals to be delivered in serial form from said temporary storage device to a controlled device and further delivers a signal to said input of said counter means, means responsive to signals from said time signal generator and responsive to said cyclically operated control means for producing signals which continuously indicate the present time point of said cycle with reference to a time index of said cycle, and a signal processing system responsive to said condition responsive signals, said signals produced by said time signal generator, said stored signals produced by said time signal generator at the time that each condition responsive signal is delivered to said first buffer storage device, said output signals from said counter means and said signals which continuously indicate the present time point of said cycle for producing said digital control signals and said accompanying burst signals.

9. A control equipment comprising a source of data signals, a signal processing system including a first intermediate buffer storage device for receiving signals from said source and a second intermediate buffer storage device for delivering signals to a load and means to deliver timing signals to said processing system from which timing signals the time delay characteristics of said first and said second intermediate buffer storage devices can be determined.

10. In combination, a source of data signals, a buffer storage system having a plurality of signal storage registers, a source of time signals continuously indicating the amount of elapsed time from a time reference, means for delivering data signals from said source of data signals and signals from said source of time signals in associated relation to an empty storage register in said buffer storage system to store with said data signals an indication of the time of delivery of said data signals to said buffer storage system, a signal processing system, and means responsive to signals from said signal processing system to deliver said data signals and said associated time signals stored in a full register in said buffer storage system to said signal processing system.

11. In combination, a source of data signals, a temporary signal storage device for storing signals from said source of data signals, a buffer storage system having a plurality of signal storage registers, a source of time signals continuously indicating the amount of elapsed time from a time reference, means responsive to signals from said buffer storage system for delivering data signals and signals from said temporary signal storage device and signals from said source of time signals in associated relation to an empty storage register in said buffer storage system to store with said data signals an indication of the time of delivery of said data signals to said buffer storage system, a signal processing system, and means responsive to signals from said signal processing system to deliver said data signals and said time signals stored in a full register in said buffer storage system to said signal processing system.

12. A data processing system including computer means for making computations based on data signals and for providing output signals representative of such computations and an output system for storing said output signals for variable storage periods, said output system including means for providing to said computer means reference signals indicative of the length of time output signals about to be received from said computer means will be stored in said output system, and said computer means including means for modifying said computations in accordance with the nature of said reference signals.

13. A data processing system including computer means for making computations based on data signals and for providing output signals representative of such computations, an input system for storing input data signals and for delivering said stored signals to said computer means after variable storage periods, means for associating with stored data signals delivered by said input system to said computer means first reference signals indicative of the time of storage of said delivered signals in said input system, an output system for storing for variable storage periods the output signals provided by the computer means, said output system including means for providing to said computer second reference signals indicative of the length of time output signals about to be received from said computer means will be stored in said output system, and said computer means including means for modifying computations based on said input data signals in accordance with the nature of corresponding first and second reference signals.

14. In a real time system, a data processing computer for processing data signals and generating output signals based on the result of said data processing operation, a data input system for translating data signals to said data processing computer, means to supply data signals to be processed to said input system, said data input system including means to associate a real time tag signal with said data signals for use by said data processing computer in the processing of said data signals, and a data output system for translating to a receiver output signals generated by said data processing computer as a result of processing of data signals supplied by said input system, said data processing computer including means to assign an output signal controlling value to said output signals to insure that the said output signals will arrive at said receiver prior to a specified real time on which information in said output signals is dependent, and said data output system including means responsive to said output signal controlling value for controlling the translation of said output signals to said receiver.

15. A data processing system including computer means for making computations based on data words,
   input and output buffer storage means providing communication between said computer means and input and output equipment,
   each said buffer storage means introducing a variable time delay in the transmission of a data word between said computer and said input and output devices,
   means to record with a word in said input buffer storage means a signal indicative of the time of delivery of that data word to said input buffer storage means,
   means to establish a time for a result to be transmitted from said output buffer storage means to an output device,
   said computer means including means to compute a result based upon data words stored in said input buffer means, said recorded time signals and said established time,
   means to store said result in said output buffer storage means,
   and means to transmit said result from said output buffer storage means to said output device at said established time.

16. In a data processing system including computer means for making computations on data signals,
   an input system including means for storing input data signals,
   means for generating signals indicative of time,
   means responsive to the delivery of data signals to said input system for storing said generated time indicating signals with data signals stored in said input system to indicate the time of delivery to said input system of the stored data signals,
   means for delivering said stored data signals to said computer means after variable storage periods, and
   means for delivering said stored time of delivery indicating signals to said computer means for processing by said computer means with said data signals.

References Cited in the file of this patent

UNITED STATES PATENTS

| 2,275,735 | Cloud | Mar. 10, 1942 |
| 2,586,704 | Ostline | Feb. 19, 1952 |
| 2,614,169 | Cohen et al. | Oct. 14, 1952 |
| 2,658,670 | Morton et al. | Nov. 10, 1953 |
| 2,688,124 | Doty | Aug. 31, 1954 |
| 2,798,554 | Smith | July 9, 1957 |
| 2,959,351 | Hamilton | Nov. 8, 1960 |

OTHER REFERENCES

Richards: Arithmetic Operations in Digital Computers (March 1955), D. Van Nostrand Co., Inc., New York. Page 181 relied on.

IBM 650 Data Processing System, Customer Engineering Manual of Instruction, copyright 1956.